US012706490B2

(12) United States Patent
Li et al.

(10) Patent No.: US 12,706,490 B2
(45) Date of Patent: Aug. 11, 2026

(54) WIRELESS CHARGING CIRCUIT AND SYSTEM, ELECTRONIC DEVICE, AND CONTROL METHOD

(71) Applicant: Huawei Technologies Co., Ltd., Shenzhen (CN)

(72) Inventors: Tao Li, Shanghai (CN); Zhiqiang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 632 days.

(21) Appl. No.: 18/255,773

(22) PCT Filed: Dec. 2, 2021

(86) PCT No.: PCT/CN2021/135155

§ 371 (c)(1),
(2) Date: Jun. 2, 2023

(87) PCT Pub. No.: WO2022/117052

PCT Pub. Date: Jun. 9, 2022

(65) Prior Publication Data

US 2024/0006930 A1 Jan. 4, 2024

(30) Foreign Application Priority Data

Dec. 4, 2020 (CN) ......................... 202011403352.3

(51) Int. Cl.
*H01M 10/44* (2006.01)
*H01M 10/46* (2006.01)
(Continued)

(52) U.S. Cl.
CPC .............. *H02J 50/80* (2016.02); *H02J 50/12* (2016.02); *H02J 2207/20* (2020.01)

(58) Field of Classification Search
CPC .. H02J 50/12; H02J 50/80; H02J 50/40; H02J 7/82; H02J 7/65; H02J 50/10; H02J 7/92;
(Continued)

(56) References Cited

U.S. PATENT DOCUMENTS

2010/0148723 A1 6/2010 Cook et al.
2014/0152249 A1 6/2014 Yeh
(Continued)

FOREIGN PATENT DOCUMENTS

CN 101647182 A 2/2010
CN 102460923 A 5/2012
(Continued)

*Primary Examiner* — Edward Tso
(74) *Attorney, Agent, or Firm* — Slater Matsil, LLP

(57) ABSTRACT

This application provides a wireless charging circuit and system, an electronic device, and a control method, and relates to the field of wireless charging technologies, to alleviate a problem of small charging power of an electronic device having a wireless reverse charging function. In the wireless charging circuit, a first voltage conversion circuit converts a supply voltage into a first battery voltage of a first battery, to charge the first battery. The first voltage conversion circuit further outputs the first battery voltage provided by the first battery. A second voltage conversion circuit boosts the first battery voltage. The second voltage conversion circuit includes a first boost circuit and at least one stage of switched-capacitor direct current converter that are connected in series. A first alternating current/direct current conversion circuit converts a direct current voltage output by the second voltage conversion circuit into an alternating current voltage.

20 Claims, 35 Drawing Sheets

(51) Int. Cl.
*H02J 50/12* (2016.01)
*H02J 50/80* (2016.01)

(58) Field of Classification Search
CPC .... H02M 1/007; H02M 3/07; H02M 3/33507; H02M 1/32
USPC ....... 320/107, 108, 114, 128, 132, 137, 143, 320/148, 149, 150
See application file for complete search history.

(56) References Cited

U.S. PATENT DOCUMENTS

| | | | | |
|---|---|---|---|---|
| 2019/0348849 | A1 | 11/2019 | Kun et al. | |
| 2021/0344232 | A1* | 11/2021 | Sjoeroos | H02J 50/50 |

FOREIGN PATENT DOCUMENTS

| | | | |
|---|---|---|---|
| CN | 202513680 | U | 10/2012 |
| CN | 202564995 | U | 11/2012 |
| CN | 104348216 | A | 2/2015 |
| CN | 104767252 | A | 7/2015 |
| CN | 107834845 | A | 3/2018 |
| CN | 109842181 | A | 6/2019 |
| CN | 209046328 | U | 6/2019 |
| CN | 110994810 | A | 4/2020 |
| CN | 111033933 | A | 4/2020 |
| CN | 210327075 | U | 4/2020 |
| CN | 210780164 | U | 6/2020 |
| EP | 3611834 | A1 | 2/2020 |
| KR | 20200042426 | A | 4/2020 |
| WO | 2020101784 | A1 | 5/2020 |

* cited by examiner

WIRELESS CHARGING CIRCUIT AND SYSTEM, ELECTRONIC DEVICE, AND CONTROL METHOD

CROSS-REFERENCE TO RELATED APPLICATIONS

This application is a National Stage of International Application No. PCT/CN2021/135155 filed on Dec. 2, 2021, which claims priority to Chinese Patent Application No. 202011403352.3 filed on Dec. 4, 2020. Both of the aforementioned applications are hereby incorporated by reference in their entireties.

TECHNICAL FIELD

This application relates to the field of wireless charging technologies, and in particular, to a wireless charging circuit and system, an electronic device, and a control method.

BACKGROUND

A wireless charging technology (wireless charging technology, WCT) implements wireless transmission of electric energy via a conductive medium such as an electric field, a magnetic field, a microwave, or a laser. Because of advantages such as no wire restriction, no plugging, and the like, the wireless charging technology is more widely used in electronic devices.

To further improve user experience, some electronic devices, such as mobile phones, may use a wireless coil to emit an electromagnetic wave via a wireless charging technology, thereby performing reverse charging on other devices that support wireless charging. Currently, a charging power provided by the foregoing electronic devices that can implement wireless reverse charging is relatively low, and is usually 5 W to 10 W. In this case, a relatively low charging power causes a phenomenon that a charging speed is low, a charging loss is large, and an emission amount is large in a process in which the electronic devices perform wireless reverse charging, thereby reducing user experience.

SUMMARY

This application provides a wireless charging circuit and system, an electronic device, and a control method, to alleviate a problem of small charging power of an electronic device having a wireless reverse charging function.

To achieve the foregoing objectives, the following technical solutions are used in this application.

In one aspect, this application provides a wireless charging circuit. The wireless charging circuit may be integrated into a chip. The wireless charging circuit may include a first voltage conversion circuit, a second voltage conversion circuit, and a first alternating current/direct current conversion circuit. The first voltage conversion circuit is electrically connected to a first battery. The first voltage conversion circuit is configured to convert a supply voltage into a first battery voltage of the first battery, for charging the first battery. The first voltage conversion circuit is further configured to output the first battery voltage provided by the first battery. The second voltage conversion circuit is electrically connected to the first voltage conversion circuit, and the second voltage conversion circuit is configured to boost the first battery voltage. The second voltage conversion circuit includes a first boost circuit and at least one stage of switched-capacitor direct current converter that are connected in series. The first alternating current/direct current conversion circuit is electrically connected to the second voltage conversion circuit, and the first alternating current/direct current conversion circuit is configured to convert a direct current voltage output by the second voltage conversion circuit into an alternating current voltage. In conclusion, the second voltage conversion circuit of the wireless charging circuit provided in this embodiment of this application includes the first boost circuit. When an electronic device with the wireless charging circuit performs wireless reverse charging on a to-be-charged electronic device, a difference between an output voltage and an input voltage of the first boost circuit may be reduced, so that the first boost circuit operates at a voltage conversion efficiency peak or is located near the voltage conversion efficiency peak. Therefore, a heat generating phenomenon of an inductor in the first boost circuit is reduced, and a voltage conversion efficiency of the first boost circuit is improved. On this basis, to enable the electronic device to provide a relatively large charging power during the reverse charging, the second voltage conversion circuit may further include at least one stage of switched-capacitor direct current converter connected in series to the first boost circuit. The switched-capacitor direct current transformer mainly includes multiple switching transistors and capacitors. The switched-capacitor direct current converter has no inductor disposed inside, and is a non-inductive DC-DC voltage converter. Therefore, the capacitor may be charged and discharged by controlling an on/off state of the switching transistor in the switched-capacitor direct current converter, to boost the input voltage and achieve a relatively high voltage conversion efficiency. In this way, when both the first voltage circuit and the at least one stage of switched-capacitor direct current converter that are connected in series boost the input voltage, the second voltage conversion circuit can output a relatively large voltage while having a relatively high voltage conversion efficiency. Therefore, when performing wireless reverse charging on the to-be-charged electronic device, the electronic device can output a relatively large charging power, to improve a charging speed. In addition, the switched-capacitor direct current transformer has a relatively small size, which helps improve a power density of the electronic device. In addition, an electromagnetic interference generated on a radio frequency circuit is relatively small.

Optionally, the wireless charging circuit further includes a second boost circuit and a second alternating current/direct current conversion circuit. The second boost circuit is electrically connected to the first voltage conversion circuit, and is configured to boost the first battery voltage and then output a voltage obtained by boosting. A boost multiple of the second boost circuit is less than or equal to a boost multiple of the first boost circuit. The second alternating current/direct current conversion circuit is electrically connected to the second boost circuit, and is configured to convert a direct current voltage output by the second boost circuit into an alternating current voltage. In this way, when a to-be-charged electronic device exists at a location of a second coil in the electronic device with the wireless charging circuit, the electronic device can perform reverse charging on the to-be-charged electronic device through a charging path that includes the second boost circuit, the second alternating current/direct current conversion circuit, and the second coil.

Optionally, the first boost circuit is provided with a feedback end. The second voltage conversion circuit further includes a pull-up resistor, a pull-down resistor, and a regulating resistor. A first end of the pull-up resistor is electrically connected to an output end of the first boost circuit, and a second end of the pull-up resistor is electrically connected to the feedback end of the first boost circuit. A first end of the pull-down resistor is electrically connected to the feedback end of the first boost circuit, and a second end of the pull-down resistor is grounded. A first end of the regulating resistor is electrically connected to the feedback end of the first boost circuit, and a second end of the regulating resistor is configured to be suspended or grounded, or to receive a pulse width modulation signal. In this way, when the electronic device with the wireless charging circuit performs low-power charging on the to-be-charged electronic device at a location of a first coil, a processor of the electronic device may control the second end of the regulating resistor to be suspended. When the electronic device performs high-power charging on the to-be-charged electronic device at the location of the first coil, the processor may control the second end of the regulating resistor to be grounded, or provide a pulse width modulation signal to the second end of the regulating resistor based on the efficiency peak of the first boost circuit, so that a voltage output by the first boost circuit is adjusted as required.

Optionally, the first boost circuit and the at least one stage of switched-capacitor direct current converter are sequentially electrically connected between the first voltage conversion circuit and the first alternating current/direct current conversion circuit. In this case, because the switched-capacitor direct current converter is located at the output end of the first boost circuit, a voltage input by the first boost circuit to the switched-capacitor direct current converter is greater than a voltage at an input end of the first boost circuit. Therefore, a withstand voltage requirement of the switching transistor in the switched-capacitor direct current converter is higher than a withstand voltage requirement of the switching transistor in the first boost circuit, so that the withstand voltage requirement of the switching transistor in the first boost circuit can be reduced.

Optionally, the wireless charging circuit further includes a first switch circuit. A control end of the first switch circuit is configured to receive a first switch control signal, a first end of the first switch circuit is electrically connected to an input end of the first voltage conversion circuit, and a second end of the first switch circuit is electrically connected between the first boost circuit and the at least one stage of switched-capacitor direct current converter. The first switch circuit is configured to be turned on or off based on the first switch control signal. The first alternating current/direct current conversion circuit is further configured to convert an alternating current voltage induced by the first coil of the electronic device with the wireless charging circuit into a direct current voltage. When a wireless charging circuit is disposed at the location of the first coil, the processor may control the first switch circuit to be in an on state, and control at least one stage of switched-capacitor direct current converter, electrically connected between the second end of the first switch circuit and the first alternating current/direct current conversion circuit, to operate in a by pass mode. That is, the at least one stage of switched-capacitor direct current converter is equivalent to a wire. In this case, a direct current voltage output by the first alternating current/direct current conversion circuit can be transmitted, to the first voltage conversion circuit, through the switched-capacitor direct current converter that operates in the by pass mode and the first switch circuit, and then the first battery is charged, to implement forward charging of the electronic device. In addition, at least one stage of switched-capacitor direct current converter electrically connected between the second end of the first switch circuit and the first alternating current/direct current conversion circuit operates in the by pass mode. The switched-capacitor direct current converter itself has a specific resistance. Therefore, when the direct current voltage output by the first alternating current/direct current conversion circuit passes through the switched-capacitor direct current converter that operates in the by pass mode, a voltage value is slightly reduced, so that a withstand voltage value of the switching transistor in the first switch circuit configured to receive the direct current voltage can be reduced.

Optionally, the wireless charging circuit further includes a first switch circuit. A control end of the first switch circuit is configured to receive a first switch control signal, a first end of the first switch circuit is electrically connected to an input end of the first voltage conversion circuit, and a second end of the first switch circuit is electrically connected to the first alternating current/direct current conversion circuit. The first switch circuit is configured to be turned on or off based on the first switch control signal. The first coil is further configured to receive an alternating magnetic field, and generate an alternating current voltage by induction. The first alternating current/direct current conversion circuit is further configured to convert an alternating current voltage on the first coil into a direct current voltage. After the direct current voltage output by the first alternating current/direct current conversion circuit can be directly transmitted to the first voltage conversion circuit through the first switch circuit, the first battery is charged, to implement forward charging of the electronic device.

Optionally, the first switch circuit includes a first switching transistor, a second switching transistor, a first resistor, a second resistor, and a third switching transistor. A first electrode of the first switching transistor is used as the first end of the first switch circuit. A first electrode of the second switching transistor is electrically connected to a second electrode of the first switching transistor, and a second electrode of the second switching transistor is used as the second end of the first switch circuit. A first end of the first resistor is electrically connected to the second electrode of the first switching transistor and the first electrode of the second switching transistor, and a second end of the first resistor is electrically connected to a gate of the first switching transistor and a gate of the second switching transistor. A first end of the second resistor is electrically connected to a second end of the second resistor. A first electrode of the third switching transistor is electrically connected to the second end of the second resistor, and a second electrode of the third switching transistor is grounded. A gate of the third switching transistor is used as the control end of the first switch circuit and is electrically connected to the processor, and is configured to receive the first switch control signal sent by the processor. When the processor controls the third switching transistor to be turned on through the first switch control signal, both the first switching transistor and the second switching transistor are turned on, and the entire first switch circuit is in the on state. When the processor controls the third switching transistor to be cut off through the first switch control signal, both the first switching transistor and the second switching transistor are in a cut-off state, and the entire first switch circuit is in the off state. In addition, the first resistor and the second resistor act through voltage division, so that a span voltage generated between the gate and a source (or a drain) of the first switching transistor and the second switching transistor falls within a proper range.

As a result, damage to the switching transistors by the span voltage can be avoided when the switching transistors are turned on.

Optionally, the wireless charging circuit further includes a second switch circuit. A control end of the second switch circuit is configured to receive a second switch control signal, a first end of the second switch circuit is electrically connected to the first boost circuit, and a second end of the second switch circuit is electrically connected to the at least one stage of switched-capacitor direct current converter. The second switch circuit is configured to be turned on or off based on the second switch control signal. In this case, when a wireless charging power supply performs forward charging on the electronic device, the processor may output the second switch control signal to the control end of the second switch circuit, to control the second switch circuit to be in the off state. In this way, damage to the switching transistor in the first boost circuit, due to a too large direct current voltage output by the switched-capacitor direct current converter during the foregoing forward charging, can be avoided.

Optionally, the second switch circuit includes a fourth switching transistor, a third resistor, a fifth switching transistor, a fourth resistor, a fifth resistor, and a sixth switching transistor. A first electrode of the fourth switching transistor is used as the first end of the second switch circuit, and a second electrode of the fourth switching transistor is used as the second end of the second switch circuit. A first end of the third resistor is electrically connected to a gate of the fourth switching transistor, and a second end is electrically connected to the second electrode of the fourth switching transistor. A first electrode of the fifth switching transistor is electrically connected to the first electrode of the fourth switching transistor, and a second electrode of the fifth switching transistor is electrically connected to the second electrode of the fourth switching transistor. A first end of the fourth resistor is electrically connected to the gate of the fourth switching transistor and a gate of the fifth switching transistor, and a second end is electrically connected to the second electrode of the fifth switching transistor. A first electrode of the fifth resistor is electrically connected to the gate of the fifth switching transistor. A first electrode of the sixth switching transistor is electrically connected to a second end of the fifth resistor, and a second electrode of the sixth switching transistor is grounded. A gate of the sixth switching transistor is used as the control end of the second switch circuit and is electrically connected to the processor, and is configured to receive the second switch control signal output by the processor. In this case, when the processor controls the sixth switching transistor to be turned on through the second switch control signal, both the fourth switching transistor and the fifth switching transistor are turned on, and the entire second switch circuit is in the on state. The fourth switching transistor and the fifth switching transistor are connected in parallel. When the first boost circuit outputs an electrical signal to the switched-capacitor direct current converter through the second switch circuit, a resistance do switch on of the second switch circuit can be effectively reduced, thereby improving a signal transmission efficiency. In addition, the third resistor and the fifth resistor that are connected in series can act through voltage division, so that a span voltage generated between the gate and a source (or a drain) of the fourth switching transistor falls within a proper range. As a result, damage to the switching transistors by the span voltage can be avoided when the switching transistors are turned on. Similarly, the fourth resistor and the fifth resistor that are connected in series can act through voltage division, so that a span voltage generated between the gate and a source (or a drain) of the fifth switching transistor falls within a proper range. In addition, when the processor controls the sixth switching transistor to be cut off through the second switch control signal, both the fourth switching transistor and the fifth switching transistor are in the turned off state, and the entire second switch circuit is in the off state. [cloth] Optionally, the wireless charging circuit further includes a third switch circuit. A control end of the third switch circuit is configured to receive a third switch control signal, a first end of the third switch circuit is electrically connected to a USB interface, and a second end of the third switch circuit is electrically connected to an output end of the second boost circuit. The third switch circuit is configured to be turned on or off based on the third switch control signal. When the third switch circuit is turned on, the electronic device may supply power to an external device that is electrically connected to the electronic device through the USB interface, to perform data transmission.

Optionally, the wireless charging circuit further includes a fourth switch circuit. A control end of the fourth switch circuit is configured to receive a fourth switch control signal, a first end of the fourth switch circuit is electrically connected to the output end of the second boost circuit, and a second end of the fourth switch circuit is electrically connected to the second alternating current/direct current conversion circuit. The fourth switch circuit is configured to be turned on or off based on the fourth switch control signal. When the fourth switch circuit is turned on, the electronic device with the wireless charging circuit may perform wireless reverse charging on the to-be-charged electronic device located at the location of the second coil.

Optionally, the wireless charging circuit further includes a fifth switch circuit. A control end of the fifth switch circuit is configured to receive a fifth switch control signal, a first end of the fifth switch circuit is electrically connected to a USB interface, and a second end of the fifth switch circuit is electrically connected to the input end of the first voltage conversion circuit. The fifth switch circuit is configured to be turned on or off based on the fifth switch control signal. When the USB interface is electrically connected to the charging power supply, the fifth switch circuit may be controlled to be turned on, to perform forward charging on the electronic device in a wired manner. When a wireless charging circuit is disposed at the location of the first coil of the electronic device, the fifth switch circuit may be controlled to be turned off, to avoid a conflict between wireless forward charging and wired forward charging.

Optionally, any switched-capacitor direct current converter of the at least one stage of switched-capacitor direct current converter includes a seventh switching transistor, an eighth switching transistor, a first capacitor, a ninth switching transistor, and a tenth switching transistor. A first electrode of the seventh switching transistor is used as an input end of the switched-capacitor direct current converter. A first electrode of the eighth switching transistor is electrically connected to a second electrode of the seventh switching transistor, and a second electrode of the eighth switching transistor is used as an output end of the switched-capacitor direct current converter. A first end of the first capacitor is electrically connected to the second electrode of the seventh switching transistor. A first electrode of the ninth switching transistor is electrically connected to a second end of the first capacitor, and a second electrode of the ninth switching transistor is grounded. A first electrode of the tenth switching transistor is electrically connected to the first electrode of the seventh switching transistor, and a second electrode of the tenth switching transistor is electrically connected to the second end of the first capacitor. In the switched-capacitor direct current converter, the input voltage is boosted through the foregoing four switching transistors and one capacitor.

Optionally, any switched-capacitor direct current converter of the at least one stage of switched-capacitor direct current converter includes a seventh switching transistor, an eighth switching transistor, a first capacitor, a ninth switching transistor, a tenth switching transistor, an eleventh switching transistor, a twelfth switching transistor, a second capacitor, a thirteenth switching transistor, and a fourteenth switching transistor. A first electrode of the seventh switching transistor is used as an input end of the switched-capacitor direct current converter. A first electrode of the eighth switching transistor is electrically connected to a second electrode of the seventh switching transistor, and a second electrode of the eighth switching transistor is used as an output end of the switched-capacitor direct current converter. A first end of the first capacitor is electrically connected to the second electrode of the seventh switching transistor. A first electrode of the ninth switching transistor is electrically connected to a second end of the first capacitor, and a second electrode of the ninth switching transistor is electrically connected to the second electrode of the eighth switching transistor. A first electrode of the tenth switching transistor is electrically connected to the first electrode of the seventh switching transistor, and a second electrode of the tenth switching transistor is electrically connected to the second end of the first capacitor. A second electrode of the eleventh switching transistor is electrically connected to the first electrode of the seventh switching transistor. A first electrode of the twelfth switching transistor is grounded, and a second electrode of the twelfth switching transistor is electrically connected to a first electrode of the eleventh switching transistor. A first end of the second capacitor is electrically connected to the first electrode of the eleventh switching transistor. A first electrode of the thirteenth switching transistor is grounded, and a second electrode of the thirteenth switching transistor is electrically connected to a second end of the second capacitor. A first electrode of the fourteenth switching transistor is electrically connected to the second end of the second capacitor, and a second electrode of the fourteenth switching transistor is electrically connected to the second electrode of the eleventh switching transistor. In the switched-capacitor direct current converter, the input voltage is boosted through the eight switching transistors and the two capacitors. In this case, a relatively large quantity of switching transistors is used in the switched-capacitor direct current converter, which helps increase an output current of the switched-capacitor direct current converter.

Optionally, the at least one stage of switched-capacitor direct current converter includes a first stage of switched-capacitor direct current converter and a second stage of switched-capacitor direct current converter. An output end of the first stage of switched-capacitor direct current converter is electrically connected to an input end of the second stage of switched-capacitor direct current converter. The second voltage conversion circuit further includes a third boost circuit. The third boost circuit is connected in parallel to the first boost circuit. A boost multiple of the third boost circuit is the same as a boost multiple of the first boost circuit. In this way, an output voltage of the second voltage conversion circuit can be further improved through the first stage of switched-capacitor direct current converter and the second stage of switched-capacitor direct current converter, and an output power of the electronic device during reverse charging is improved. In addition, the wireless charging circuit further includes a first diode and a second diode. An anode of the first diode is electrically connected to the output end of the first boost circuit, and a cathode is electrically connected to the first alternating current/direct current conversion circuit. An anode of the second diode is electrically connected to an output end of the third boost circuit, and a cathode is electrically connected to the first alternating current/direct current conversion circuit. Through the first diode and the second diode, a signal crosstalk between the first stage of switched-capacitor direct current converter and the second stage of switched-capacitor direct current converter that are connected in parallel can be avoided.

Optionally, the wireless charging circuit further includes a third diode. An anode of the third diode is electrically connected to the input end of the switched-capacitor direct current converter, and a cathode of the third diode is electrically connected to the output end of the switched-capacitor direct current converter. In this way, when the first boost circuit provides a voltage to the input end of the switched-capacitor direct current converter through the first switch circuit, the output end of the switched-capacitor direct current converter also has a voltage under a free-wheeling action of the third diode. In addition, when a voltage at an output end of the third diode is greater than a voltage at an input end, pre-starting of the switched-capacitor direct current converter may be implemented.

Optionally, the wireless charging circuit further includes a first thermistor and a second thermistor. The first thermistor is configured to sense a temperature of the first battery. The second thermistor is configured to sense temperatures of the first boost circuit and a processor. The processor is further configured to control the second end of the regulating resistor to be suspended or grounded, or provide a pulse width modulation signal to the second end of the regulating resistor, based on the sensing results of the first thermistor and the second thermistor. In this way, over temp protection for the electronic device can be implemented through the first thermistor and the second thermistor.

In another aspect, this application provides an electronic device. The electronic device includes a first coil and any one of the foregoing wireless charging circuits. The first coil is electrically connected to the first alternating current/direct current conversion circuit. The first coil is configured to emit an alternating magnetic field. The first coil is further configured to receive the alternating magnetic field, and generate an alternating current through induction. The electronic device has a same technical effect as the wireless charging circuit provided in the foregoing embodiments, and details are not described herein again.

Optionally, the wireless charging circuit further includes a second boost circuit and a second alternating current/direct current conversion circuit. The second boost circuit is electrically connected to the first voltage conversion circuit. The second boost circuit is configured to boost the first battery voltage and then output a voltage obtained by boosting. A boost multiple of the second boost circuit is less than or equal to a boost multiple of the first boost circuit. The second alternating current/direct current conversion circuit is electrically connected to the second boost circuit. The second alternating current/direct current conversion circuit is configured to convert a direct current voltage output by the second boost circuit into an alternating current voltage. In addition, the electronic device further includes a second coil. The second coil is electrically connected to the second alternating current/direct current conversion circuit, and is configured to emit an alternating magnetic field. When a to-be-charged electronic device exists at a location of a second coil in the electronic device with the wireless charging circuit, the electronic device can perform reverse charging on the to-be-charged electronic device through a charging path that includes the second boost circuit, the second alternating current/direct current conversion circuit, and the second coil.

Optionally, the electronic device includes the first battery. The first battery is electrically connected to the first voltage conversion circuit in the wireless charging circuit. The electronic device may discharge through the first battery, and reverse charge the to-be-charged electronic device.

Optionally, the electronic device further includes a circuit board and a housing, and the housing covers the circuit board and the first battery. The wireless charging circuit is disposed on the circuit board. The first coil is located on a side that is of the first battery and that faces the housing, and is in contact with the housing. In this way, the to-be-charged electronic device may be placed on a side surface that is of the housing and that is away from the first coil, so that the alternating magnetic field emitted by the first coil may be transmitted to a coil of the to-be-charged electronic device.

In another aspect, this application provides a wireless charging system. The wireless charging system may include a first electronic device and a second electronic device. The first electronic device may be any one of the foregoing electronic devices. The second electronic device includes a second battery, a third coil, and a third alternating current/direct current conversion circuit. The third coil is configured to emit an alternating magnetic field to the first coil in the first electronic device, or receive the alternating magnetic field emitted by the first coil. The third alternating current/direct current conversion circuit is electrically connected to the third coil and the second battery. The third alternating current/direct current conversion circuit is configured to convert an alternating current voltage induced by the third coil after receiving the alternating current magnetic field into a direct current voltage for charging the second battery. The third alternating current/direct current conversion circuit is further configured to convert a battery voltage provided by the second battery into an alternating current voltage, and transmit the alternating current voltage to the third coil, so that the third coil emits the alternating magnetic field. When the second electronic device is located at a location of the first coil of the first electronic device, the first electronic device may perform reverse charging on the second electronic device. The wireless charging system has a same technical effect as the electronic device provided in the foregoing embodiments, and details are not described herein again.

Optionally, the first electronic device includes the second boost circuit, the second alternating current/direct current conversion circuit, and the second coil. The second boost circuit is electrically connected to the first voltage conversion circuit in the first electronic device, and is configured to boost an output voltage of the first voltage conversion circuit and then output the output voltage obtained by boosting. The boost multiple of the second boost circuit is less than or equal to the boost multiple of the first boost circuit. The second alternating current/direct current conversion circuit is electrically connected to the second boost circuit, and is configured to convert the direct current voltage output by the second boost circuit into an alternating current voltage. The second coil and the second alternating current/direct current conversion circuit, configured to emit the alternating magnetic field. In addition, the wireless charging system further includes a third electronic device. The third electronic device includes a third battery, a fourth coil, and a fourth alternating current/direct current conversion circuit. The fourth coil is configured to receive the alternating magnetic field emitted by the second coil. The fourth alternating current/direct current conversion circuit is electrically connected to the fourth coil and the third battery. The fourth alternating current/direct current conversion circuit is configured to convert an alternating current voltage induced by the fourth coil after receiving the alternating current magnetic field into a direct current voltage for charging the third battery. When the third electronic device is located at a location of the second coil of the first electronic device, the first electronic device may perform reverse charging on the third electronic device.

In another aspect, this application provides a control method. The control method is applied to the processor in any one of the foregoing electronic devices. The electronic device further includes the first battery electrically connected to the processor, and the first battery is electrically connected to the first voltage conversion circuit in the wireless charging circuit. The first boost circuit and the at least one stage of switched-capacitor direct current converter are sequentially electrically connected between the first voltage conversion circuit and the first alternating current/direct current conversion circuit. The method includes: after a control operation of a user is received, if a battery level of the first battery is greater than a minimum battery level threshold, controlling the first voltage conversion circuit to output the first battery voltage provided by the first battery, where the control operation is for controlling the first battery to discharge; controlling the first boost circuit to boost the first battery voltage, and controlling the at least one stage of switched-capacitor direct current converter to output a voltage output by the first boost circuit; after a power increase request is received, controlling the at least one stage of switched-capacitor direct current converter to boost the voltage output by the first boost circuit; and controlling the first alternating current/direct current conversion circuit to convert a voltage output by the at least one stage of switched-capacitor direct current converter into an alternating current voltage, to excite the first coil to emit the alternating magnetic field. The foregoing control method has a same technical effect as the electronic device provided in the foregoing embodiments, and details are not described herein again.

Optionally, the wireless charging circuit further includes the second boost circuit, the second alternating current/direct current conversion circuit, and the second coil. The second boost circuit is electrically connected to the first voltage conversion circuit. The second alternating current/direct current conversion circuit is electrically connected to the second boost circuit. The second coil is electrically connected to the second alternating current/direct current conversion circuit. When the battery level of the first battery is greater than the minimum battery level threshold, the method further includes: detecting whether a to-be-charged electronic device exists at a location of the second coil. If the to-be-charged electronic device exists at the location of the second coil, after the controlling the first voltage conversion circuit to output the first battery voltage provided by the first battery, the method further includes: controlling the second boost circuit to boost the first battery voltage. The voltage output by the second boost circuit is less than or equal to the voltage output by the first boost circuit. The second alternating current/direct current conversion circuit converts the direct current voltage output by the second boost circuit into an alternating current voltage, to excite the second coil to emit the alternating magnetic field. Technical effects of the second boost circuit, the second alternating current/direct current conversion circuit, and the second coil are the same as those described above, and details are not described herein again.

Optionally, the wireless charging circuit further includes the first switch circuit and the second switch circuit. The first end of the first switch circuit is electrically connected to the input end of the first voltage conversion circuit. The second end of the first switch circuit is electrically connected between the first boost circuit and the at least one stage of switched-capacitor direct current converter. The first end of the second switch circuit is electrically connected to the first boost circuit. The second end of the second switch circuit is electrically connected to the at least one stage of switched-capacitor direct current converter. After the control operation of the user is received, and before the controlling the first voltage conversion circuit to output the first battery voltage provided by the first battery, the method includes: generating the first switch control signal and the second switch control signal based on the control operation; outputting the first switch control signal to the control end of the first switch circuit, to control the first switch circuit to be turned off; and outputting the second switch control signal to the control end of the second switch circuit, to control the second switch circuit to be turned on, and electrically connecting the first boost circuit to the at least one stage of switched-capacitor direct current converter. In this case, reverse charging may be performed on the second electronic device located at the location of the first coil.

Optionally, before the control operation of the user is received, the control method further includes: sending a detection signal, where the detection signal is for connecting the electronic device and the to-be-charged electronic device; and outputting instruction request information if the electronic device and the to-be-charged electronic device are successfully wirelessly connected. The instruction request information indicates the user to enter the control operation. The control operation may be displayed in a form of an information prompt box, thereby performing an operation on the instruction request information in the information prompt box as required by the user. The control operation may be sent to the processor after the instruction request information is agreed by the user.

Optionally, the wireless charging circuit further includes a third switch circuit. The first end of the third switch circuit is electrically connected to the USB interface. The second end is electrically connected to the output end of the second boost circuit. The USB interface is configured to electrically connect to an external device, and identify the type of the external device. If the USB interface is electrically connected to the external device, the method further includes: generating the third switch control signal based on a result of identifying the type of the external device by the USB interface; and outputting the third switch control signal to the control end of the third switch circuit, to control the third switch circuit to be turned on, and electrically connecting the USB interface to the second boost circuit. Next, after the controlling the first voltage conversion circuit to output the first battery voltage provided by the first battery, the method further includes: controlling the second boost circuit to boost the first battery voltage, and transmitting the first battery voltage to the external device through the third switch circuit. In this way, the voltage output by the second boost circuit may supply power to the external device electrically connected to the USB interface, to implement data transmission.

Optionally, the wireless charging circuit further includes a fourth switch circuit. The first end of the fourth switch circuit is electrically connected to the output end of the second boost circuit. The second end is electrically connected to the second alternating current/direct current conversion circuit. After the detecting that the to-be-charged electronic device exists at the location of the second coil, and before the controlling the second boost circuit to boost the first battery voltage, the method further includes: generating a fourth switch control signal; and outputting the fourth switch control signal to the control end of the fourth switch circuit, to control the fourth switch circuit to be turned on, and electrically connecting the second boost circuit to the second alternating current/direct current conversion circuit. A technical effect of the fourth switch circuit is the same as that described above, and details are not described herein again.

Optionally, before the control operation of the user is received, the method further includes: generating the second switch control signal, and outputting the second switch control signal to the control end of the second switch circuit, to control the second switch circuit to be turned off; generating the first switch control signal if a wireless charging power supply exists at a location of the first coil; outputting the first switch control signal to the control end of the first switch circuit, to control the first switch circuit to be turned on, and electrically connecting the at least one stage of switched-capacitor direct current converter to the input end of the first voltage conversion circuit; controlling the at least one stage of switched-capacitor direct current converter to transmit, to the first switch circuit, the direct current voltage output by the first alternating current/direct current conversion circuit; and controlling the first voltage conversion circuit to convert the direct current voltage output by the first alternating current/direct current conversion circuit into the first battery voltage of the first battery, and applying the first battery voltage to the first battery for charging the first battery. In this case, the wireless charging power supply located at the location of the first coil may perform forward charging on the first electronic device.

Optionally, the wireless charging circuit further includes the first switch circuit and the fifth switch circuit. The first end of the first switch circuit is electrically connected to the input end of the first voltage conversion circuit. The second end of the first switch circuit is electrically connected between the first boost circuit and the at least one stage of switched-capacitor direct current converter. The first end of the fifth switch circuit is electrically connected to the USB interface, and the second end is electrically connected to the input end of the first voltage conversion circuit. The USB interface is configured to electrically connect to an external device, and identify the type of the external device. If the USB interface is electrically connected to the charging power supply, the method further includes: generating the first switch control signal and the fifth switch control signal based on a result of identifying the type of the external device by the USB interface; outputting the first switch control signal to the control end of the first switch circuit, to control the first switch circuit to be turned off; and outputting the fifth switch control signal to the control end of the fifth switch circuit, to control the fifth switch circuit to be turned on, and electrically connecting the USB interface to the input end of the first voltage conversion circuit. A supply voltage provided by the external device is transmitted to the input end of the first voltage conversion circuit through the fifth switch circuit. A technical effect of the fifth switch circuit is the same as that described above, and details are not described herein again.

Optionally, the wireless charging circuit further includes the first thermistor. The first thermistor is configured to sense a temperature of the first battery. After the controlling the first alternating current/direct current conversion circuit to convert the direct current voltage output by the second voltage conversion circuit into an alternating current voltage, the method further includes: controlling, based on a sensing result of the first thermistor, the at least one stage of switched-capacitor direct current converter to output the voltage output by the first boost circuit if the temperature of the first battery is greater than a first temperature threshold; and controlling the at least one stage of switched-capacitor direct current converter to maintain a state of boosting the voltage output by the first boost circuit if the temperature of the first battery is less than the first temperature threshold. In this way, over temp protection can be performed on the first electronic device.

Optionally, if the temperature of the first battery is greater than the first temperature threshold, and after outputting, by the second voltage conversion circuit, the voltage output by the first boost circuit, the method further includes: turning off the first boost circuit if the temperature of the first battery is greater than a second temperature threshold. The second temperature threshold is greater than the first temperature threshold. In this way, secondary over temp protection can be performed on the first electronic device.

Optionally, the method further includes: turning off the first boost circuit and output low battery level indication information, if the battery level of the first battery is less than the minimum battery level threshold. The low battery level indication information indicates that the battery level of the first battery is less than the minimum battery level threshold. In this way, under voltage lock out can be performed on the first electronic device.

Optionally, the first boost circuit is provided with the feedback end. The second voltage conversion circuit further includes: the pull-up resistor, the pull-down resistor, and the regulating resistor. The first end of the pull-up resistor is electrically connected to the output end of the first boost circuit, and the second end is electrically connected to the feedback end of the first boost circuit. The first end of the pull-down resistor is electrically connected to the feedback end of the first boost circuit and the second end is grounded. The first end of the regulating resistor is electrically connected to the feedback end of the first boost circuit. Before the controlling the first boost circuit to boost the first battery voltage and the controlling the at least one stage of switched-capacitor direct current converter to output the voltage output by the first boost circuit, the method further includes: controlling the second end of the regulating resistor to be suspended. Therefore, low-power charging can be performed on the to-be-charged electronic device.

Optionally, after the power increase request is received, and before the controlling the at least one stage of switched-capacitor direct current converter to boost the voltage output by the first boost circuit, the method further includes: grounding the second end of the regulating resistor. Therefore, high-power charging can be performed on the to-be-charged electronic device. In this case, a voltage value output by the first boost circuit is a fixed value.

Optionally, after the power increase request is received, and before the controlling the at least one stage of switched-capacitor direct current converter to boost the voltage output by the first boost circuit, the method further includes: providing the pulse width modulation signal to the second end of the regulating resistor. Therefore, high-power charging can be performed on the to-be-charged electronic device. In this case, the voltage value output by the first boost circuit may be adjusted based on a duty cycle of the pulse width modulation signal, so that the first boost circuit can operate at a peak of voltage conversion, thereby improving a voltage conversion efficiency of the first boost circuit.

In another aspect, this application provides a computer readable storage medium including computer instructions. The computer instructions, when run on a processor in an electronic device, enable the processor to perform any one of the foregoing control methods.

In another aspect, this application provides a computer program product including computer instructions. The computer instructions, when run on a processor in an electronic device, enable the processor to perform any one of the foregoing control methods.

BRIEF DESCRIPTION OF THE DRAWINGS

FIG. 19B is an equivalent circuit diagram of a circuit structure shown in FIG. 19A;

REFERENCE NUMERALS

01—wireless charging system; 10—first electronic device; 20—second electronic device; 30—wireless charging circuit; 301—first voltage conversion circuit; 302—second voltage conversion circuit; 311—first alternating current/direct current conversion circuit; 321—first coil; 100—first battery; 200—second battery; 323—third coil; 313—third alternating current/direct current conversion circuit; 31—first boost circuit; 33—switched-capacitor direct current converter; 330—processor; 11—display screen; 12—carrying plate; 13—housing; 40—charging power supply; 20—second electronic device; 34—first switch circuit; 35—second switch circuit; 36—fifth switch circuit; 41—wireless charging power supply; 61—first thermistor; 62—second thermistor; 37—third switch circuit; 38—fourth switch circuit; 32—second boost circuit; 312—a second alternating current/direct current conversion circuit; 322—second coil; 30—third electronic device; 324—fourth coil; 314—fourth alternating current/direct current conversion circuit; 300—third battery; 50—USB interface; 51—third boost circuit; 52—control button; and 53—information prompt box.

DETAILED DESCRIPTION OF ILLUSTRATIVE EMBODIMENTS

The following describes the technical solutions in embodiments of this application with reference to the accompanying drawings in embodiments of this application. It is clear that the described embodiments are merely some rather than all of the embodiments of this application.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

In addition, in this application, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this application, unless otherwise explicitly specified and limited, the term "connection" should be understood in a broad sense. For example, the "connection" may be a fixed connection, a detachable connection, or an integrated connection. "Connection" may be a direct connection or an indirect connection through an intermediate medium. In addition, the term "electrical connection" may be a direct electrical connection or an indirect electrical connection through an intermediate medium.

Figures 1, 2:
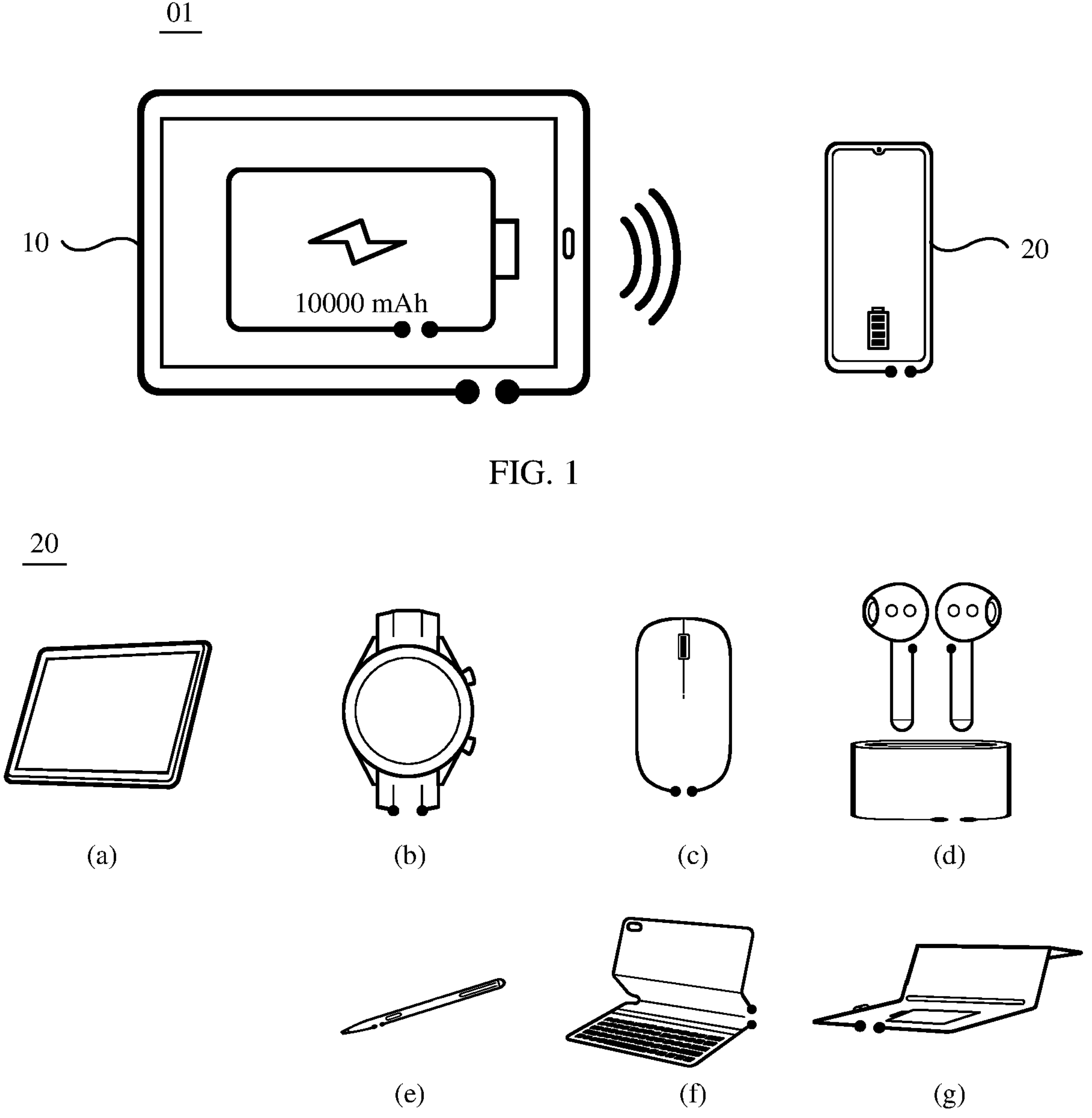
FIG. 1 is a schematic structural diagram of a wireless charging system according to an embodiment of this application.
FIG. 2 is a schematic structural diagram of a second electronic device according to an embodiment of this application.

An embodiment of this application provides a wireless charging system 01 shown in FIG. 1. The wireless charging system 01 may include a first electronic device 10 and a second electronic device 20. The first electronic device 10 may be charged in a wired manner through electrically connected to a charging power supply, or may be charged in a wireless manner through a wireless charging power supply. For ease of description in the following, a charging process of the first electronic device 10 is referred to as forward charging. In addition, when a battery level of the first electronic device 10 is abundant, the first electronic device 10 may charge the second electronic device 20 in a manner of wireless energy transmission. A process in which the first electronic device 10 performs wireless charging on a to-be-charged electronic device, for example, the second electronic device 20, is referred to as wireless reverse charging below.

The first electronic device 10 may include electronic products with a wireless reverse charging function, such as a wireless charging dock, a pad (pad), a notebook computer (for example, ultra-thin or portable), a mobile phone (mobile phone), a wireless charging electric vehicle, a wireless charging small household appliance (for example, a soy milk machine or a floor sweeping robot), and the like. The first electronic device 10 is not specially limited in a particular form in this embodiment of this application. The pad has relatively good portability. Compared with the mobile phone, the battery capacity of the pad is relatively large, for example, may reach more than 10000 mAh. For ease of description, the following uses an example in which the first electronic device 10 is the pad shown in FIG. 1.

In some embodiments of this application, the second electronic device 20 may be an electronic device with a relatively high charging power (≥5 W), such as the mobile phone shown in FIG. 1 or the pad shown in (a) of FIG. 2. Alternatively, in some other embodiments of this application, the second electronic device 20 may be an electronic device with a relatively low charging power (<5 W), such as the smart watch (or smart band) shown in (b) in FIG. 2, the wireless mouse shown in (c) of FIG. 2, the wireless headset shown in (d) of FIG. 2, the stylus shown in (e) of FIG. 2, the leather case with a keyboard shown in (f) of FIG. 2, or the leather case with a battery shown in (g) of FIG. 2.

The leather case with the keyboard shown in (f) of FIG. 2 may be installed on the mobile phone or the pad. After the keyboard on the leather case is powered on, a user may control the mobile phone or the pad in the leather case by operating the keyboard. After the leather case with the battery shown in (g) of FIG. 2 is installed on the mobile phone or the pad, the battery in the leather case may charge the mobile phone or the pad installed in the leather case.

Figure 3:
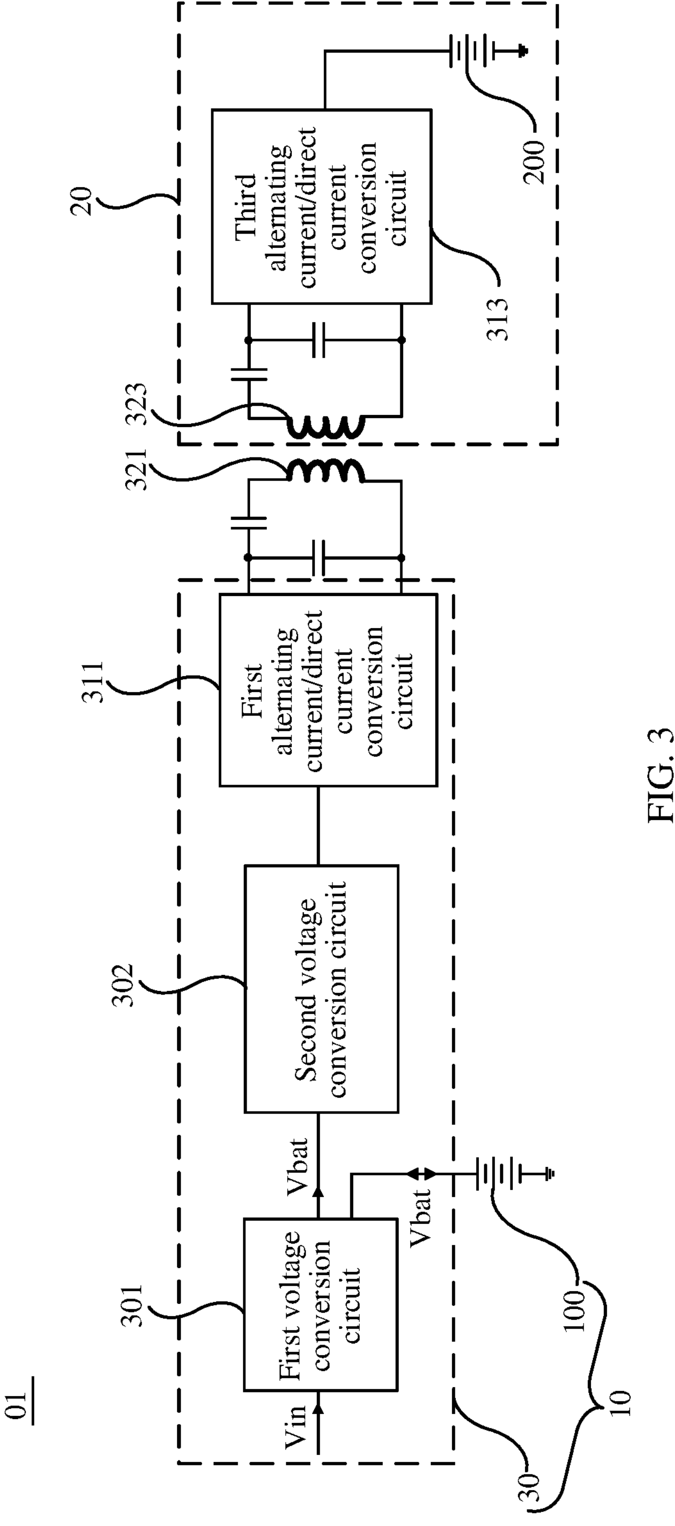
FIG. 3 is a schematic structural diagram of another wireless charging system according to an embodiment of this application.

To enable the electronic device provided in this embodiment of this application, for example, the foregoing first electronic device 10, to charge the second electronic device 20 in a manner of wireless energy transmission, as shown in FIG. 3, the first electronic device 10 may include a wireless charging circuit 30 and a first battery 100. The wireless charging circuit 30 includes some circuit structures, for example, a first voltage conversion circuit 301, a second voltage conversion circuit 302, and a first alternating current/direct current conversion circuit 311. The wireless charging circuit may be integrated into a chip. In addition, the first electronic device 10 may further include a first coil 321.

In some embodiments of this application, the first voltage conversion circuit 301 may be a buck circuit. The first voltage conversion circuit 301 is electrically connected to the first battery 100. When the first battery 100 needs to be charged, the first voltage conversion circuit 301 may transmit a supply voltage Vin (for example, 5 V) provided by a charging power supply (not shown) to the first voltage conversion circuit 301. The first voltage conversion circuit 301 is configured to perform buck processing on the supply voltage Vin, to convert the supply voltage Vin into a first battery voltage Vbat (for example, 3.4 V to 4.4 V) of the first battery 100, to charge the first battery 100.

In addition, when the first electronic device 10 needs to charge the second electronic device 20, the first voltage conversion circuit 301 is further configured to output a first battery voltage Vbat1 (for example, foregoing 3.4 V to 4.4 V) provided by the first battery 100. For example, a switching transistor (not shown) may be disposed in the first voltage conversion circuit 301. A first electrode (for example, a source) and a second electrode (for example, a drain) of the switching transistor are electrically connected to output ends of the first battery 100 and the first voltage conversion circuit 301 respectively. When a gate of the switching transistor is controlled to be turned on, the first battery voltage Vbat1 provided by the first battery 100 may be transmitted to the output end of the first voltage conversion circuit 301 through the switching transistor.

In a process in which the first electronic device 10 performs wireless reverse charging on the second electronic device 20, the larger a charging power output by the first electronic device 10, the faster the wireless reverse charging and the higher a charging efficiency. The charging power W (W=I×V) of the first electronic device 10 is directly proportional to a charging current I of the first electronic device 10 and a charging voltage V of the first electronic device 10. When the charging current I is increased, because a power loss $P_{loss}$ ($P_{loss}=I^2R$) is directly proportional to the square of the charging current I, the larger the charging current I, the greater the power loss, if an impedance R of a charging path between the first electronic device 10 and the second electronic device 20 is unchanged. Therefore, in this application, the charging power W output by the first electronic device 10 may be increased through increasing the charging voltage V of the first electronic device 10.

Based on this, to increase the charging power W output by the first electronic device 10 and improve reverse charging efficiency, the second voltage conversion circuit 302 shown in FIG. 3 is disposed in the wireless charging circuit 30 of the first electronic device 10. The second voltage conversion circuit 302 is electrically connected to the first voltage conversion circuit 301. The second voltage conversion circuit 302 is configured to boost the voltage output by the first voltage conversion circuit 301, to increase the charging voltage V of the first electronic device 10, and further increase the charging power W output by the first electronic device 10.

It should be noted that, the voltage output by the first voltage conversion circuit 301 may be a voltage obtained after the first voltage conversion circuit 301 boosts the supply voltage Vin when the first voltage conversion circuit 301 is electrically connected to the charging power supply used to provide the supply voltage Vin. Alternatively, the voltage output by the first voltage conversion circuit 301 may be the first battery voltage Vbat1 output by the first battery 100.

Based on this, the second voltage conversion circuit 302 is further electrically connected to the first alternating current/direct current conversion circuit 311. The first alternating current/direct current conversion circuit 311 is configured to convert a direct current voltage output by the second voltage conversion circuit 302 into an alternating current voltage. The first coil 321 may be electrically connected to the first alternating current/direct current conversion circuit 311. The first coil 321 is configured to emit an alternating magnetic field after receiving the alternating current voltage output by the first alternating current/direct current conversion circuit 311.

It should be noted that, the alternating current/direct current conversion circuit provided in this embodiment of this application may be a bridge circuit mainly including a plurality of switching transistors, for example, a full bridge circuit. The bridge circuit can convert the direct current voltage to the alternating current voltage or convert the alternating current voltage to the direct current voltage.

In addition, as shown in FIG. 3, the second electronic device 20 includes a second battery 200, a third coil 323, and a third alternating current/direct current conversion circuit 313. The third coil 323 may receive an alternating magnetic field emitted by the first coil 321, and generate an alternating current voltage by induction. The third alternating current/direct current conversion circuit 313 is electrically connected to the third coil 323 and the second battery 200. The third alternating current/direct current conversion circuit 313 may be configured to convert an alternating current voltage induced by the third coil 323 after receiving the alternating current magnetic field into a direct current voltage, and transmit the direct current voltage to the second battery 200, to charge the second battery 200. In this way, the first electronic device 10 can perform wireless reverse charging on the second electronic device 20.

It can be learned from the foregoing description that the second voltage conversion circuit 302 may perform over-boosting on the voltage output by the first voltage conversion circuit 301. Therefore, a voltage peak of the alternating current voltage generated on the first coil 321 is increased, and finally the charging voltage V provided by the first electronic device 10 to the second electronic device 20 is increased. The following describes the structure of the second voltage conversion circuit 302.

Figure 4:
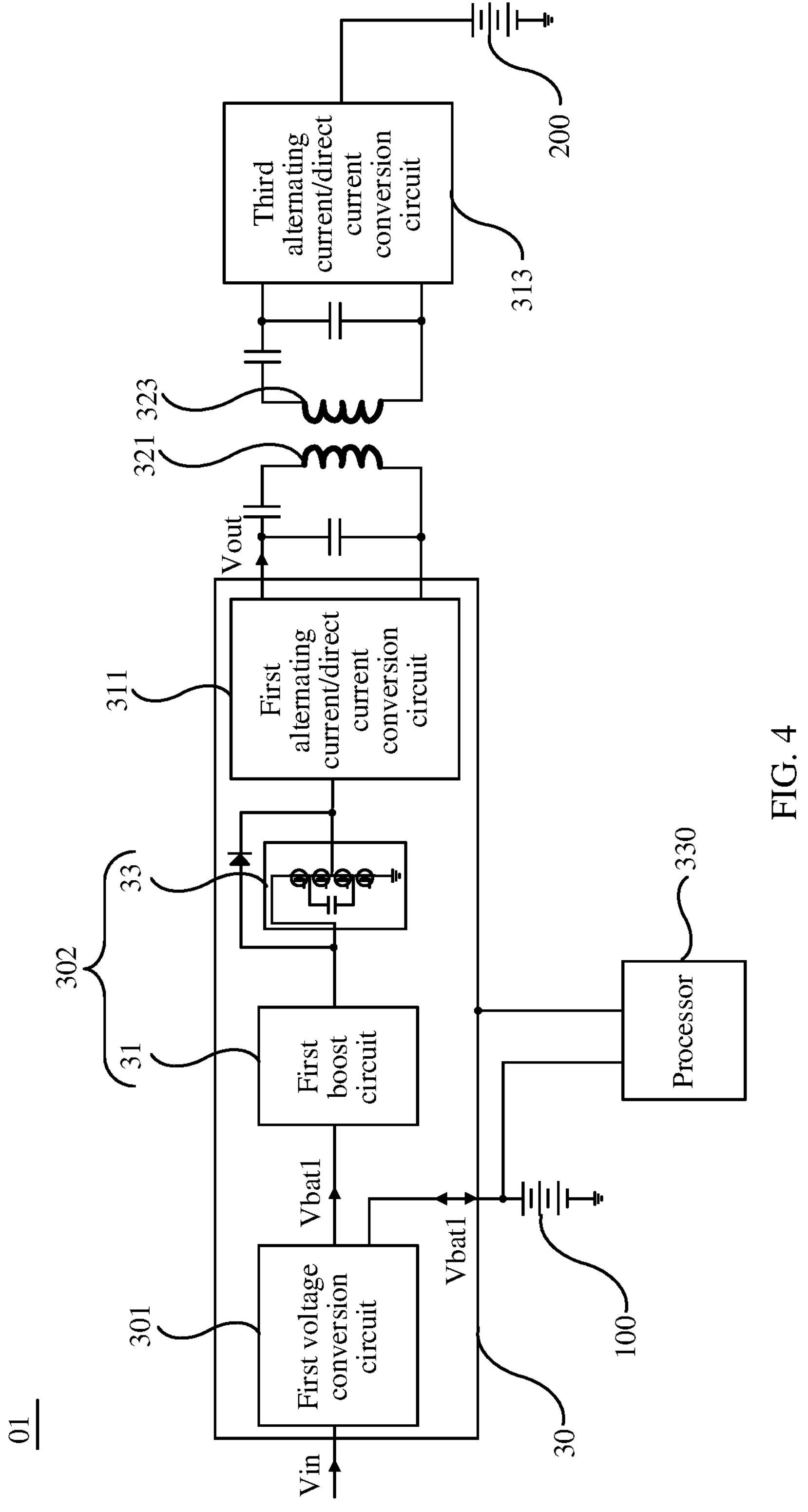
FIG. 4 is a schematic structural diagram of another wireless charging system according to an embodiment of this application.

In some embodiments of this application, as shown in FIG. 4, the second voltage conversion circuit 302 may include a first boost circuit 31. The first boost circuit 31 may operate to boost the input first battery voltage Vbat and then output a voltage obtained by boosting. In this case, an output voltage of the first boost circuit 31 is greater than the input voltage.

The first boost circuit 31 is a direct current-direct current (direct current-direct current, DC-DC) voltage converter with an inductor disposed inside. Due to the inductor, a power loss $P_{loss}$ ($P_{loss}=\Delta U^2/R$) generated by the boost circuit in a boost process is directly proportional to a square of a difference ΔU between an output voltage and an input voltage of the boost circuit.

Figure 5:
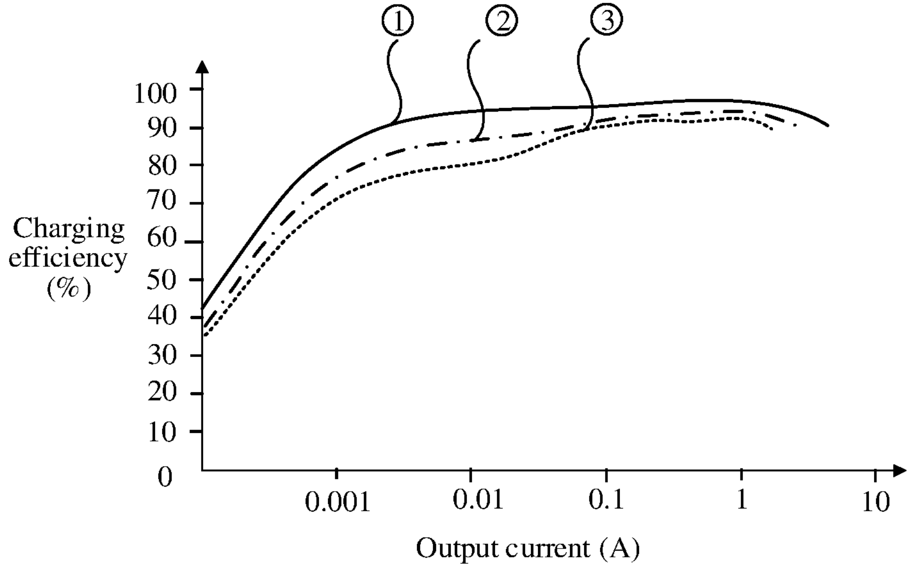
FIG. 5 is a schematic diagram of curves of an output current versus a charging efficiency according to an embodiment of this application.

For example, when the input voltage of the boost circuit keeps the same, as shown in FIG. 5, a curve ①, a curve ②, and a curve ③ are respectively graphs of a voltage conversion efficiency versus an output current of the boost circuit when the output voltage of the boost circuit is 5 V, 9 V, and 12 V. It can be learned from the foregoing three curves that the larger the output voltage of the boost circuit, the larger the difference DU between the output voltage and the input voltage of the boost circuit, and the lower the voltage conversion efficiency of the boost circuit.

For example, when a preset output voltage Vout of the second voltage conversion circuit 302 is 12 V, if the first boost circuit 31 directly converts the first battery voltage Vbat (for example, 3.7 V) into 12 V, ΔU=8.3 V. In this case, it can be learned from the curve ① in FIG. 6 that the voltage conversion efficiency of the first boost circuit 31 corresponding to the highest power of 12 W is 80%, and the voltage conversion efficiency is relatively low. As a result, heat generating of the inductor in the first boost circuit 31 is relatively serious, and a temperature of the first boost circuit 31 may be increased to 144° C.

Therefore, in the second voltage conversion circuit 302 provided in this embodiment of this application, to improve a voltage conversion efficiency of the first boost circuit 31, the difference DU between the output voltage and the input voltage of the first boost circuit 31 may be properly reduced, so that the first boost circuit 31 operates at a voltage conversion efficiency peak or is located near the voltage conversion efficiency peak.

For example, when the preset output voltage Vout of the second voltage conversion circuit 302 is 12 V, the first boost circuit 31 may convert the first battery voltage Vbat (for example, 3.7 V) into 6 V, where ΔU=2.3 V. Compared with the solution of directly boosting the voltage to 12 V, the difference ΔU between the output voltage and the input voltage of the first boost circuit 31 may be reduced by 6 V (8.3 V−2.3 V=6 V). In this case, a maximum output power of the first boost circuit 31 may be increased to 18 W. In addition, when the maximum output power of the first boost circuit 31 is 12 W, the voltage conversion efficiency of the first boost circuit may be 92%, and the voltage conversion efficiency is effectively improved. In this way, a heat generating phenomenon of the inductor in the first boost circuit 31 is reduced, so that the temperature of the first boost circuit 31 is about 86.4° C.

However, after the difference DU between the output voltage and the input voltage of the first boost circuit 31 is reduced, in order to ensure that the output voltage Vout of the second voltage conversion circuit 302 is still 12 V and ensure that the second voltage conversion circuit 302 has a relatively high voltage conversion efficiency, as shown in FIG. 4, the second voltage conversion circuit 302 may further include at least one stage of switched-capacitor direct current converter (charge pump) 33 electrically connected to the first boost circuit 31.

The switched-capacitor direct current transformer 33 mainly includes a plurality of switching transistors and a capacitor that can realize fast charging "flying". For example, the switching transistor may be a metal oxide semiconductor field effect transistor (metal oxide semiconductor field effect transistor, MOSFET). The MOSFET may reach 1 to 2 MHz in a switching frequency, and therefore has a relatively high switching speed, which is beneficial to improving the voltage conversion efficiency of the switched-capacitor direct current transformer 33. In addition, the capacitor in the switched-capacitor direct current transformer 33 may be multi-layer ceramic capacitors (multi-layer ceramic capacitors, MLCC) with a relatively small size and a relatively low cost.

Figure 6:
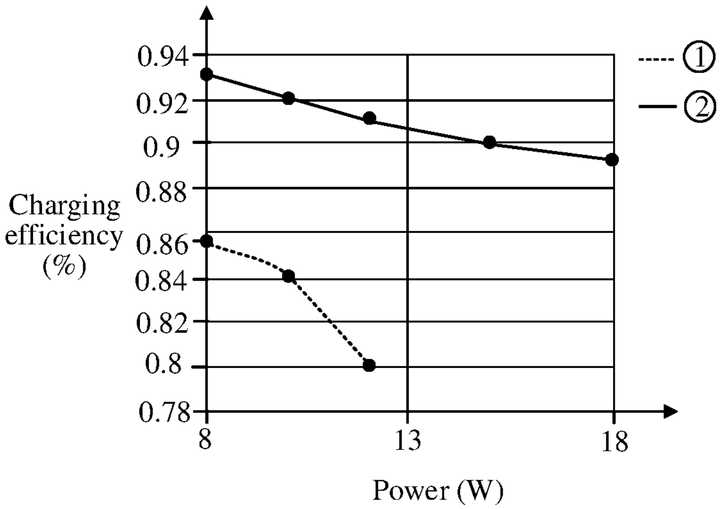
FIG. 6 is a schematic diagram of curves of a power versus a charging efficiency according to an embodiment of this application.

The switched-capacitor direct current converter 33 has no inductor disposed inside, and is a non-inductive DC-DC voltage converter. Therefore, the capacitor may be charged and discharged by controlling an on/off state of the switching transistor in the switched-capacitor direct current converter 33, to boost the input voltage. Because no inductor is disposed in the switched-capacitor direct current transformer 33, the voltage conversion efficiency of the switched-capacitor direct current converter 33 is relatively high and may reach about 97%, so that a voltage conversion efficiency of the entire second voltage conversion circuit 302 may reach 89.24% (92%×97%=89.24%). Based on this, as shown in FIG. 6, the curve ① represents a scheme in which the first battery voltage Vbat (for example, 3.7 V) is converted into 12 V only by the first boost circuit 31. The curve ② represents a scheme in which the first battery voltage Vbat (for example, 3.7 V) is converted into 12 V by the second voltage conversion circuit 302 including the first boost circuit 31 and at least one stage of switched-capacitor direct current converter 33. A difference between the curve ① and the curve ② can be obtained, and the voltage conversion efficiency of the curve ② can be improved by up to 11%. Therefore, during performing wireless reverse charging on the to-be-charged electronic device, the electronic device provided in this embodiment of this application can provide a relatively high charging power, and improve a charging speed of the wireless reverse charging.

In addition, because no inductor is disposed in the switched-capacitor direct current transformer 33, a size of the switched-capacitor direct current transformer 33 is relatively small, and a relatively high power density (power that can be provided by an electronic device per unit area) and a relatively low equivalent series resistance (equivalent series resistance, ESR) can be obtained. In addition, no inductor is disposed in the switched-capacitor direct current transformer 33, so that a noise generated is relatively low, and an electromagnetic interference (electromagnetic interference, EMI) generated to a radio frequency (radio frequency, RF) circuit is relatively small.

It should be noted that, a front-to-back positional relationship between the first boost circuit 31 and the switched-capacitor direct current transformer 33 in the second voltage conversion circuit 302 is not limited in this embodiment of this application. For example, as shown in FIG. 4, the first boost circuit 31 and the at least one stage of switched-capacitor direct current converter 33 may be sequentially electrically connected between the first voltage conversion circuit 301 and the first alternating current/direct current conversion circuit 311. In this case, because the switched-capacitor direct current converter 33 is located at the output end of the first boost circuit 31, a voltage input by the first boost circuit 31 to the switched-capacitor direct current converter 33 is greater than a voltage at an input end of the first boost circuit 31. Therefore, a withstand voltage requirement of the switching transistor in the switched-capacitor direct current converter 33 is higher than a withstand voltage requirement of a switching transistor in the first boost circuit 31, so that the withstand voltage requirement of the switching transistor in the first boost circuit 31 can be reduced.

Figure 7:
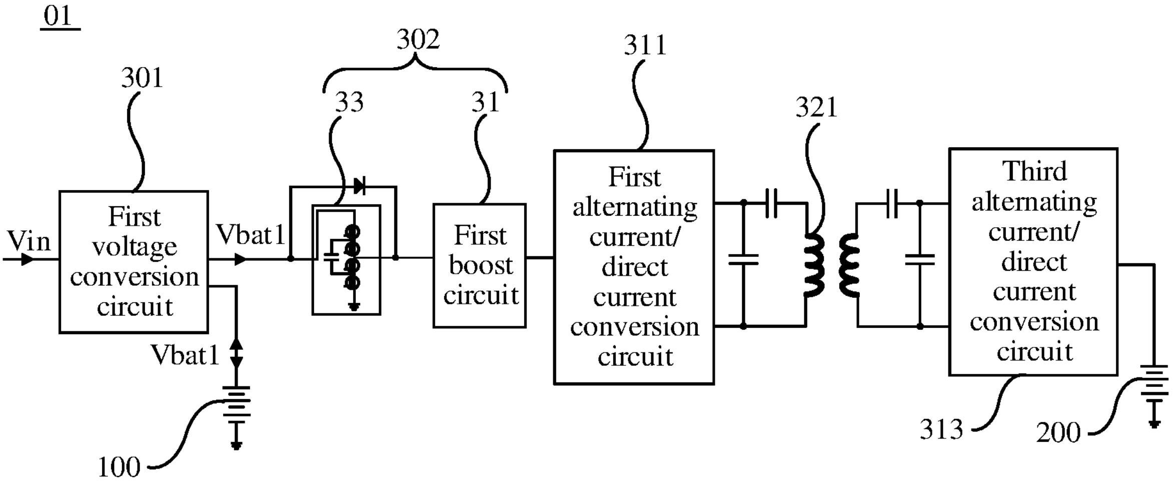
FIG. 7 is a schematic structural diagram of another wireless charging system according to an embodiment of this application.

Alternatively, in some other embodiments of this application, as shown in FIG. 7, the at least one stage of switched-capacitor direct current converter 33 and the first boost circuit 31 may be sequentially electrically connected between the first voltage conversion circuit 301 and the first alternating current/direct current conversion circuit 311. In this case, because the switched-capacitor direct current converter 33 is located at the input end of the first boost circuit 31, a voltage input by the first voltage conversion circuit 301 to the switched-capacitor direct current converter 33 is less than a voltage at the input end of the first boost circuit 31. Therefore, the withstand voltage requirement of the switching transistor in the first boost circuit 31 is higher than the withstand voltage requirement of the switching transistor in the switched-capacitor direct current converter 33.

For ease of description, the following uses an example in FIG. 4 in which the first boost circuit 31 and the at least one stage of switched-capacitor direct current converter 33 may be sequentially electrically connected between the first voltage conversion circuit 301 and the first alternating current/direct current conversion circuit 311.

Figure 8A:
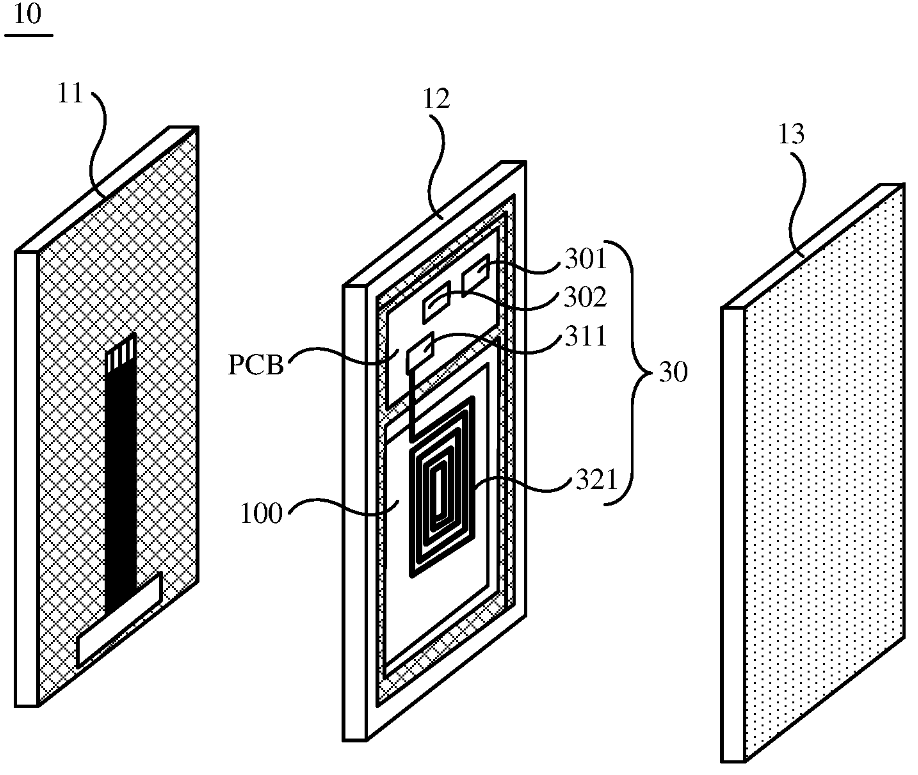
FIG. 8A is a schematic structural diagram of a first electronic device according to an embodiment of this application.

The following describes locations of the wireless charging circuit 30 and the first battery 100 in the first electronic device 10 by way of example. For example, as shown in FIG. 8A, the first electronic device 10 may further include: a display screen 11, a carrying plate 12, a housing 13, and a printed circuit board (printed circuit board, PCB) which may be referred to as a circuit board for short. The PCB and the first battery 100 may be disposed on a side surface that is of the carrying plate 12 and that is close to the housing 13.

It should be noted that, the display screen 11 may be a liquid crystal (liquid crystal, LC) display screen, or an organic light emitting diode (organic light emitting diode, OLED) display screen that can implement self-emitting light. This is not limited in this application.

Figure 8B:
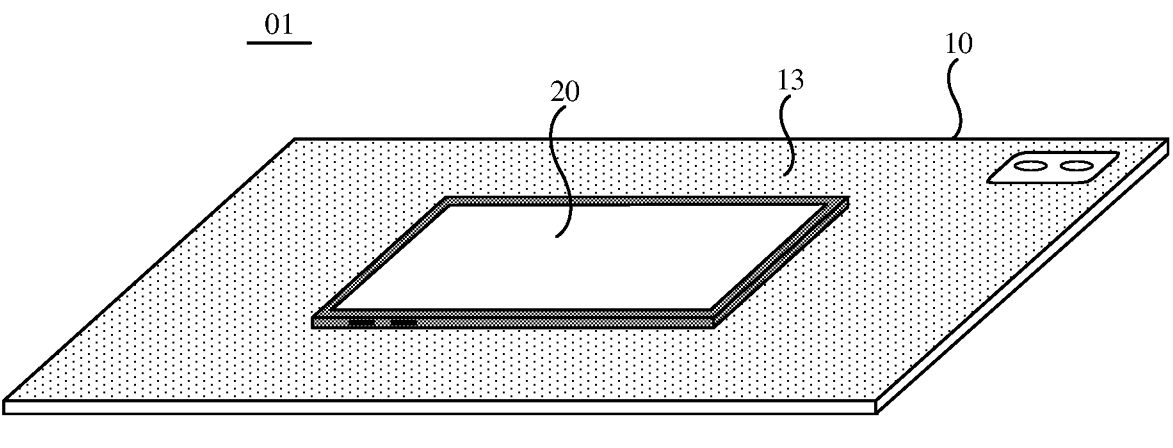
FIG. 8B is a schematic diagram of wireless reverse charging according to an embodiment of this application.

Based on this, the first voltage conversion circuit 301, the second voltage conversion circuit 302, and the first alternating current/direct current conversion circuit 311 in the wireless charging circuit 30 may be disposed on the PCB. In addition, the first coil 321 in the first electronic device 10 may be located on a side that is of the first battery 100 and that faces the housing 13, and is in contact with the housing 13. In this way, when the first electronic device 10 charges the to-be-charged electronic device, for example, the second electronic device 20, as shown in FIG. 8B, the second electronic device 20 may be placed on a back side of the housing 13 of the first electronic device 10. In this way, the alternating magnetic field emitted by the first coil 321 (as shown in FIG. 8A) in the first electronic device 10 may be transmitted to the third coil 323 (as shown in FIG. 4) in the second electronic device 20, for wireless reverse charging.

Figure 9:
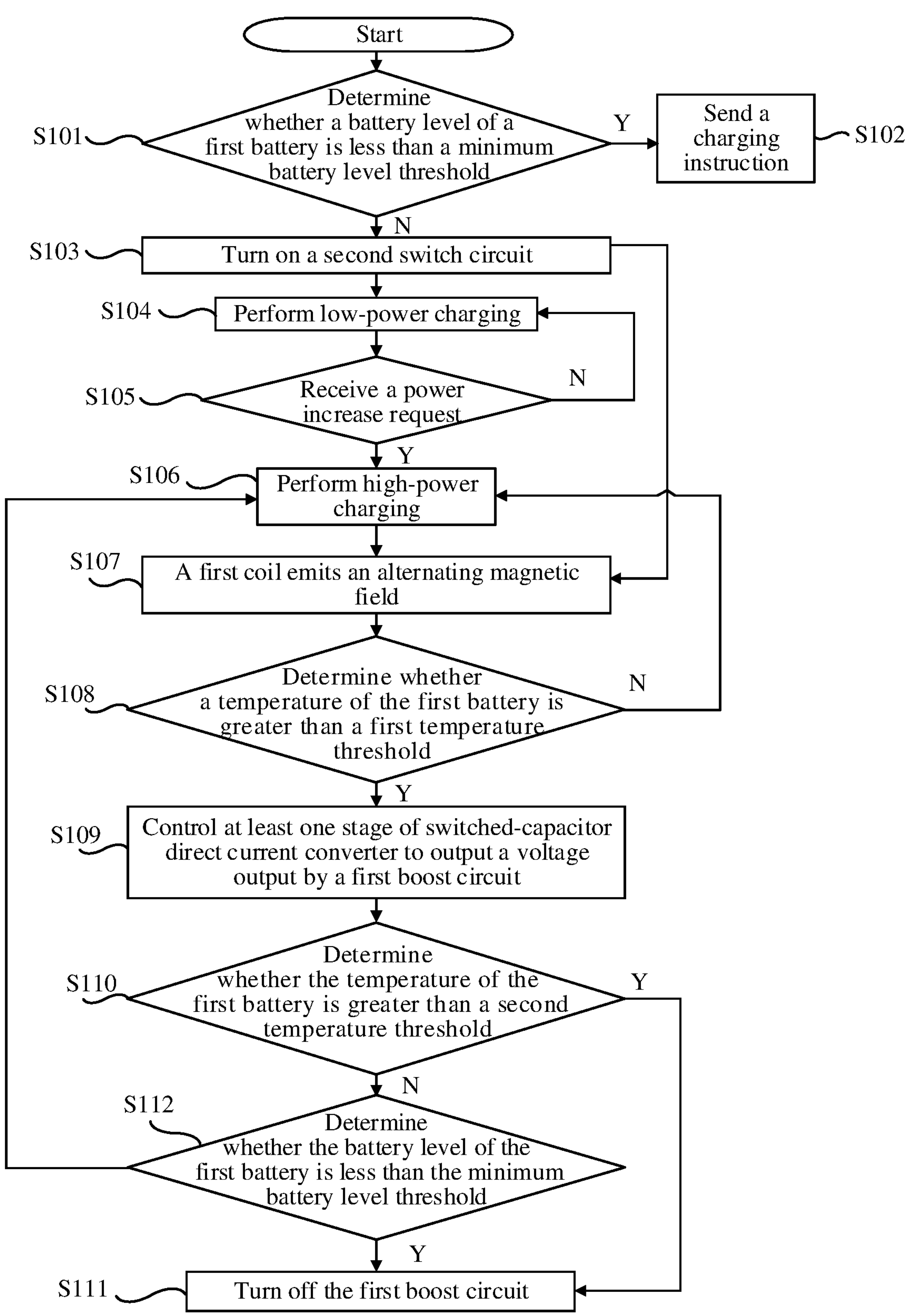
FIG. 9 is a flowchart of a charging control method for an electronic device according to an embodiment of this application.

On this basis, the first electronic device 10 may further include a processor 330 shown in FIG. 4 that is electrically connected to the wireless charging circuit 30 and the first battery 100. The processor 330 may be a central process unit (central process unit, CPU) or a system on a chip (system on a chip, SOC). With reference to the structure of the wireless charging system 01 shown in FIG. 4, the following describes an example in which the processor 330 controls the first electronic device 10 to perform wireless reverse charging on the second electronic device 20 and a method for performing forward charging on the first battery 100 in the first electronic device 10. A control method of the processor is shown in FIG. 9, and may include S101 to S112.

S101: Determine whether a battery level of a first battery 100 is less than a minimum battery level threshold Qth.

When the battery level of the first battery 100 is less than the minimum battery level threshold Qth, the following S102 may be performed. When the battery level of the first battery 100 is greater than the minimum battery level threshold Qth, the following S103 may be performed. The minimum battery level threshold Qth may be a battery level corresponding to the first battery 100 when the battery voltage of the first battery 100 is 3.4 V.

S102: Send a charging instruction.

The charging instruction indicates a first electronic device 10 to send low battery level indication information, where the low battery level indication information indicates that the battery level of the first battery 100 is less than the minimum battery level threshold. The low battery level indication information may be pattern or text information displayed through a display screen of the first electronic device 10. Alternatively, the low battery level indication information may be a low battery level warning sound sent by the first electronic device 10. When receiving the low battery level indication information, the user may perform forward charging on the first electronic device 10 through a charging power supply. A forward charging process performed by a first battery 100 is described below by way of an example in which a second voltage conversion circuit 302 has one stage of switched-capacitor direct current converter 33.

Figure 10:
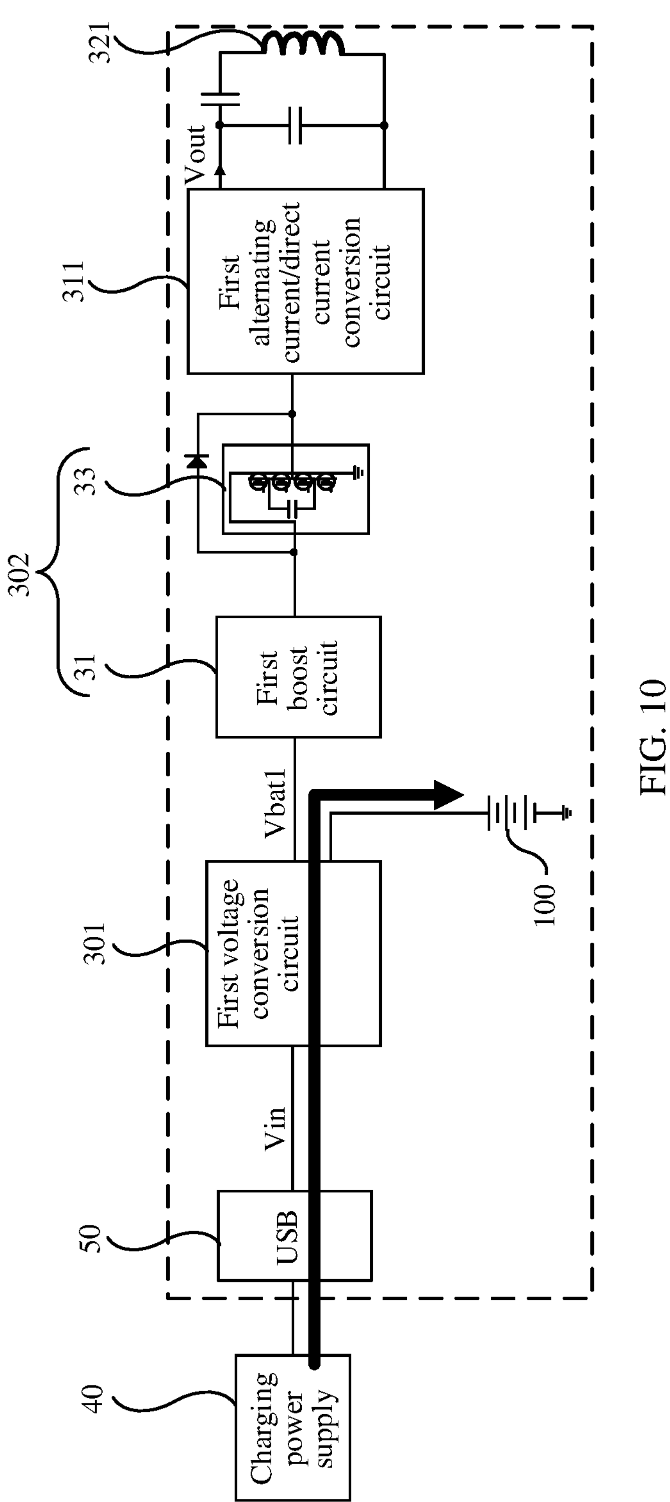
FIG. 10 is a schematic structural diagram of another first electronic device according to an embodiment of this application.

In some embodiments of this application, the first electronic device 10 may include a universal serial bus (universal serial bus, USB) interface 50 shown in FIG. 10. In this case, a charging power supply 40 (for example, an adapter) configured to provide a supply voltage Vin may be electrically connected to a first voltage conversion circuit 301 in the first electronic device 10 through the USB interface. In addition, the foregoing processor 330 may be electrically connected to the first voltage conversion circuit 301, to control the first voltage conversion circuit 301 to convert the supply voltage Vin into a first battery voltage Vbat1 of the first battery 100, and charge the first battery 100. The charging power supply 40 may be configured to convert an alternating current of 220 V into the supply voltage Vin (for example, 5 V).

Figure 11A:
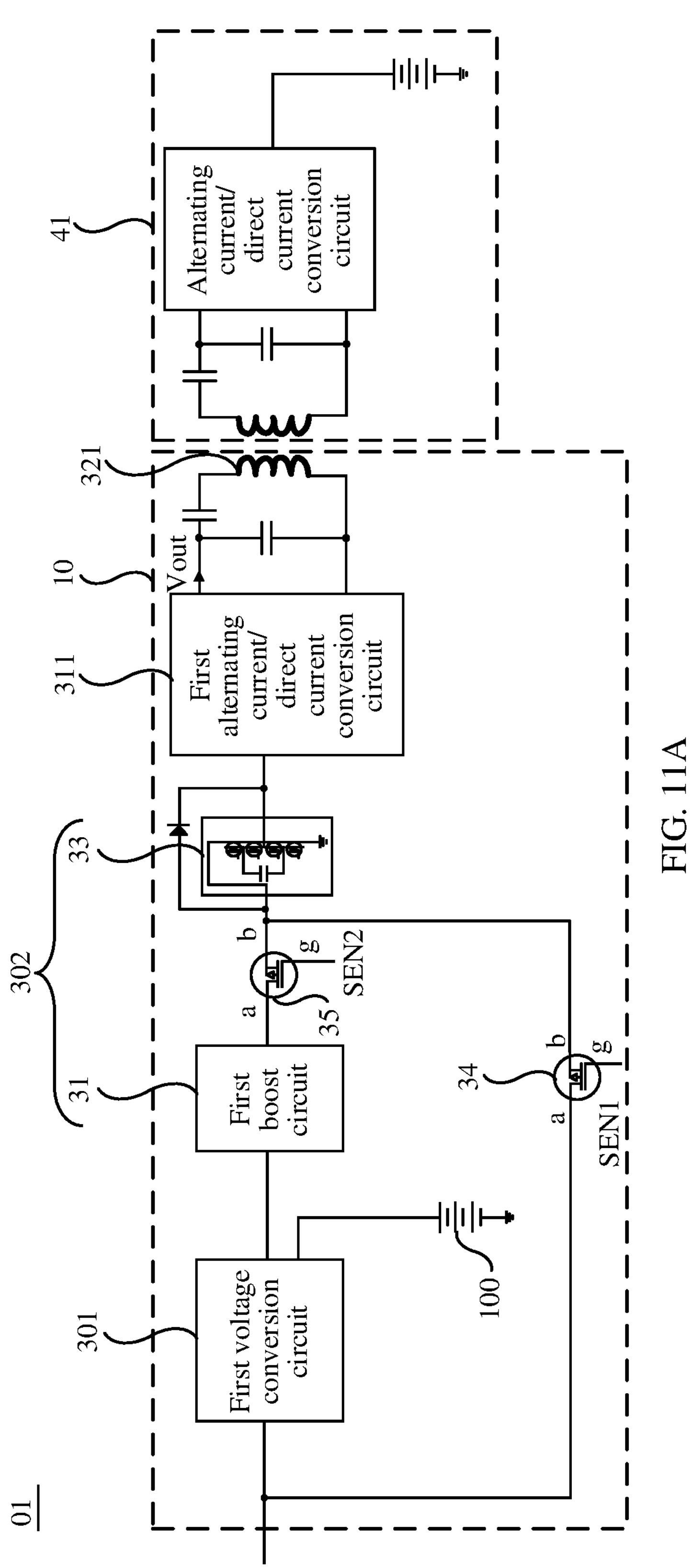
FIG. 11A is a schematic structural diagram of another wireless charging system according to an embodiment of this application.

Alternatively, in some other embodiments of this application, as shown in FIG. 11A, a wireless charging power supply 41, for example, a wireless charging dock, may be used to perform forward charging on the first electronic device 10 in a manner of wireless energy transmission. The wireless charging power supply 41 has a coil and an alternating current/direct current conversion circuit. In addition, a wireless charging circuit in the first electronic device 10 further includes a first switch circuit 34.

For example, a control end g of the first switch circuit 34 may be electrically connected to the processor 330 (as shown in FIG. 4), to receive a first switch control signal SEN1 sent by the processor 330. A first end a of the first switch circuit 34 is electrically connected to an input end of the first voltage conversion circuit 301. In addition, the switched-capacitor direct current converter 33 is electrically connected between a second end b of the first switch circuit 34 and a first alternating current/direct current conversion circuit 311. The first switch circuit 34 is configured to be turned on or off based on the first switch control signal SEN1.

In this case, when the wireless charging power supply 41 is disposed at a location of a first coil 321 of the first electronic device 10, the alternating current/direct current conversion circuit in the wireless charging power supply 41 may convert a direct current voltage of the battery into an alternating current voltage, and transmit the alternating current voltage to the coil to generate an alternating magnetic field. In addition, the first coil 321 is further configured to receive the alternating magnetic field, and induce to generate an alternating current voltage. The first alternating current/direct current conversion circuit 311 is further configured to convert the alternating current voltage induced by the first coil 321 into a direct current voltage.

On this basis, the control method of the processor 330 includes: outputting the first switch control signal SEN1 to the control end g of the first switch circuit 34, to control the first switch circuit 34 to be turned on, and electrically connect the switched-capacitor direct current converter 33 electrically connected between the second end b of the first switch circuit 34 and the first alternating current/direct current conversion circuit 311 to the input end of the first voltage conversion circuit 301. In addition, the switched-capacitor direct current converter 33 electrically connected between the second end b of the first switch circuit 34 and the first alternating current/direct current conversion circuit 311 is controlled to operate in a by pass (by pass) mode. In this case, the switched-capacitor direct current converter 33 is equivalent to a wire, and may transmit the direct current voltage output by the first alternating current/direct current conversion circuit 311 to the first switch circuit 34 in a direction shown by the arrow in FIG. 11B.

Figure 11B:
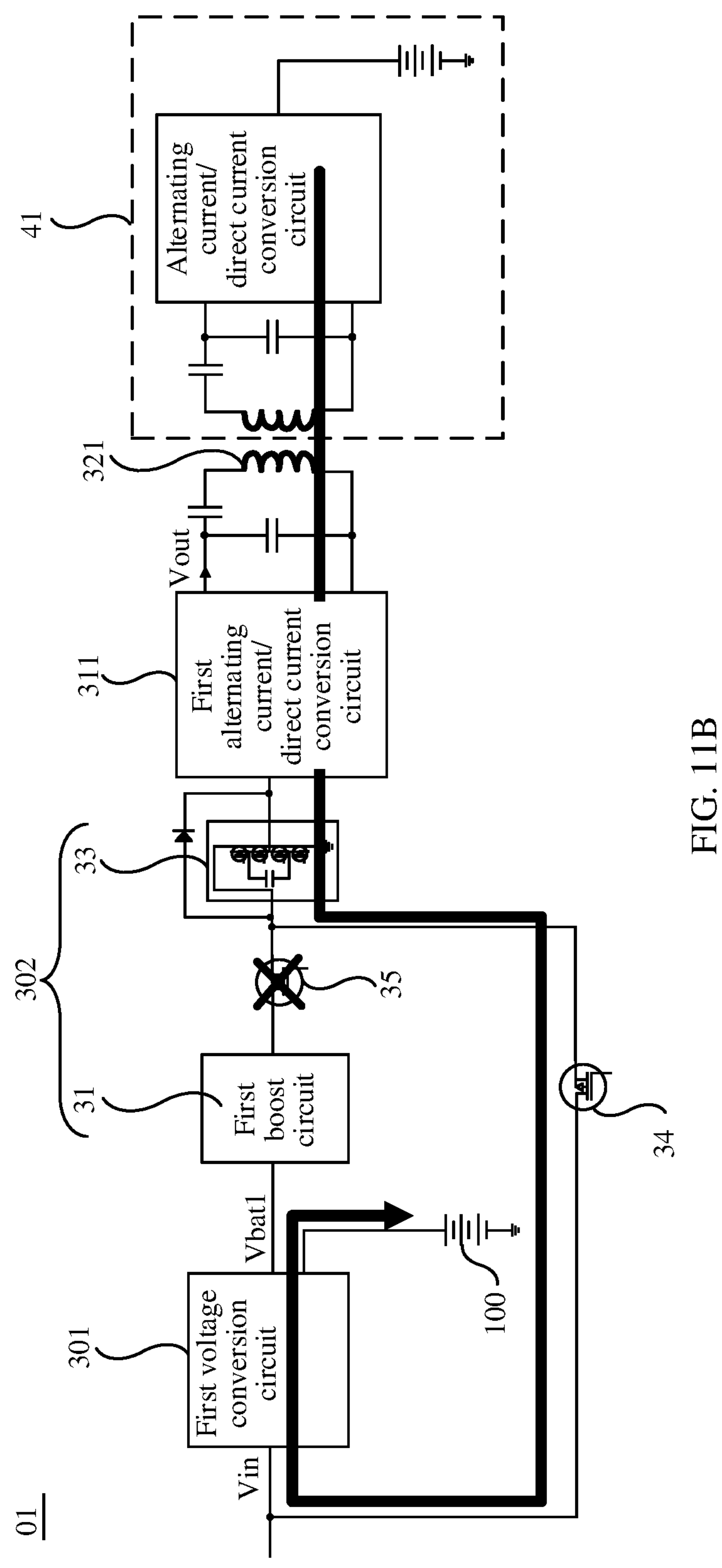
FIG. 11B is a schematic diagram of a control process of the wireless charging system in FIG. 11A.

In addition, because the first switch circuit 34 is in the on state, the direct current voltage output by the first alternating current/direct current conversion circuit 311 is used as the supply voltage Vin, and is transmitted to the input end of the first voltage conversion circuit 301 passing through the turned-on first switch circuit 34 in the direction shown by the arrow in FIG. 11B. In this way, the first voltage conversion circuit 301 may convert, under a control of the processor 330, the supply voltage Vin into the first battery voltage Vbat1 of the first battery 100, to charge the first battery 100.

When the wireless charging power supply 41 performs forward charging on the first electronic device 10, the first electronic device 10 cannot perform reverse charging on another to-be-charged electronic device, as a result, the processor 330 may control the first boost circuit 31 in the second voltage conversion circuit 302 to be in a turned off state. In addition, the wireless charging circuit in the first electronic device 10 may further include a second switch circuit 35 shown in FIG. 11A. Therefore, damage to the switching transistor in the first boost circuit 31, after the relatively large direct current voltage output by the first alternating current/direct current conversion circuit 311 passing through the switched-capacitor direct current converter 33 when a voltage withstand capability of a switching transistor in the first boost circuit 31 is relatively weak, is avoided. A control end g of the second switch circuit 35 is electrically connected to the processor 330 (as shown in FIG. 4), to receive a second switch control signal SEN2 sent by the processor 330. A first end a of the second switch circuit 35 may be electrically connected to the first boost circuit 31. A second end b of the second switch circuit 35 may be electrically connected to at least one stage of switched-capacitor direct current converter 33. The second switch circuit 35 is configured to be turned on or off based on the second switch control signal SEN2.

The second switch circuit 35 is in an off state by default, and the processor 330 outputs the second switch control signal SEN2 to the control end g of the second switch circuit 35, to control the second switch circuit 35 to be in a cut-off state. In this way, in a default state, the first electronic device 10 does not perform reverse charging. It can be ensured that a battery level of the first electronic device 10 is controllable. In addition, when the wireless charging power supply 41 performs forward charging on the first electronic device 10, the processor 330 may output the second switch control signal SEN2 to the control end g of the second switch circuit 35, to control the second switch circuit 35 to be in the off state as shown in FIG. 11B. In this way, damage to the switching transistor in the first boost circuit 31, due to a too large direct current voltage output by the switched-capacitor direct current converter 33 in the direction shown by the arrow in FIG. 11B during the foregoing forward charging, can be avoided.

It should be noted that, for ease of description in this embodiment of this application, a symbol "x" is added to a switch circuit in an off state in the accompanying drawing.

The foregoing describes a manner of connection of the second end b of the first switch circuit 34 by way of an example in which the switched-capacitor direct current converter 33 is electrically connected between the second end b of the first switch circuit 34 and the first alternating current/direct current conversion circuit 311 as shown in FIG. 11A. It can be learned from the foregoing description that, in a process in which the wireless charging power supply 41 charges the first electronic device 10, the switched-capacitor direct current converter 33 operates in a by pass mode, and is equivalent to a wire. In this case, the switched-capacitor direct current converter 33 itself has a specific resistance. Therefore, after the direct current voltage output by the first alternating current/direct current conversion circuit 311 passes through the switched-capacitor direct current converter 33, a voltage value is reduced, so that a withstand voltage value of the switching transistor in the first switch circuit 34 configured to receive the direct current voltage can be reduced.

Figure 12:
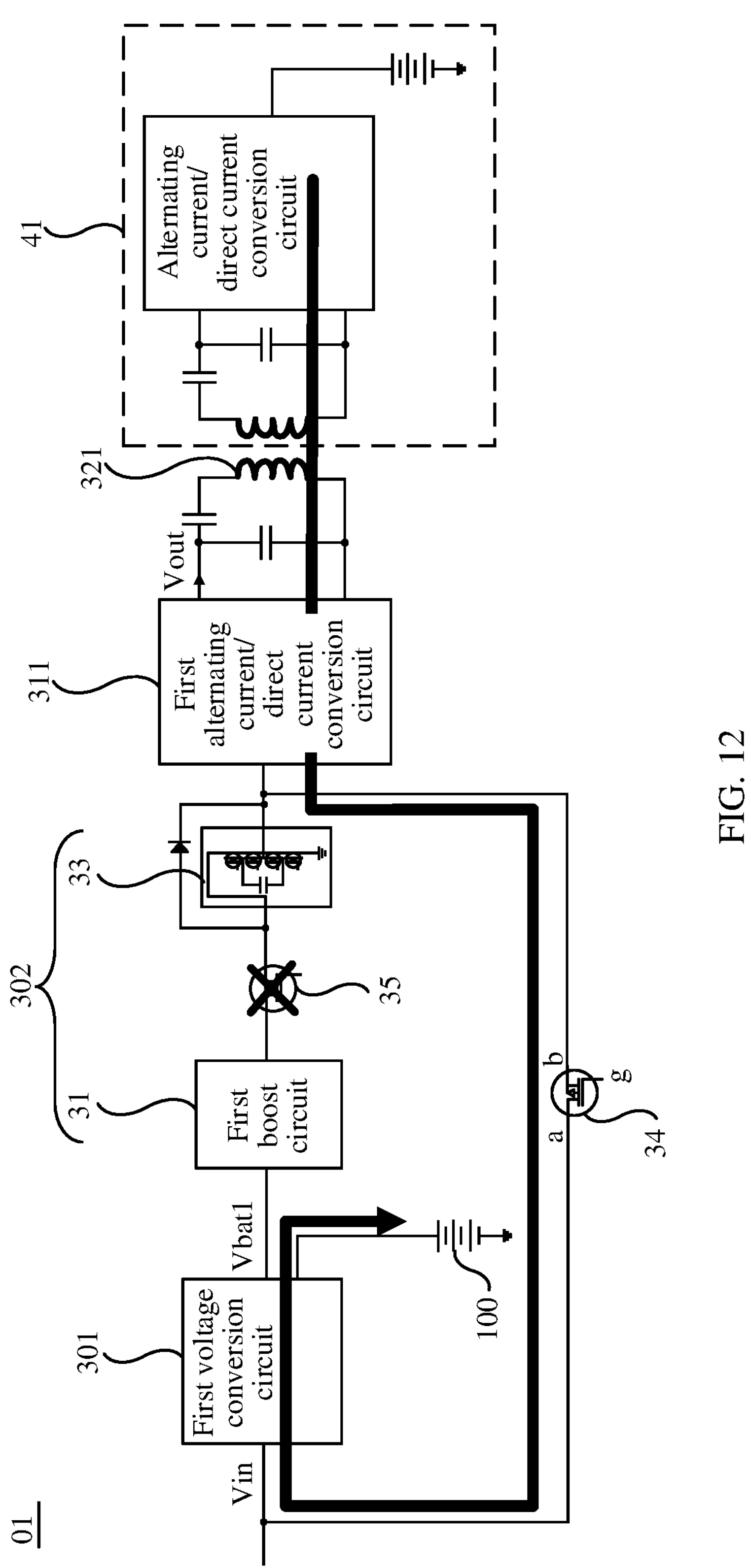
FIG. 12 is a schematic diagram of another control process of the wireless charging system in FIG. 11A.

Alternatively, for another example, when a first electronic device 10 includes a first switch circuit 34 shown in FIG. 12, a manner of connection between a control end g and a first end a of the first switch circuit 34 is the same as that in FIG. 11A. Except that, as shown in FIG. 12, a second end b of the first switch circuit 34 is electrically connected between a first alternating current/direct current conversion circuit 311 and a switched-capacitor direct current converter 33. In this way, when a wireless charging power supply 41 performs forward charging on the first electronic device 10, a direct current voltage output by the first alternating current/direct current conversion circuit 311 may be directly transmitted to the first switch circuit 34 in a direction shown by the arrow in FIG. 12, without passing through the first switch circuit 34. In this case, a relatively high withstand voltage requirement is imposed on a switching transistor in the first switch circuit 34.

It should be noted that, the manner of connection of the second end b of the first switch electrical circuit 34 is not limited in this application. The manner of connection may be that shown in FIG. 11A, or may be that shown in FIG. 12. For ease of description, the following uses the manner shown in FIG. 11A as an example for description.

Figure 13A:
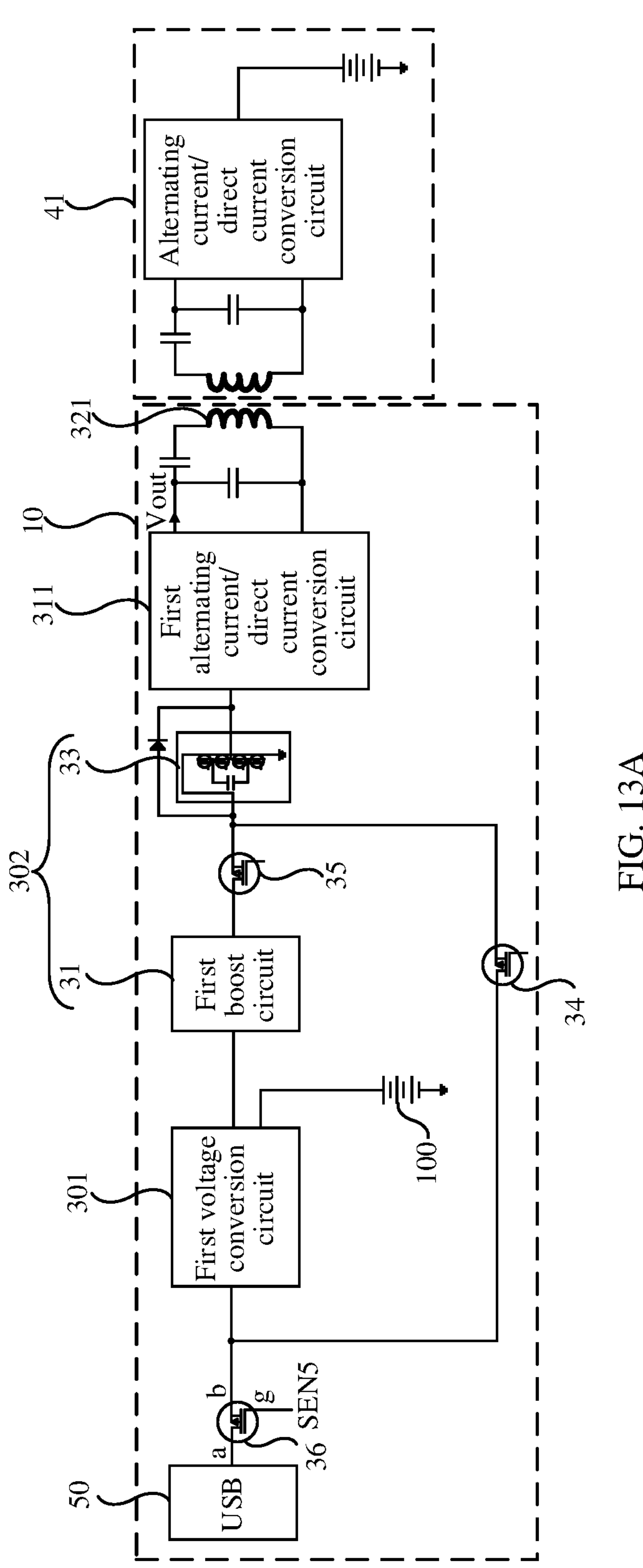
FIG. 13A is a schematic structural diagram of another wireless charging system according to an embodiment of this application.

It can be learned from the foregoing description that, when forward charging is performed on the first electronic device 10, as shown in FIG. 10, a charging power supply 40 (for example, an adapter) can perform forward charging on the first electronic device 10 through a USB interface in a wired manner. Alternatively, as shown in FIG. 11A, forward charging may be performed on the first electronic device 10 through a wireless charging power supply 41 (for example, a charging dock) in a wireless manner. Based on this, to avoid a conflict between wireless and wireless forward charging, a wireless charging circuit in the first electronic device 10 may further include a fifth switch circuit 36 shown in FIG. 13A. A control end g of the fifth switch circuit 36 is electrically connected to a processor 330 (as shown in FIG. 4), to receive a fifth switch control signal SEN5 sent by the processor 330. A first end a of the fifth switch circuit 36 is electrically connected to the USB interface 50, and a second end b of the fifth switch circuit 36 is electrically connected to an input end of a first voltage conversion circuit 301. The fifth switch circuit 36 is configured to be turned on or off based on the fifth switch control signal SEN5.

Figure 13B:
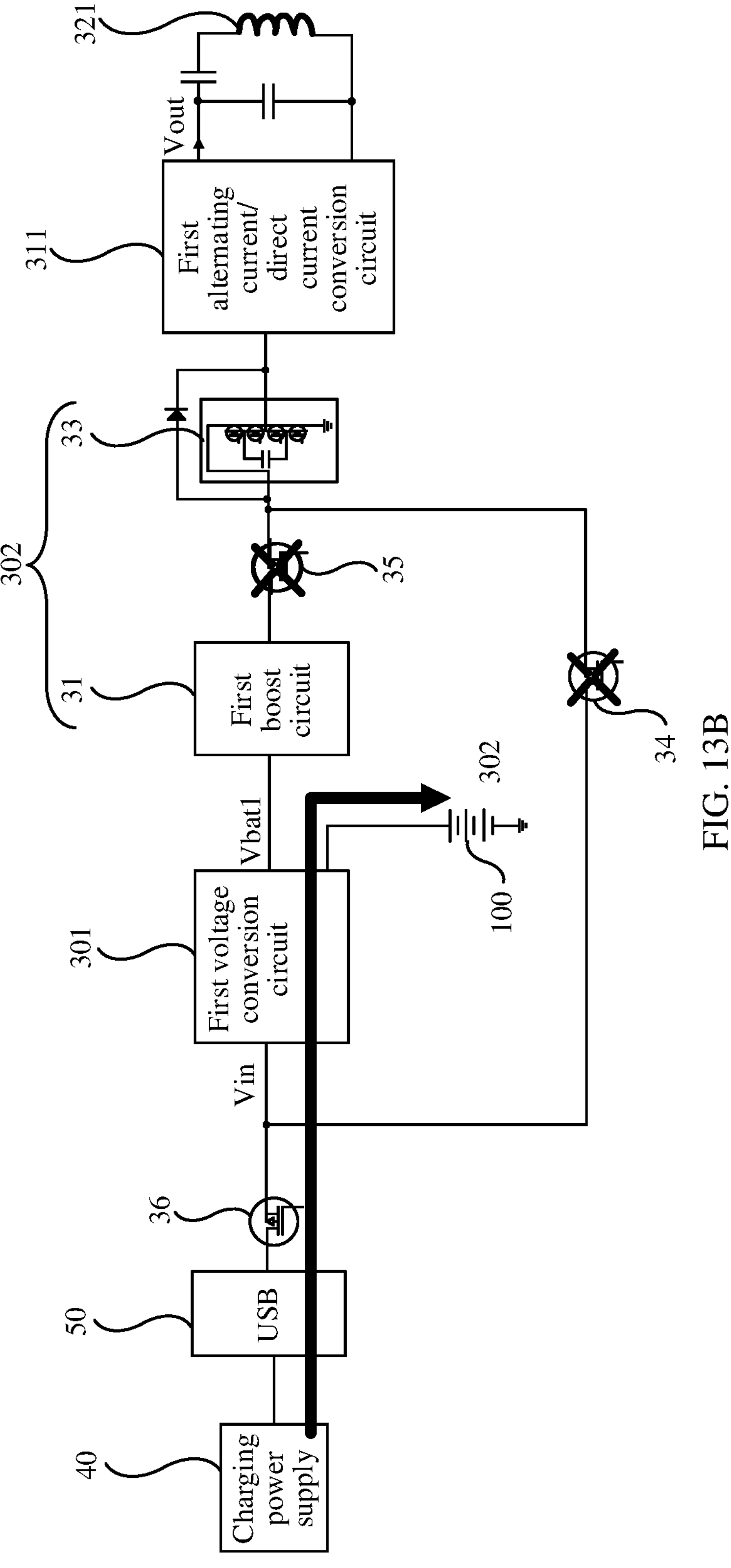
FIG. 13B is a schematic diagram of a control process of the wireless charging system in FIG. 13A.

In this case, as shown in FIG. 13B, the USB interface 50 is electrically connected to an external device and identifies the type of the external device. For example, when the USB interface 50 is a Type-C interface, a CC pin specified according to a Type-C interface protocol is disposed in the Type-C interface. The CC pin can identify the type of the external device connected.

If the USB identifies that the external device is the charging power supply 40, the charging power supply 40 may perform forward charging on the first electronic device 10. In this case, the control method of the processor 330 may include: First, the processor 330 may generate the foregoing first switch control signal SEN1 and the foregoing fifth switch control signal SEN5 based on a result of identifying the type of the external device by the USB interface 50. Next, the processor 330 may output the first switch control signal SEN1 to the control end g of the first switch circuit 34, to control the first switch circuit 34 to be in an off state. In addition, the processor 330 outputs the fifth switch control signal SEN5 to the control end g of the fifth switch circuit 36, to control the fifth switch circuit 36 to be turned on, and electrically connect the USB interface 50 to the input end of the first voltage conversion circuit 301. In this way, a supply voltage Vin provided by the charging power supply 40 is transmitted to the input end of the first voltage conversion circuit 301 through the fifth switch circuit 36 in a direction shown by the arrow in FIG. 13B, to charge the first battery 100. In this case, the processor 330 may control the second switch circuit 35 to be in the off state as shown in FIG. 13B.

Figure 13C:
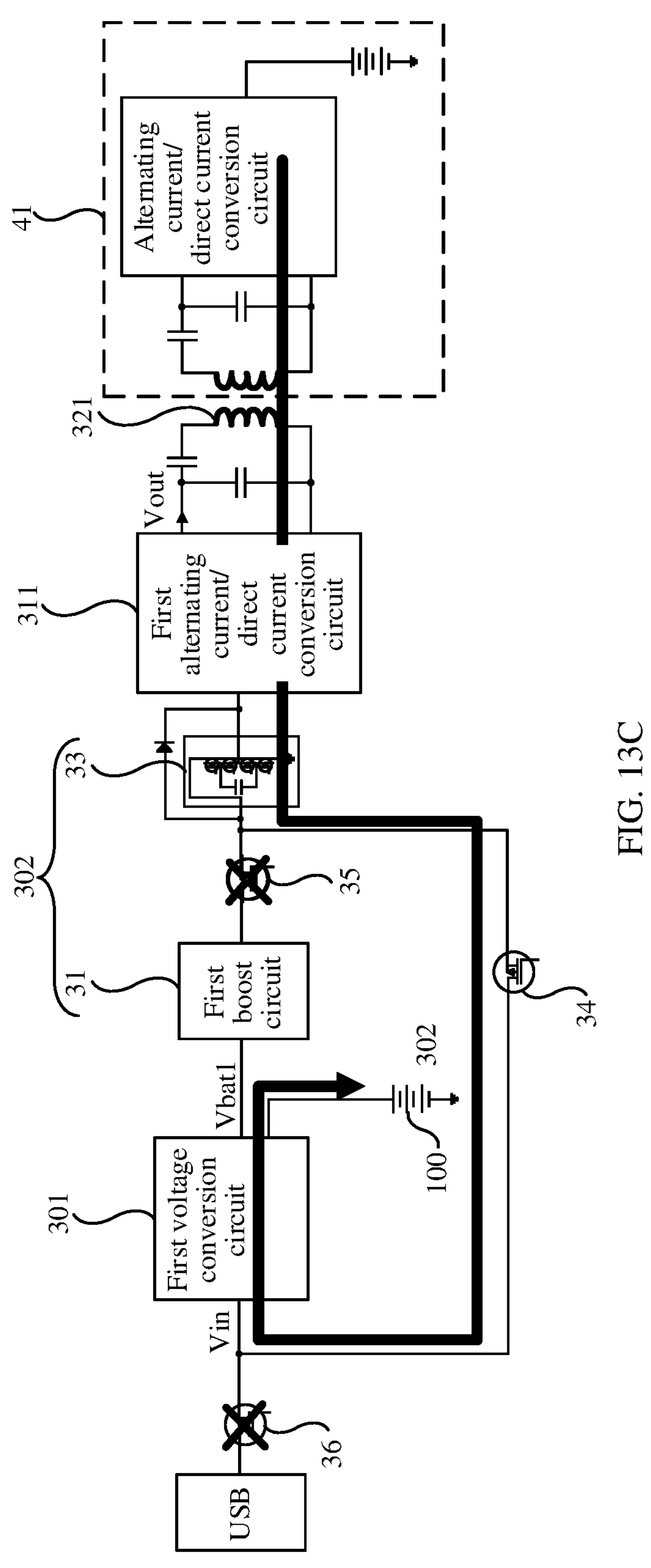
FIG. 13C is a schematic diagram of another control process of the wireless charging system in FIG. 13A.

Alternatively, as shown in FIG. 13C, when the wireless charging power supply 41 is used to perform forward charging on the first electronic device 10, the control method of the processor 330 may include: generating the first switch control signal SEN1 and the fifth switch control signal SEN5 if the wireless charging power supply 41 (for example, a wireless charging dock) exists at a location of the first coil 321. For example, when the first electronic device 10 is located on the wireless charging power supply 41 that is used as the wireless charging dock, the wireless charging power supply 41 may perform wireless signal communication with the first electronic device 10. In this way, the wireless charging power supply 41 can send an in-position signal to the processor 330 of the first electronic device 10, so that the processor 330 generates the first switch control signal SEN1 and the fifth switch control signal SEN5 based on the in-position signal.

Next, the processor 330 may output the first switch control signal SEN1 to the control end g of the first switch circuit 34, to control the first switch circuit 34 to be in an on state. In addition, the fifth switch control signal SEN5 is output to the control end g of the fifth switch circuit 36, to control the fifth switch circuit 36 to be in an off state. In addition, the processor 330 may control the second switch circuit 35 to be in the off state as shown in FIG. 13B. In this case, a voltage provided by the wireless charging power supply 41 may be transmitted to the input end of the first voltage conversion circuit 301 passing through the first switch circuit 34 in a direction shown by the arrow in FIG. 13C. The first voltage conversion circuit 301 may convert the direct current voltage output by the first alternating current/direct current conversion circuit 311 into a first battery voltage of the first battery 100, and apply the first battery voltage to the first battery 100 for charging the first battery 100.

Forward charging is performed on the first electronic device 10 in the foregoing manner, so that a battery level of the first battery 100 is greater than a minimum battery level threshold QLtn. In this case, the following S103 shown in FIG. 9 may be performed.

S103: Turn on the second switch circuit 35.

It can be learned from the foregoing description that, to ensure that a battery level of the first electronic device 10 itself is controllable, the second switch circuit 35 is in an off state by default before S103 is performed. Based on this, a first electronic device 10 being a pad is used as an example. To facilitate a user to control when the first electronic device 10 performs a reverse charging function, in some embodiments of this application, as shown in FIG. 14C, a corresponding reverse charging control button 52 may be disposed in a display interface of the first electronic device 10. When the battery level of the first battery 100 is greater than the minimum battery level threshold QLth, the user may trigger the reverse charging control button 52 to perform a control operation. The control operation is for controlling the first battery 100 in the first electronic device 10 to discharge.

Next, the processor 330 in the first electronic device 10 receives the foregoing control operation of the user, and generates the first switch control signal SEN1 and the second switch control signal SEN2 based on the control operation. The processor 330 outputs the second switch control signal SEN2 to the control end g of the second switch circuit 35 shown in FIG. 14A, so that the second switch circuit 35 is in an on state. In this case, the second switch circuit 35 may electrically connect the first boost circuit 31 to the at least one stage of switched-capacitor direct current converter 33 that is electrically connected between the second end b of the second switch circuit 35 and the first alternating current/direct current conversion circuit 311.

In this case, the second electronic device 20 serving as a to-be-charged electronic device is located at the first coil 321 in the first electronic device 10. The first electronic device 10 may perform reverse charging on the second electronic device 20. Therefore, the first electronic device 10 cannot perform the foregoing forward charging in a wireless charging manner. Therefore, the processor 330 may output the first switch control signal SEN1 to the control end g of the first switch circuit 34 shown in FIG. 14A, to control the first switch circuit 34 to be turned off.

The foregoing describes an example in which the user directly triggers the reverse charging control button 52 to perform the control operation. Alternatively, in some other embodiments of this application, the processor 330 may send a detection signal before the processor 330 receives the control operation of the user. The detection signal is for connecting the first electronic device 10 and the to-be-charged electronic device (for example, the second electronic device 20). For example, the detection signal may be transmitted through Bluetooth. Next, the processor 330 may output instruction request information in an information prompt box 53 shown in FIG. 14D, if the first electronic device 10 and the to-be-charged electronic device are successfully wirelessly connected. The instruction request information indicates the user to perform the control operation. In this case, the user may trigger a “Y” button in the information prompt box 53 to perform the foregoing control operation. After receiving the control operation of the user, the processor 330 generates the first switch control signal SEN1 and the second switch control signal SEN2, as described above.

Figure 14A:
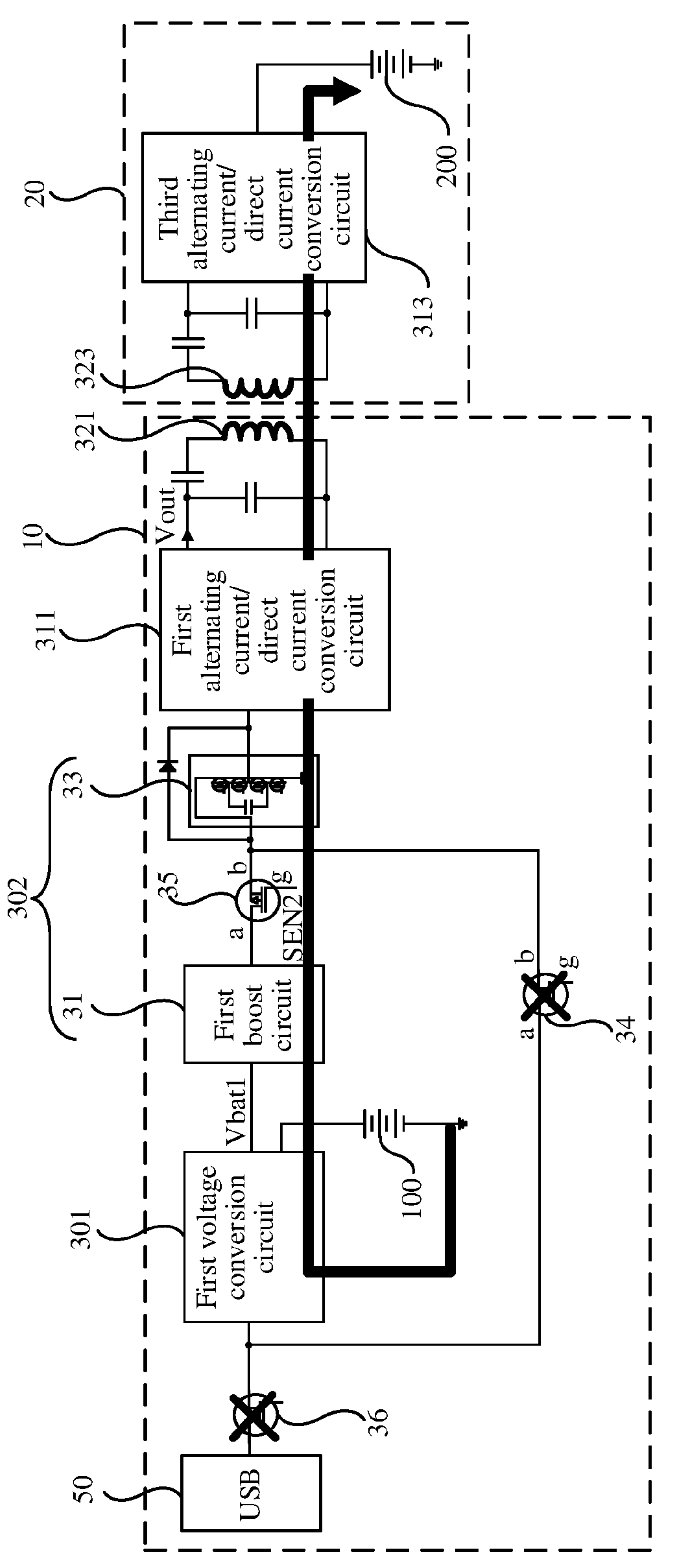
FIG. 14A is a schematic diagram of another control process of the wireless charging system in FIG. 13A.
Figure 14B:
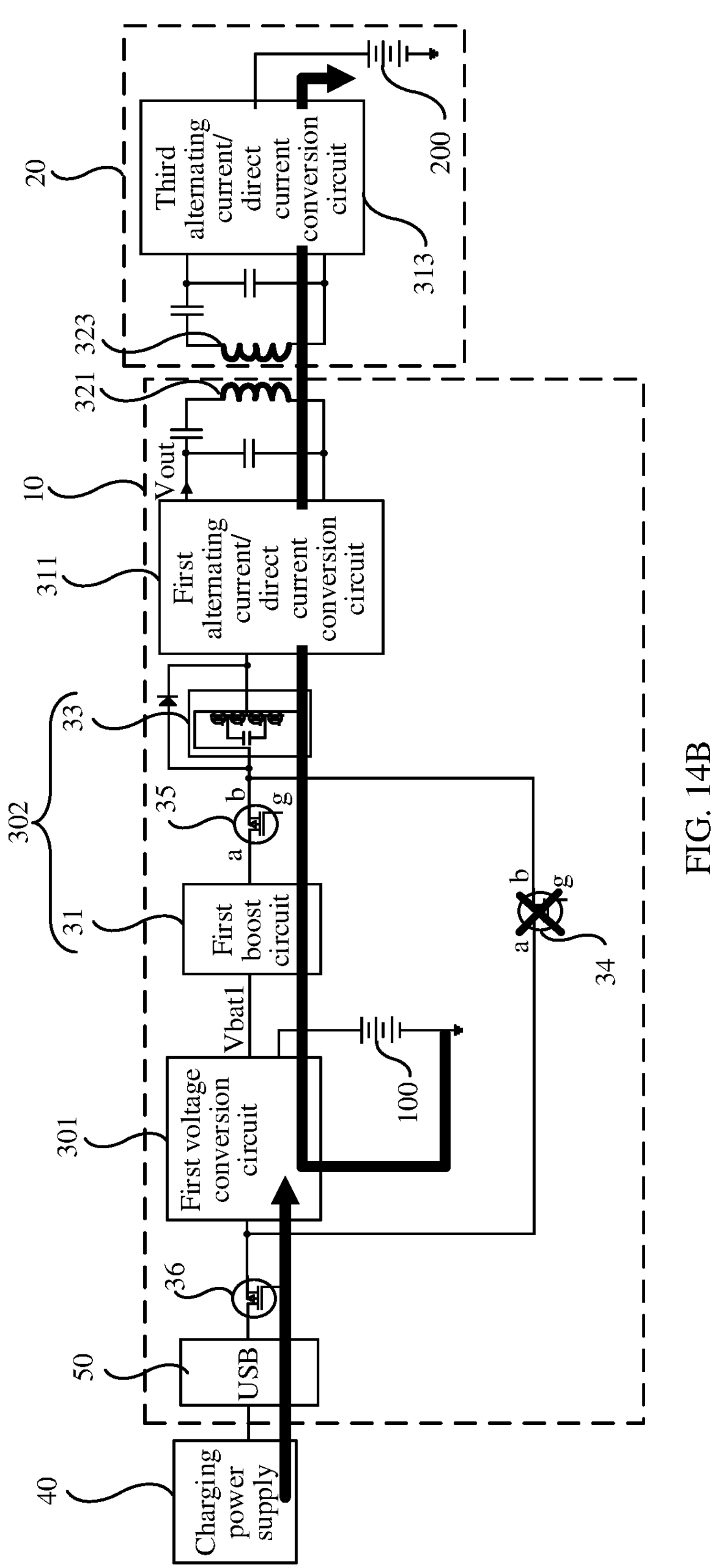
FIG. 14B is a schematic diagram of another control process of the wireless charging system in FIG. 13A.
Figure 14C:
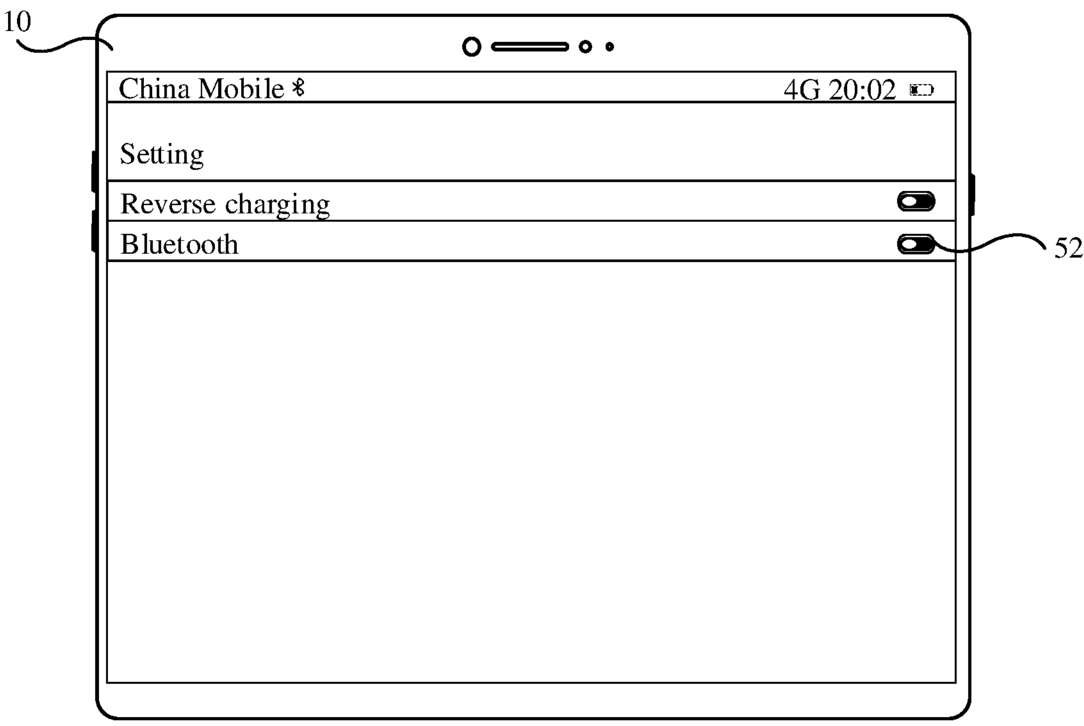
FIG. 14C is a schematic diagram of a display interface of an electronic device according to an embodiment of this application.
Figure 14D:
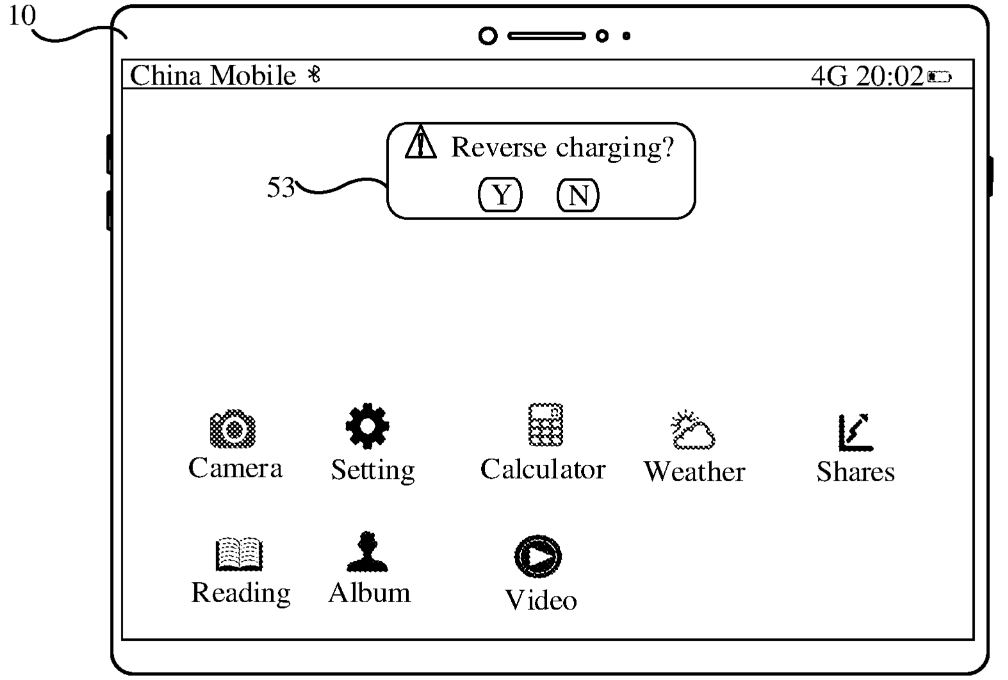
FIG. 14D is a schematic diagram of another display interface of an electronic device according to an embodiment of this application.

In addition, in some embodiments of this application, when the USB interface 50 is not electrically connected to the charging power supply, for example, an adapter, the processor 330 in the first electronic device 10 may control the fifth switch circuit 36 shown in FIG. 14A to be in an off state. In this case, the first electronic device 10 only needs to perform reverse charging on the second electronic device 20 in a direction shown by the arrow in FIG. 14A. Alternatively, in some other embodiments of this application, when the USB interface 50 is electrically connected to the charging power supply 40 as shown in FIG. 14B, the processor 330 in the first electronic device 10 may control the fifth switch circuit 36 to be in an on state. In this case, the charging power supply 40 may perform forward charging on the first battery 100 in the first electronic device 10, and the first electronic device 10 may simultaneously perform reverse charging on the second electronic device 20 in the direction shown by the arrow in FIG. 14A.

Figure 15:
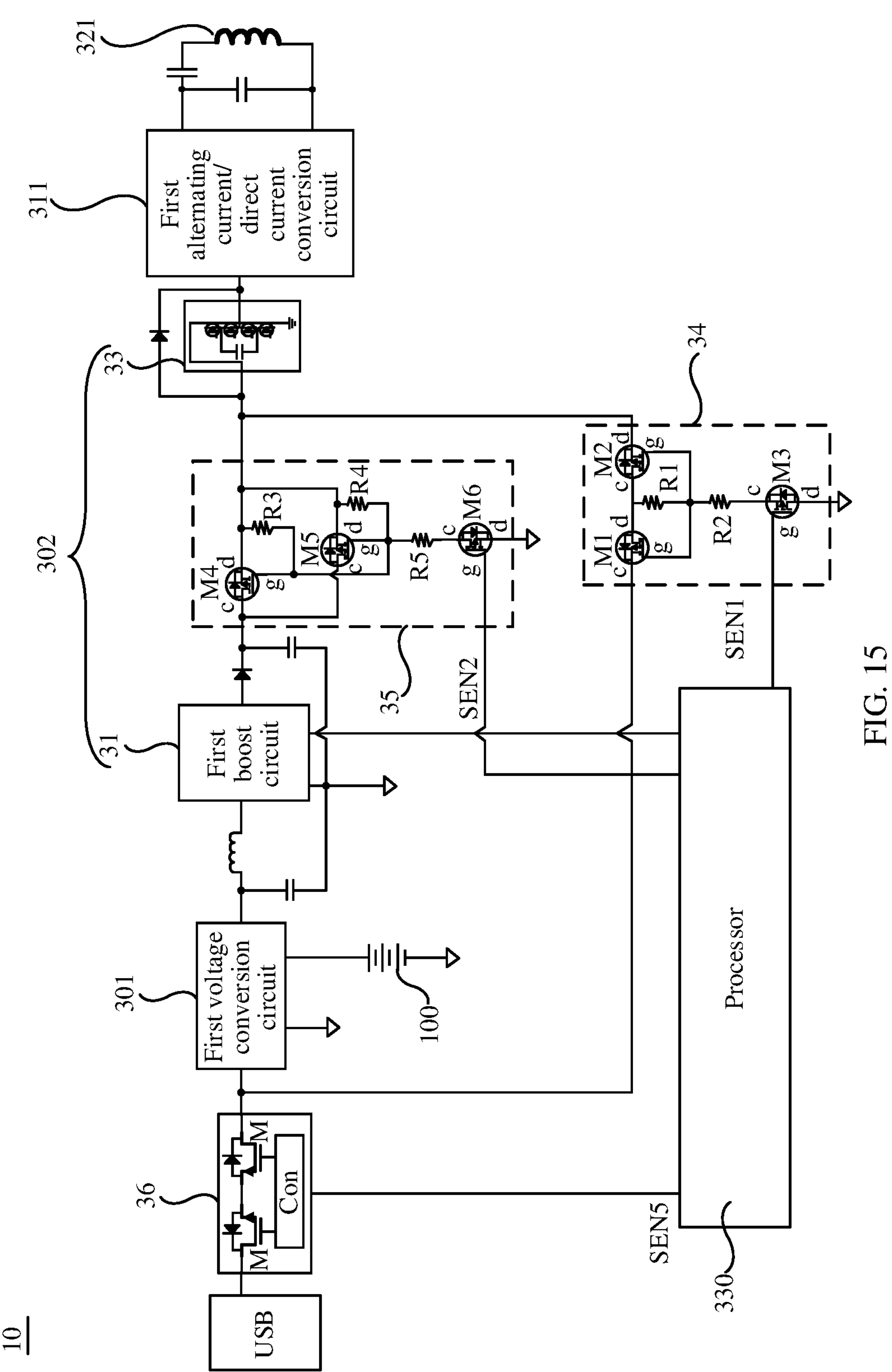
FIG. 15 is a schematic structural diagram of another wireless charging system according to an embodiment of this application.

The following describes structures of the first switch circuit 34, the second switch circuit 35, and the fifth switch circuit 36 by way of examples with reference to FIG. 15. The first switch circuit 34 may include a first switching transistor M1, a second switching transistor M2, a third switching transistor M3, a first resistor R1, and a second resistor R2. First electrodes of the switching transistors may be sources (source), and second electrodes may be drains (drain). Alternatively, the first electrodes may be drains and the second electrodes may be sources.

A first electrode c of the first switching transistor M1 is used as the first end of the first switch circuit 34 and is electrically connected to an input end of a first voltage conversion circuit 301. A second electrode d of the first switching transistor M1 is electrically connected to a first electrode c of the second switching transistor M2. A second electrode d of the second switching transistor M2 is used as the second end of the first switch circuit 34, and is electrically connected between the second switch circuit 35 and a switched-capacitor direct current converter 33.

In addition, a first end of the first resistor R1 is electrically connected to the second electrode d of the first switching transistor M1 and the first electrode cc of the second switching transistor M2. A second end of the first resistor R1 is electrically connected to a gate g of the first switching transistor M1 and a gate g of the second switching transistor M2. A first end c of the second resistor R2 is electrically connected to a second end of the second resistor R2. A first electrode c of the third switching transistor M3 is electrically connected to the second end of the second resistor R2, and a second electrode d of the third switching transistor M3 is grounded. A gate g of the third switching transistor M3 is used as the control end of the first switch circuit 34 and is electrically connected to the processor 330, and is configured to receive a first switch control signal SENT sent by the processor 330.

In this case, when the processor 330 controls, through the first switch control signal SENT, the third switching transistor M3 to be turned on, both the first switching transistor M1 and the second switching transistor M2 are turned on, and the entire first switch circuit 34 is in an on state. The first resistor R1 and the second resistor R2 act through voltage division, so that a span voltage generated between the gate and a source (or a drain) of the first switching transistor M1 and the second switching transistor M2 falls within a proper range. As a result, damage to the switching transistors by the span voltage can be avoided when the switching transistors are turned on. In addition, parasitic diodes inside the first switching transistor M1 and the second switching transistor M2 are disposed reversely. When the processor 330 controls, through the first switch control signal SENT, the third switching transistor M3 to be cut off, both the first switching transistor M1 and the second switching transistor M2 are in a cut-off state, and the entire first switch circuit 34 is in the off state.

In addition, as shown in FIG. 15, the second switch circuit 35 may include a fourth switching transistor M4, a fifth switching transistor M5, a sixth switching transistor M6, a third resistor R3, a fourth resistor R4, and a fifth resistor R5. A first electrode c of the fourth switching transistor M4 is used as the first end of the second switch circuit 35 and is electrically connected to a first boost circuit 31. A second electrode d of the fourth switching transistor M4 is used as the second end of the second switch circuit 35 and is electrically connected to the switched-capacitor direct current converter 33. A first electrode c of the fifth switching transistor M5 is electrically connected to the first electrode c of the fourth switching transistor M4, and a second electrode d of the fifth switching transistor M5 is electrically connected to the second electrode d of the fourth switching transistor M4.

In addition, a first end of the third resistor R3 is electrically connected to a gate g of the fourth switching transistor M4, and a second end is electrically connected to the second electrode d of the fourth switching transistor M4. A first end of the fourth resistor R4 is electrically connected to the gate g of the fourth switching transistor M4 and a gate g of the fifth switching transistor M5, and a second end is electrically connected to the second electrode d of the fifth switching transistor M5. A first electrode of the fifth resistor R5 is electrically connected to the gate g of the fifth switching transistor M5. A first electrode c of the sixth switching transistor M6 is electrically connected to a second end of the fifth resistor R5, and a second electrode d of the sixth switching transistor M6 is grounded. A gate g of the sixth switching transistor M6 is used as the control end of the second switch circuit 35 and is electrically connected to the processor 330, and is configured to receive a second switch control signal SEN2 output by the processor 330.

In this case, when the processor 330 controls the sixth switching transistor M6 to be turned on through the second switch control signal SEN2, both the fourth switching transistor M4 and the fifth switching transistor M5 are turned on, and the entire second switch circuit 35 is in the on state. The fourth switching transistor M4 and the fifth switching transistor M5 are connected in parallel. When the first boost circuit 31 outputs an electrical signal to the switched-capacitor direct current converter 33 through the second switch circuit 35, a resistance do switch on (resistance do switch on, Rdson) of the second switch circuit 35 can be effectively reduced, thereby improving a signal transmission efficiency. In addition, the third resistor R3 and the fifth resistor R5 that are connected in series can act through voltage division, so that a span voltage generated between the gate and a source (or a drain) of the fourth switching transistor M4 falls within a proper range. As a result, damage to the switching transistors by the span voltage can be avoided when the switching transistors are turned on. Similarly, the fourth resistor R4 and the fifth resistor R5 that are connected in series can act through voltage division, so that a span voltage generated between the gate and a source (or a drain) of the fifth switching transistor M5 falls within a proper range. In addition, when the processor 330 controls the sixth switching transistor M6 to be cut off through the second switch control signal SEN2, both the fourth switching transistor M4 and the fifth switching transistor M5 are in the cut-off state, and the entire second switch circuit 35 is in the off state.

As shown in FIG. 15, the fifth switch circuit 36 may include two switching transistors M, and the parasitic diodes inside the two switching transistors M may be disposed reversely. When the processor 330 controls, through a fifth switch control signal SEN5, the fifth switch circuit 36 to be cut off, the two switching transistors M in the fifth switch circuit 36 are in the cut-off state, and the entire fifth switch circuit 36 is in the off state.

In addition, the fifth switch circuit 36 may include a control circuit Con. The control circuit Con can not only provide logic control signals to the two switching transistors in the fifth switch circuit 36, but also detect a voltage and a current on the fifth switch circuit 36. When the USB interface is connected to the charging power supply to charge the first electronic device 10, the control circuit Con may send an instruction to the processor 330 if the voltage and the current on the fifth switch circuit 36 are too high. As a result, the processor 330 controls, through the fifth switch control signal SEN5, the fifth switch circuit 36 to be cut off. Thus, over current protection (over current protection, OCP) and over voltage protection (over voltage protection, OVP) are implemented.

S104: Perform low-power charging.

In particular, control the first boost circuit 31 to boost a first battery voltage Vbat, and control the at least one stage of switched-capacitor direct current converter 33 to output a voltage output by the first boost circuit 31.

Figure 16:
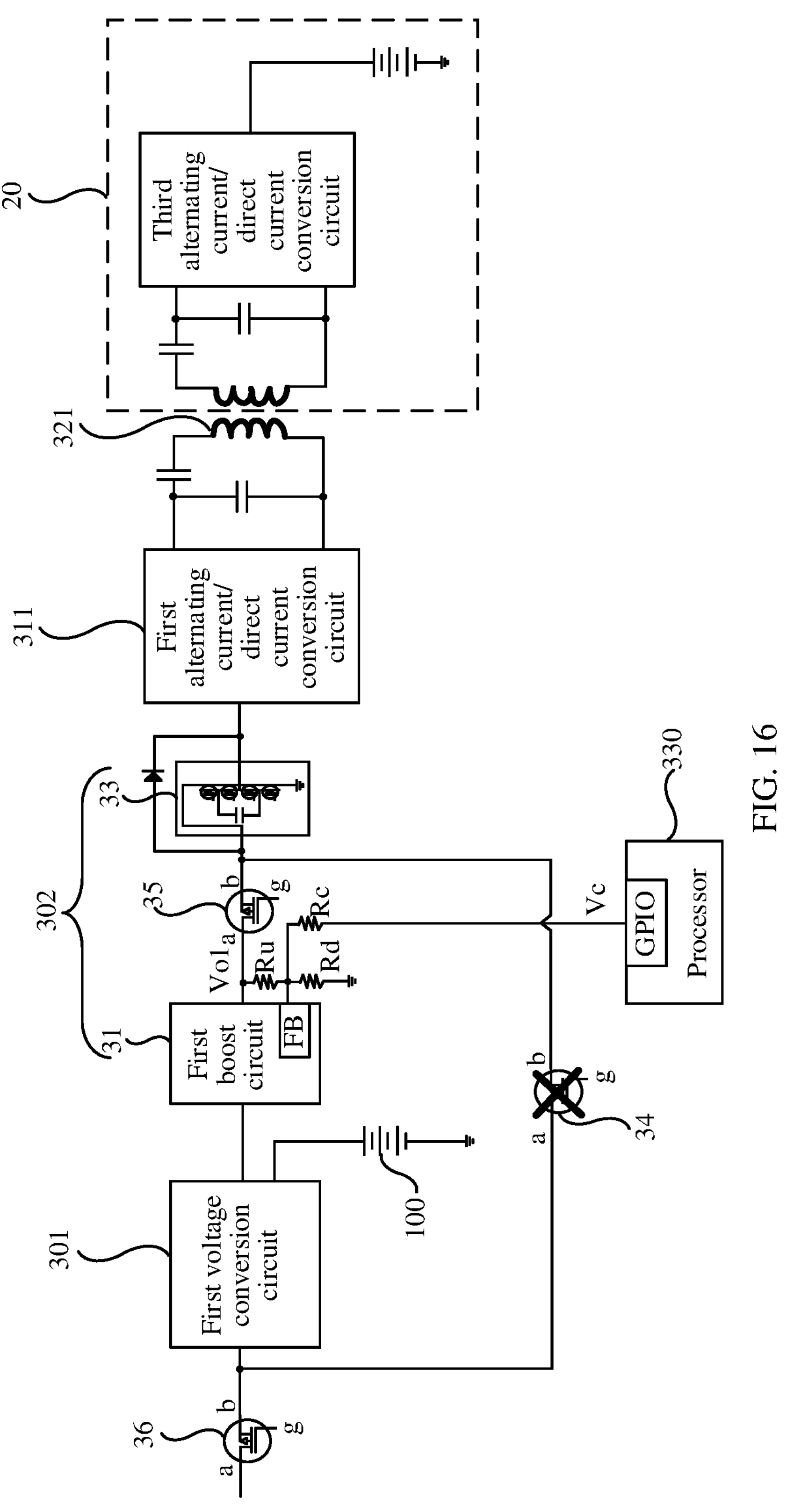
FIG. 16 is a schematic structural diagram of another wireless charging system according to an embodiment of this application.

To control a power output by the first boost circuit 31, as shown in FIG. 16, a feedback end FB may be disposed in the first boost circuit. A second voltage conversion circuit further includes a pull-up resistor Ru, a pull-down resistor Rd, and a regulating resistor Rc as shown in FIG. 16. A first end of the pull-up resistor Ru is electrically connected to an output end of the first boost circuit 31, and a second end is electrically connected to the feedback end FB of the first boost circuit 31. A first end of the pull-down resistor Rd is electrically connected to the feedback end FB of the first boost circuit, and a second end is grounded. A first end of the regulating resistor Rc is electrically connected to the feedback end FB of the first boost circuit 31, and a second end is electrically connected to a general purpose input/output (general purpose input/output, GPIO) interface of the processor 330.

Based on this, when a user turns on the second switch circuit 35 through the reverse charging control button, so that the first electronic device 10 starts to perform reverse charging on the second electronic device 20, the first boost circuit 31 may output a fixed low power (for example, 5 W) under control of the processor 330. Therefore, the first electronic device 10 can perform low-power and slow charging on the second electronic device 20. For example, the first boost circuit 31 may boost the first battery voltage Vbat, for example, from 3.7 V to 5 V.

To control the first boost circuit 31 to output a low power (for example, 5 W), the processor 330 may suspend the second end of the regulating resistor Rc. In this case, the regulating resistor Rc does not affect a voltage Vfb at the feedback end FB of the first boost circuit. The voltage Vfb at the feedback end FB and a voltage Vol at the output end of the first boost circuit 31 meet the following formula (1). In this case, by setting resistance values of the pull-up resistor Ru and the pull-down resistor Rd, the voltage Vol at the output end of the first boost circuit 31 may be 5 V. Therefore, the power output by the first boost circuit 31 is about 5 W, thereby, the first electronic device 10 can perform low-power and slow charging on the second electronic device 20.

$$Vo1 = Vfb\left(\frac{Ru}{Rd}\right) \tag{1}$$

On this basis, a current on the first coil 321 being 1 A is used as an example. To enable the first electronic device 10 to output a charging power of 5 W to the second electronic device 20, the switched-capacitor direct current converter 33 may operate in the foregoing by pass mode, and may be used as a wire, to transmit the voltage output by the first boost circuit 31, for example, 5 V, to the first alternating current/direct current conversion circuit 311.

Figure 17A:
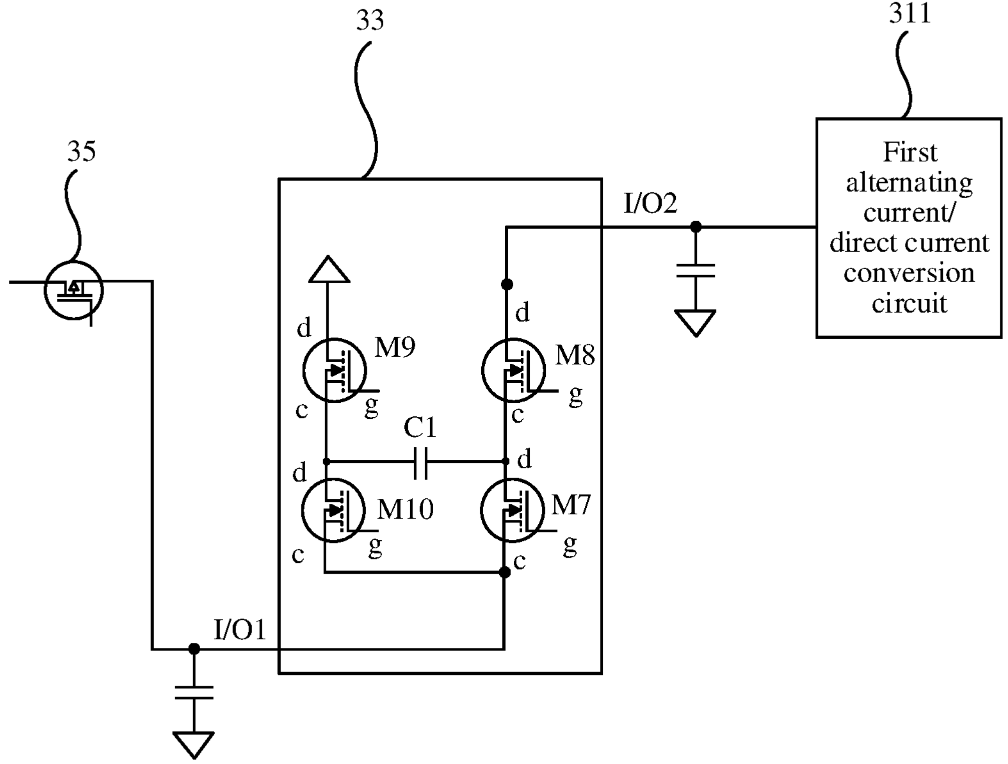
FIG. 17A is a schematic structural diagram of a switched-capacitor direct current converter in FIG. 16.

In some embodiments of this application, as shown in FIG. 17A, a structure of the switched-capacitor direct current converter 33 may include a seventh switching transistor M7, an eighth switching transistor M8, a ninth switching transistor M9, a tenth switching transistor MR), and a first capacitor C1. A first electrode c of the seventh switching transistor M7 is used as an input end I/O1 of the switched-capacitor direct current converter 33, and is electrically connected to one end of the second switch circuit 35. A first electrode c of the eighth switching transistor M8 is electrically connected to a second electrode d of the seventh switching transistor M7. A second electrode d of the eighth switching transistor M8 is used as an output end I/O2 of the switched-capacitor direct current converter 33 and is electrically connected to the first alternating current/direct current conversion circuit. A first end of the first capacitor C1 is electrically connected to the second electrode d of the seventh switching transistor M7. A first electrode c of the ninth switching transistor M9 is electrically connected to a second end of the first capacitor C1, and a second electrode d of the ninth switching transistor M9 is grounded. A first electrode c of the tenth switching transistor M10 is electrically connected to the first electrode of the seventh switching transistor M7, and a second electrode of the tenth switching transistor M10 is electrically connected to the second end of the first capacitor C1.

Figure 17B:
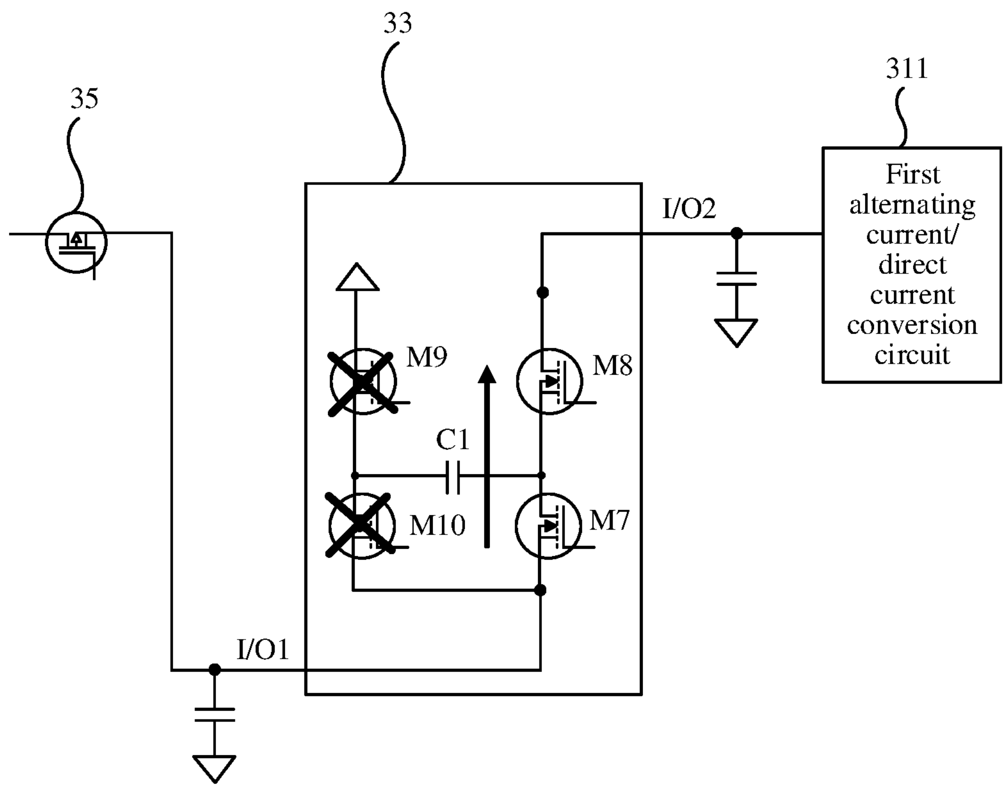
FIG. 17B is a schematic diagram of a control process of the switched-capacitor direct current converter in FIG. 17A.

In this case, when the switched-capacitor direct current converter 33 operates in the foregoing by pass mode, as shown in FIG. 17B, the seventh switching transistor M7 and the eighth switching transistor M8 may be turned on, and the ninth switching transistor M9 and the tenth switching transistor Mb( ) may be cut off. In this case, the switched-capacitor direct current converter 33 may be equivalent to a wire, and electrically connects the second switch circuit 35 to the first alternating current/direct current conversion circuit 311. Therefore, the voltage output by the first boost circuit 31, for example, 5 V, may be transmitted to the first alternating current/direct current conversion circuit 311 through the second switch circuit 35 and the switched-capacitor direct current converter 33.

In conclusion, when the first electronic device 10 just starts to perform reverse charging on the second electronic device 20, only the first boost circuit 31 in the second voltage conversion circuit 302 of the first electronic device 10 operates in a boost mode. In this case, after the foregoing S107 is performed, the first electronic device 10 performs low-power (for example, 5 W) charging on the second electronic device 20 by default.

S105: Receive a power increase request.

When the second electronic device 20 at the first coil 321 is a mobile phone or a pad that needs to be performed high power (for example, 12 W) charging, the second electronic device 20 may send a wireless charging standard (Qi) protocol to the processor 330 of the first electronic device 10 in a manner of Bluetooth or a carrier signal. The Qi protocol may have a field that matches a basic device identifier and a field that matches the power increase request. The field that matches the power increase request may be defined in an extended identification data packet in the Qi protocol. In this way, when receiving the Qi protocol sent by the second electronic device 20, the first electronic device 10 may identify the type of the second electronic device 20 through the field that matches the basic device identifier, and obtain the power increase request through the field that matches the power increase request. When the power increase request is received, the following S106 may be performed. When the power increase request is not received, the S104 is performed.

S106: Perform high-power charging.

In particular, control the first boost circuit 31 to boost the first battery voltage Vbat, and control the at least one stage of switched-capacitor direct current converter 33 to boost the voltage output by the first boost circuit 31.

After the first electronic device 10 receives the Qi protocol sent by the second electronic device 20, the first electronic device 10 needs to perform high-power charging on the second electronic device 20, to increase a charging rate. In this case, in some embodiments of this application, during performing the S105, the processor 330 may ground the second end of the regulating resistor Rc. In this case, the regulating resistor Rc and the pull-down resistor Rd are connected in parallel. After connected in parallel, a total resistance value decreases, so that the voltage Vol at the output end of the first boost circuit 31 can be increased. In this case, by setting resistance values of the pull-up resistor Ru, the pull-down resistor Rd, and the regulating resistor Rc, the voltage Vol at the output end of the first boost circuit 31 may be increased to a fixed voltage value, for example, 6 V. Therefore, the first boost circuit 31 operates at a peak of a voltage conversion efficiency. For example, the current on the first coil 321 is 1 A. In this case, the output power of the first boost circuit 31 increases to 6 W.

Alternatively, in some other embodiments of this application, during performing the S105, the processor 330 may provide a pulse width modulation (pulse width modulation, PWM) signal to the second end of the regulating resistor Rc. In this case, a duty cycle D of the PWM signal may be changed as required. Therefore, the voltage Vfb at the feedback end FB in the first boost circuit is changed, and further the voltage Vol at the output end of the first boost circuit 31 is changed. In this way, the first boost circuit 31 operates at a peak of a voltage conversion efficiency, and may output, for example, a power of 6 W. In this case, the first boost circuit 31 operating at the peak of the voltage conversion efficiency can obtain a higher voltage conversion efficiency.

In this case, the voltage Vol at the output end of the first boost circuit 31, the voltage Vfb at the feedback end FB, and the voltage Vc at the second end of the regulating resistor Rc, and the pull-up resistor Ru, the pull-down resistor Rd, and the regulating resistor Rc meet the following formula (2). Where, $V_{GPIO}$ is a reference voltage of the PWM signal.

$$
\begin{aligned}
\mathrm{Vo1} &= \mathrm{V}fb\left(\frac{Ru}{Rd}+\frac{Ru}{Rc}+1\right)-\frac{\mathrm{V}c}{Rc}Ru \\
&= \mathrm{V}fb\left(\frac{Ru}{Rd}+\frac{Ru}{Rc}+1\right)-\frac{\mathrm{V}_{GPIO}\times D}{Rc}Ru
\end{aligned}
\tag{2}
$$

On this basis, to enable the first electronic device 10 to output a charging power of 12 W to the second electronic device 20, the switched-capacitor direct current converter 33 operates in the boost mode. A current on the first coil 321 being 1 A is used as an example. A boost multiple of the switched-capacitor direct current converter 33 may be 2. In this case, a ratio of the input voltage to the output voltage of the switched-capacitor direct current converter 33 is 1:2. In this way, the switched-capacitor direct current converter 33 operating in the boost mode can boost the voltage output by the first boost circuit 31 from 6 V to 12 V, and then output the voltage.

The following uses the structure of the switched-capacitor direct current converter 33 shown in FIG. 17A as an example to describe a process in which the switched-capacitor direct current converter 33 can implement a ratio of an input voltage to an output voltage of 1:2. When the switched-capacitor direct current converter 33 operates in a boost mode, the gate g of the seventh switching transistor M7 and the gate g of the ninth switching transistor M9 in the switched-capacitor direct current converter 33 are configured to receive the same drive signal. The gate g of the eighth switching transistor M8 and the gate g of the tenth switching transistor MR) are configured to receive the same drive signal.

Figure 18A:
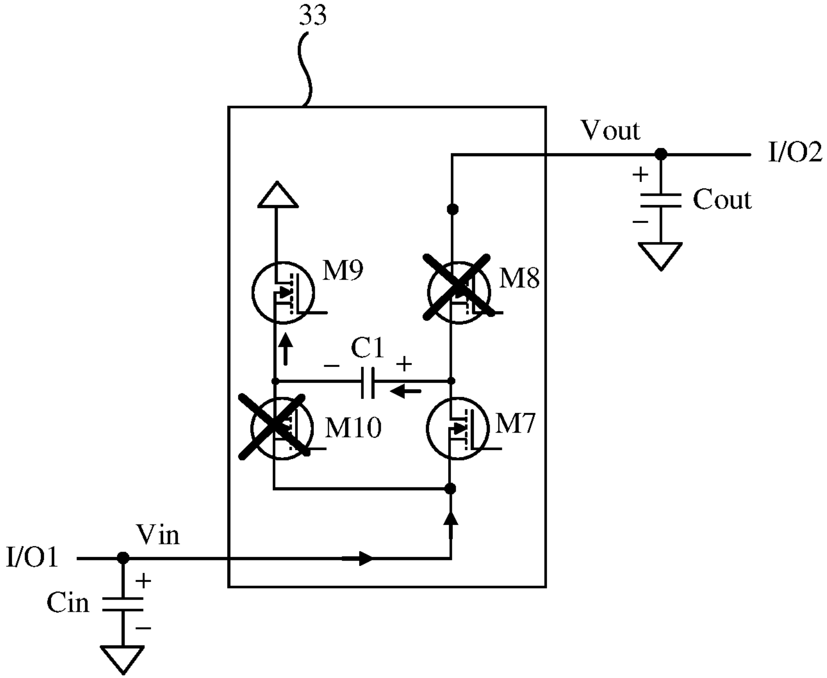
FIG. 18A is a schematic diagram of a control process of the switched-capacitor direct current converter in FIG. 17A.
Figure 18B:
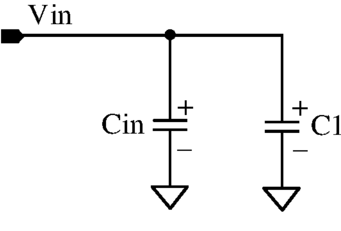
FIG. 18B is an equivalent circuit diagram of a circuit structure shown in FIG. 18A.

Based on this, in a first boosting stage of the switched-capacitor direct current converter 33, as shown in FIG. 18A, the seventh switching transistor M7 and the ninth switching transistor M9 are controlled to be in the on state, and the eighth switching transistor M8 and the tenth switching transistor Mb are controlled to be in the cut-off state. An input voltage Vin charges the first capacitor C1 and an input capacitor Cin in the direction shown by the arrow. An equivalent circuit diagram of FIG. 18A is shown in FIG. 18B. It can be seen that the input capacitor Cin is connected in parallel with the first capacitor C1. In this case, the voltage Vin across the input capacitor Cin is the same as the voltage Vc1 across the first capacitor C1, that is, Vin=Vc1.

Figure 19A:
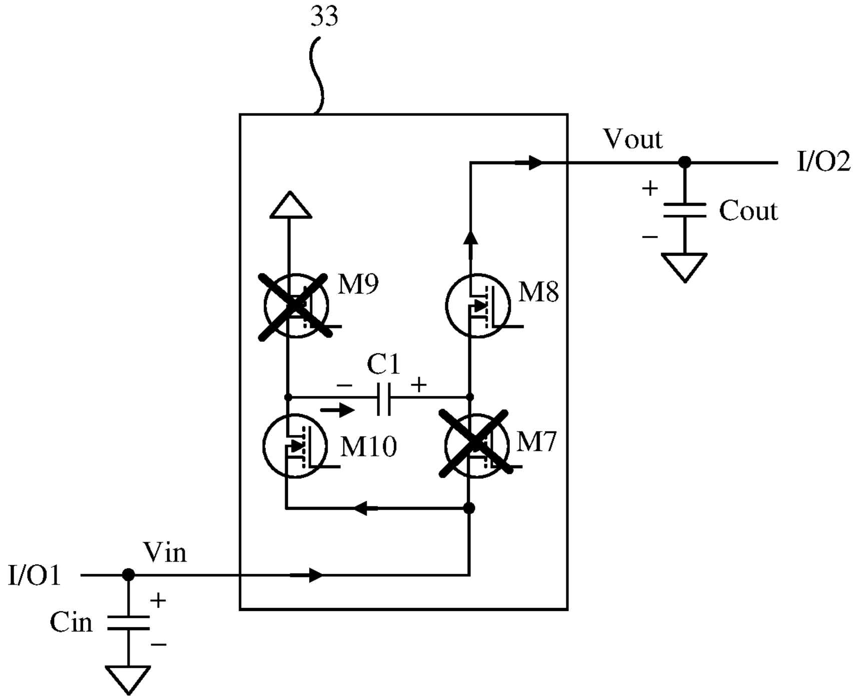
FIG. 19A is a schematic diagram of a control process of the switched-capacitor direct current converter in FIG. 17A.

In a second boosting stage of the switched-capacitor direct current converter 33, as shown in FIG. 19A, the seventh switching transistor M7 and the ninth switching transistor M9 are controlled to be in the cut-off state, and the eighth switching transistor M8 and the tenth switching transistor MR) are controlled to be in the on state. The first capacitor C1 and the input capacitor Cin are discharged to the output end I/O2 of the switched-capacitor direct current converter 33 in the direction shown by the arrow. An equivalent circuit diagram of FIG. 19A is shown in FIG. 19B. It can be seen that following the input capacitor Cin connected in series to the first capacitor C1, the input capacitor Cin is connected in parallel to the output capacitor Cout. In this case, the voltage Vout across the output capacitor Cout is a sum of the voltage Vin across the input capacitor Cin and the voltage Vc1 across the first capacitor C1, that is, Vout=Vin+Vc1. Because Vin=Vc1, Vout=2Vin. In this way, the switched-capacitor direct current converter 33 can output the input voltage boosted by a multiple of 2, to boost the voltage output by the first boost circuit 31 from 6 V to 12 V and then output a voltage obtained by boosting.

The structure of the switched-capacitor direct current converter 33 is described above by using an example in which the switched-capacitor direct current converter 33 has four switching transistors (M7, M8, M9, and Mb10) and one capacitor (C1). In some other embodiments of this application, as shown in FIG. 20A, the switched-capacitor direct current converter 33 may include a seventh switching transistor M7, an eighth switching transistor M8, a ninth switching transistor M9, a tenth switching transistor MR), an eleventh switching transistor M11, a twelfth switching transistor M12, a thirteenth switching transistor M13, a fourteenth switching transistor M10, a first capacitor C1, and a second capacitor C2.

A first electrode c of the seventh switching transistor M7 can be used as an input end I/O1 of the switched-capacitor direct current converter 33 and is electrically connected to one end of the second switch circuit 35. A first electrode c of the eighth switching transistor M8 is electrically connected to a second electrode d of the seventh switching transistor M7. A second electrode d of the eighth switching transistor M8 is used as an output end I/O2 of the switched-capacitor direct current converter 33 and is electrically connected to the first alternating current conversion circuit 311. A first end of the first capacitor C1 is electrically connected to the second electrode d of the seventh switching transistor M7. A first electrode c of the ninth switching transistor M9 is electrically connected to a second end of the first capacitor C1, and a second electrode d of the ninth switching transistor M9 is electrically connected to the second electrode d of the eighth switching transistor M8. A first electrode c of the tenth switching transistor MR) is electrically connected to the first electrode c of the seventh switching transistor M7, and a second electrode d of the tenth switching transistor Mb is electrically connected to the second end of the first capacitor C1.

In addition, a second electrode d of the eleventh switching transistor M11 is electrically connected to the first electrode c of the seventh switching transistor M7. A first electrode c of the twelfth switching transistor M12 is grounded, and a second electrode d of the twelfth switching transistor M12 is electrically connected to a first electrode c of the eleventh switching transistor Mn. A first end of the second capacitor C2 is electrically connected to the first electrode c of the eleventh switching transistor Mn. A first electrode c of the thirteenth switching transistor M13 is grounded, and a second electrode d of the thirteenth switching transistor M13 is electrically connected to a second end of the second capacitor C2. A first electrode c of the fourteenth switching transistor M14 is electrically connected to the second end of the second capacitor C2, and a second electrode d of the fourteenth switching transistor M14 is electrically connected to the second electrode d of the eleventh switching transistor M1.

Figure 20A:
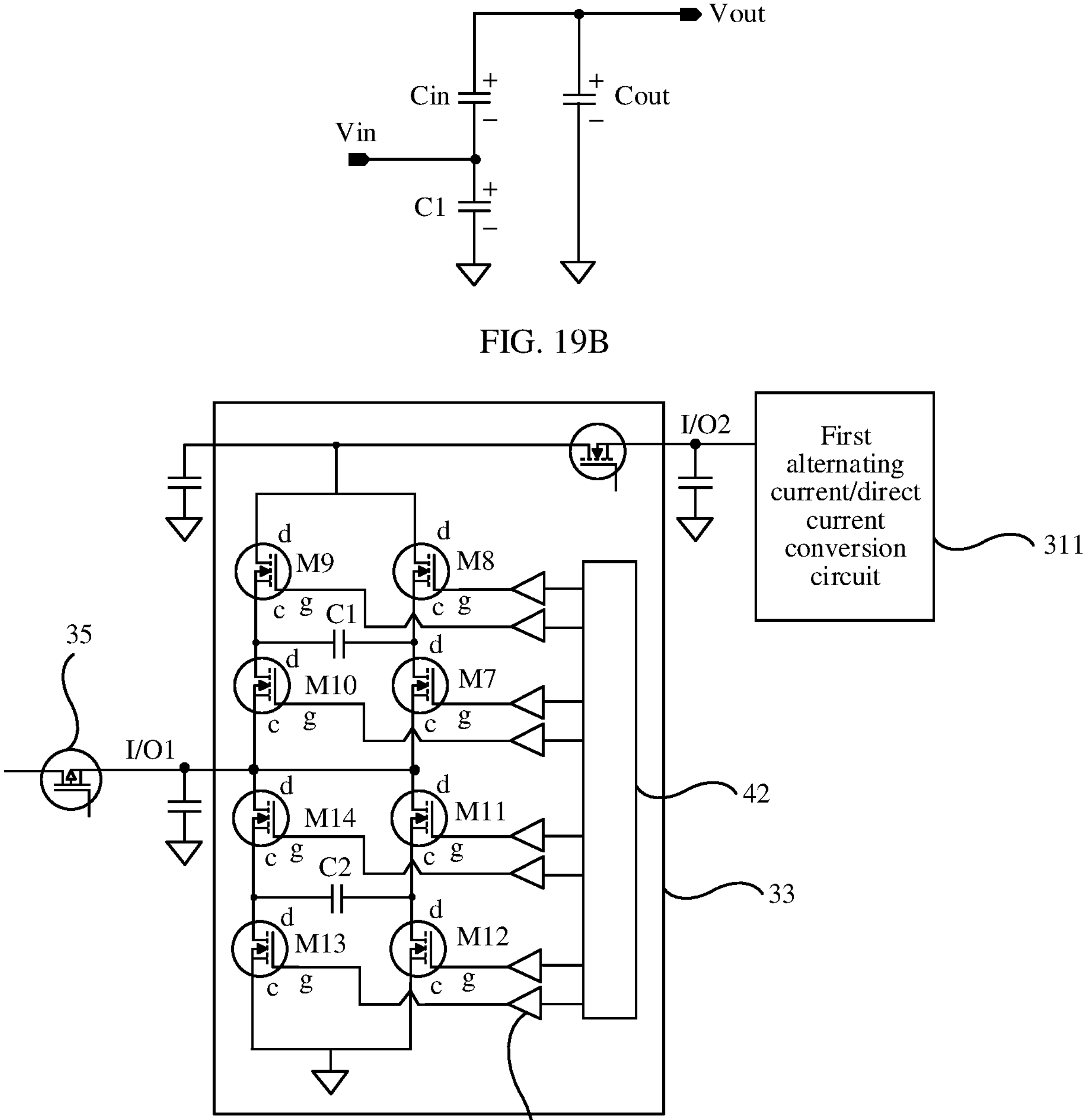
FIG. 20A is another schematic structural diagram of the switched-capacitor direct current converter in FIG. 16.

The switched-capacitor direct current converter 33 shown in FIG. 20A, when operates in the boost mode, can also implement the 1:2 ratio of the input voltage to the output voltage. When the switched-capacitor direct current converter 33 operates in the boost mode, the gate g of the seventh switching transistor M7, the gate g of the ninth switching transistor M9, the gate g of the fourteenth switching transistor M14, and the gate g of the twelfth switching transistor M12 in the switched-capacitor direct current converter 33 are configured to receive the same drive signal. The gate g of the eighth switching transistor M8, the gate g of the tenth switching transistor MR), the gate g of the eleventh switching transistor Mn, and the gate g of the thirteenth switching transistor M13 are configured to receive the same drive signal.

Figure 20B:
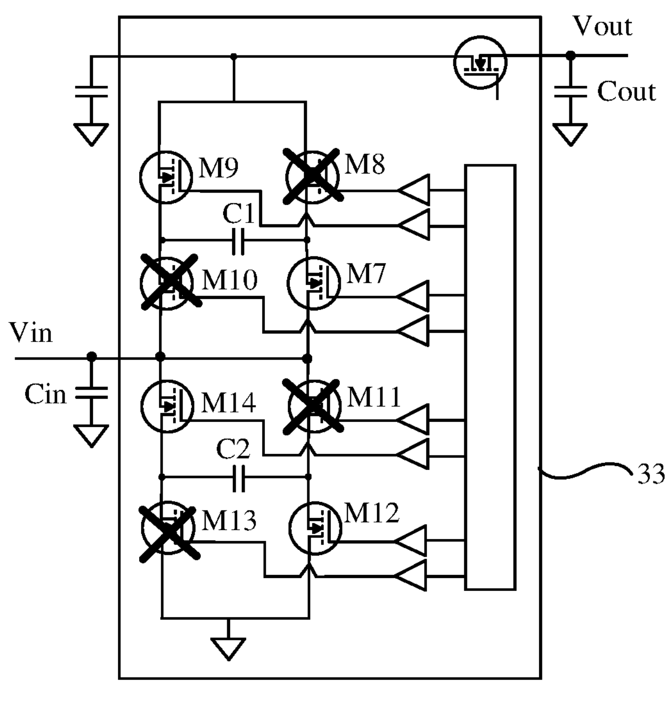
FIG. 20B is a schematic diagram of a control process of the switched-capacitor direct current converter in FIG. 20A.

Based on this, in the first boosting stage of the switched-capacitor direct current converter 33, as shown in FIG. 20B, the seventh switching transistor M7, the ninth switching transistor M9, the fourteenth switching transistor M14, and the twelfth switching transistor M12 are turned on. The eighth switching transistor M8, the tenth switching transistor MR), the eleventh switching transistor M11, and the thirteenth switching transistor M13 are cut-off. Similarly, it can be learned that the input capacitor Cin is connected in parallel with the first capacitor C1 and the second capacitor C2. In this case, the voltage Vin across the input capacitor Cin is the same as the voltage Vc1 across the first capacitor C1 and the voltage Vc2 across of the second capacitor C2, that is, Vin=Vc1=Vc2.

Figure 20C:
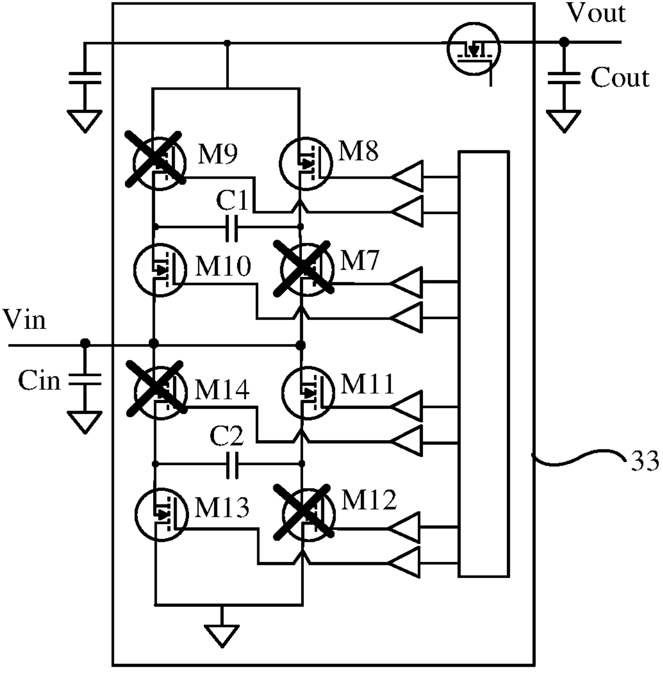
FIG. 20C is a schematic diagram of another control process of the switched-capacitor direct current converter in FIG. 20A.

In the second boosting stage of the switched-capacitor direct current converter 33, as shown in FIG. 20C, the seventh switching transistor M7, the ninth switching transistor M9, the fourteenth switching transistor M14, and the twelfth switching transistor M12 are cut-off. The eighth switching transistor M8, the tenth switching transistor M10, the eleventh switching transistor M11, and the thirteenth switching transistor M13 are turned on. Similarly, it can be learned that following being connected in series to the first capacitor C1, the input capacitor Cin is connected in parallel to the output capacitor Cout. Following being connected in series to the input capacitor Cin, the second capacitor C2 is connected in parallel to the output capacitor Cout. In this case, the voltage Vout across the output capacitor Cout is a sum of the voltage Vin across the input capacitor Cin and the voltage Vc1 across the first capacitor C1. In addition, the voltage Vout across the output capacitor Cout is also a sum of the voltage Vin across the input capacitor Cin and the voltage Vc2 across the second capacitor C2, that is, Vout=Vin+Vc1=Vin+Vc2. Because Vin=Vc1=Vc2, Vout=2Vin. In this way, the switched-capacitor direct current converter 33 can output the input voltage boosted by a multiple of 2, to boost the voltage output by the first boost circuit 31 from 6 V to 12 V and then output a voltage obtained by boosting.

The structure of the switched-capacitor direct current converter 33 is described above by using an example in which the switched-capacitor direct current converter 33 has eight switching transistors (M7, M8, M9, MR), M11, M12, M13, and M14) and one capacitor (C1 and C2), as shown in FIG. 20A. With respect to the switched-capacitor direct current converter 33 shown in FIG. 17A, the boost multiple is also 2. However, because a relatively large quantity of switching transistors are used in FIG. 20A, a flow-through capability increases, which helps increase the output current of the switched-capacitor direct current converter 33.

On this basis, the switching transistor in the switched-capacitor direct current converter 33 has a specific load driving capability, and therefore the switching transistor needs to be driven by a relatively high voltage. Therefore, as shown in FIG. 20A, the switched-capacitor direct current converter 33 may further include a logic control circuit 42 and a plurality of drivers 43. A gate g of each switching transistor is connected to one driver 43. The logic control circuit 42 is configured to electrically connect the processor 330, and is configured to provide a logic control signal at a gate of each switching transistor, where the logic control signal is used to indicate an on or cut-off state of the switching transistor. In addition, the driver 43 is configured to convert the logic control signal output by the logic control circuit 42 into a drive signal with a drive capability, and control the switching transistor to be turned on or cut off.

Figure 21:
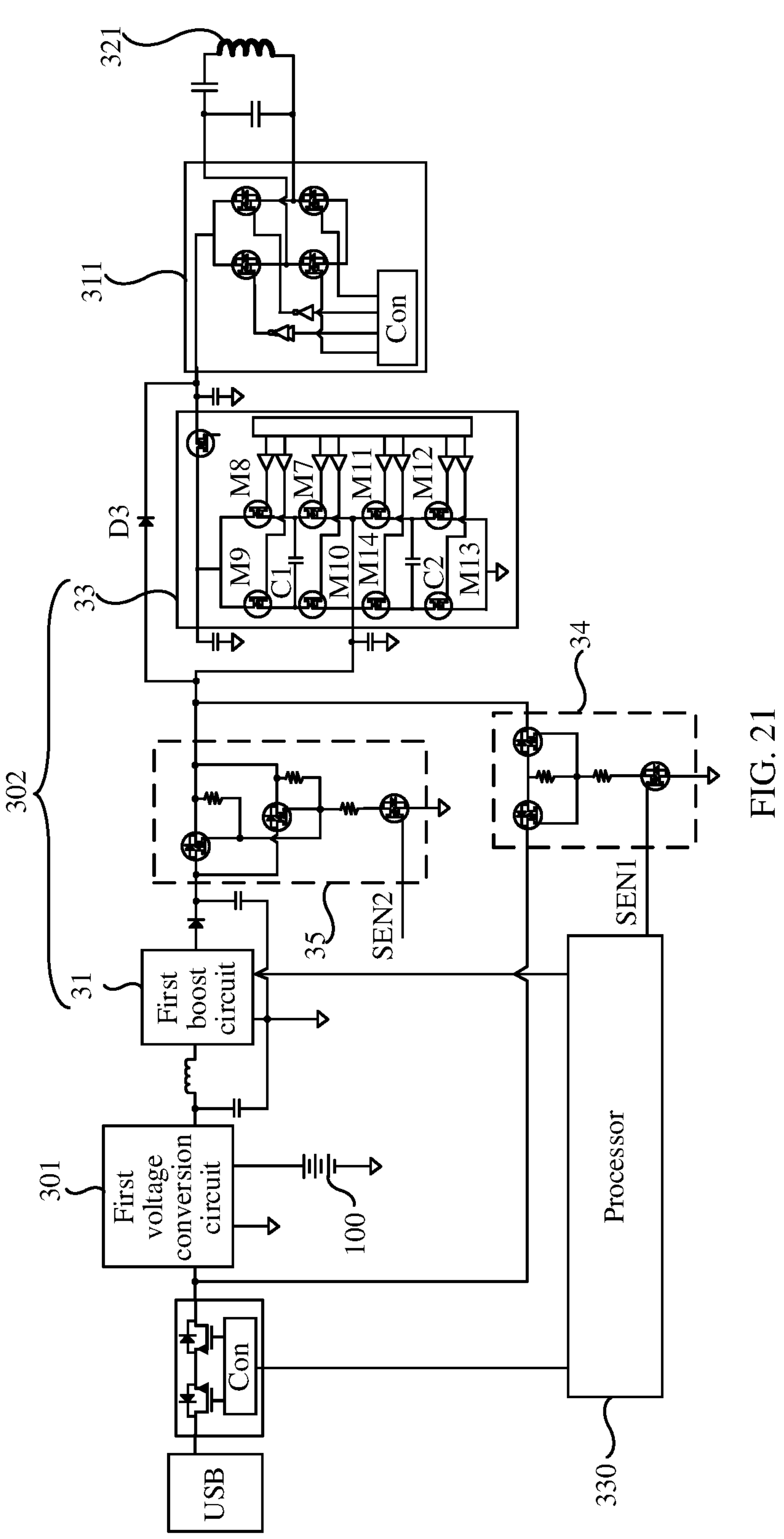
FIG. 21 is a schematic structural diagram of another wireless charging system according to an embodiment of this application.

In addition, to enable the switched-capacitor direct current converter 33 to start properly, the wireless charging circuit in the first electronic device may further include a third diode D3 shown in FIG. 21. An anode of the third diode D3 is electrically connected to an input end of the switched-capacitor direct current converter 33, and a cathode of the third diode D3 is electrically connected to an output end of the switched-capacitor direct current converter 33. In this way, when the first boost circuit 31 provides a voltage to the input end of the switched-capacitor direct current converter 33 through the second switch circuit 35, the output end of the switched-capacitor direct current converter 33 also has a voltage under a freewheeling action of the third diode D3. In addition, when a voltage at an output end of the third diode D3 is greater than a voltage at an input end, pre-starting of the switched-capacitor direct current converter 33 may be implemented.

The foregoing describes an example in which the second voltage conversion circuit 302 of the first electronic device 10 has one stage of switched-capacitor direct current converter 33, and a ratio of an input voltage to an output voltage of the switched-capacitor direct current converter 33 is 1:2. Therefore, the voltage output by the first boost circuit 31 is boosted from 6 V to 12 V. In some other embodiments of this application, when a charging power of the second electronic device 20 that is used as the to-be-charged electronic device increases to 24 W, the first electronic device 10 may include two stages of switched-capacitor direct current converter shown in FIG. 22A, i.e., a first stage of switched-capacitor direct current converter 33*a* and a second stage of switched-capacitor direct current converter 33*b* respectively. An output end of the first stage of switched-capacitor direct current converter 33*a* is electrically connected to an input end of the second stage of switched-capacitor direct current converter 33*b*.

A ratio of an input voltage to an output voltage of any stage of switched-capacitor direct current converter in the first stage of switched-capacitor direct current converter 33*a* and the second stage of switched-capacitor direct current converter 33*b* is 1:2. As shown in FIG. 20A, the structure of the first stage of switched-capacitor direct current converter 33*a* and the second stage of switched-capacitor direct current converter 33*b* may each has eight switching transistors (M7, M8, M9, MR), M11, M12, M13, and M14) and one capacitor (C1 and C2).

Figure 22A:
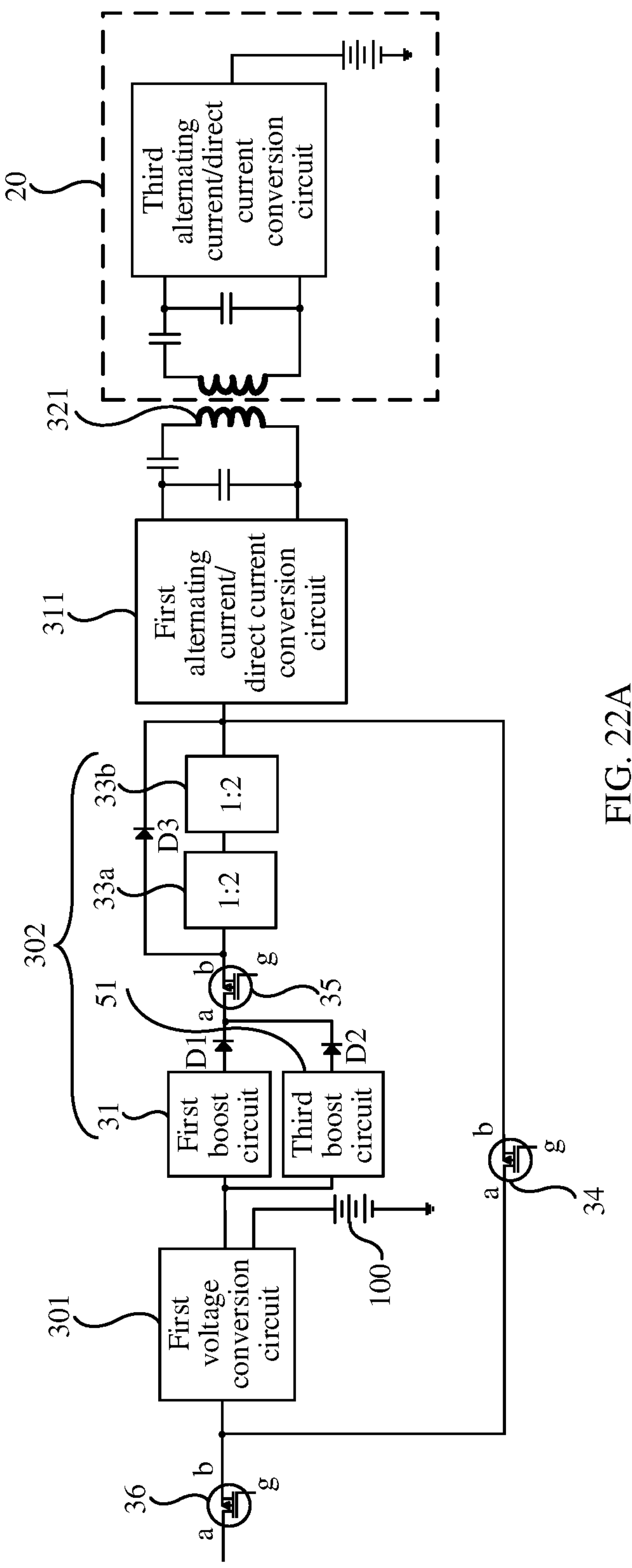
FIG. 22A is a schematic structural diagram of another wireless charging system according to an embodiment of this application.
Figure 22B:
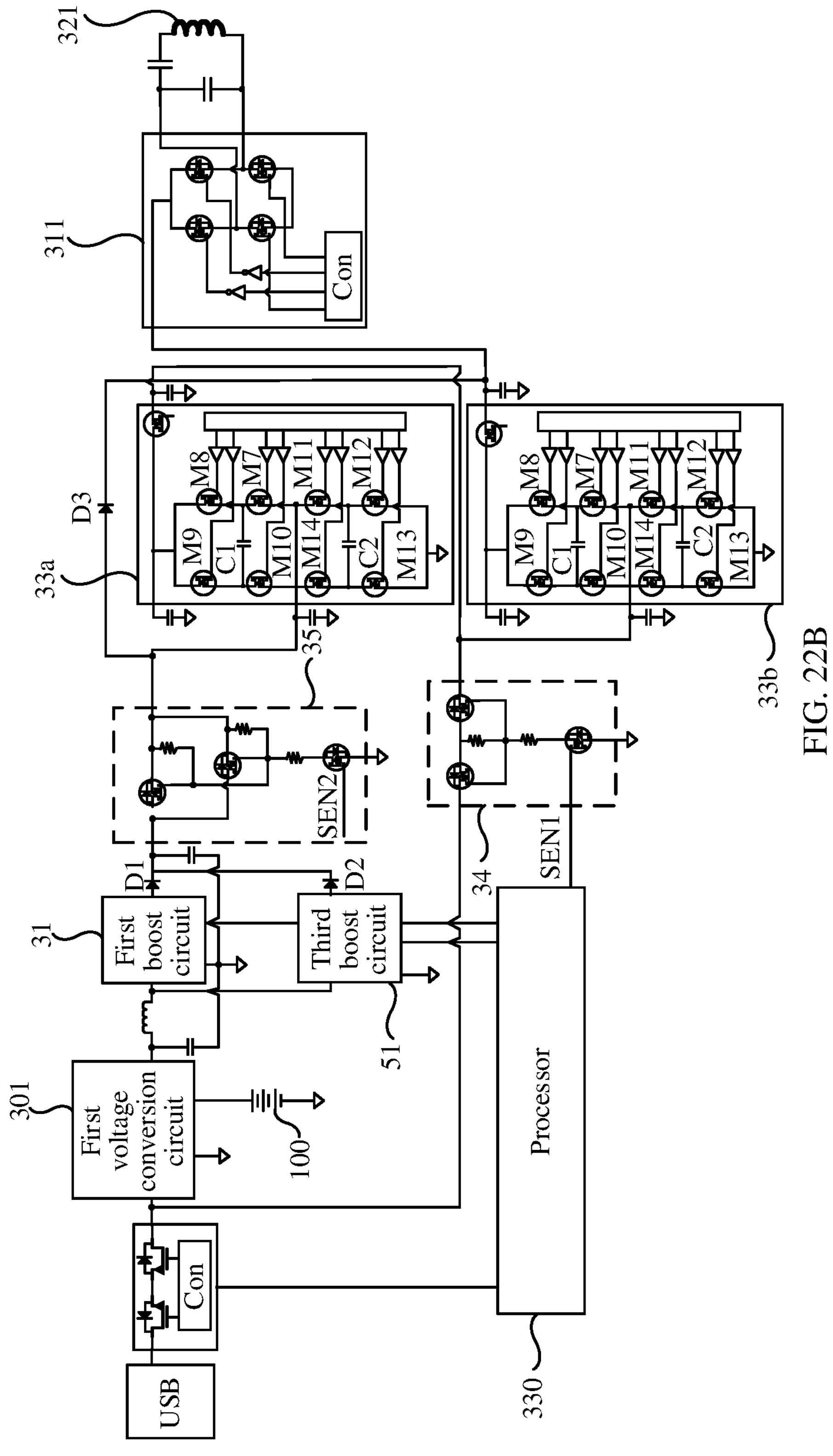
FIG. 22B is a specific schematic structural diagram of FIG. 22A.

On this basis, because the output power of the first electronic device 10 is increased to 24 W, the second voltage conversion circuit 302 further includes a third boost circuit 51 shown in FIG. 22B, to improve a driving capability of the second voltage conversion circuit 302. The third boost circuit 51 is connected in parallel to the first boost circuit 31. A structure of the third boost circuit 51 is the same as that of the first boost circuit 31, and a boost multiple is also the same as that of the first boost circuit. In this way, the third boost circuit 51 and the first boost circuit 31 that are connected in parallel are disposed in the second voltage conversion circuit 302, which can match the quantity of the cascaded first stage of switched-capacitor direct current converters 33*a* and second stage of switched-capacitor direct current converters 33*b*. Therefore, the output power of the first electronic device 10 is increased from 12 W to 24 W.

In addition, the wireless charging circuit of the first electronic device may further include a first diode D1 and a second diode D2 shown in FIG. 22A. An anode of the first diode D1 is electrically connected to the output end of the first boost circuit 31. A cathode of the first diode D1 may be electrically connected to the first alternating current/direct current conversion circuit 311 through the second switch circuit 35, the first stage of switched-capacitor direct current converter 33*a*, and the second stage of switched-capacitor direct current converter 33*b*. An anode of the second diode D2 is electrically connected to the output end of the third boost circuit 51. A cathode of the second diode D2 may be electrically connected to the first alternating current/direct current conversion circuit 311 through the second switch circuit 35, the first stage of switched-capacitor direct current converter 33*a*, and the second stage of switched-capacitor direct current converter 33*b*. Through a one-way switch on of the first diode D1 and the second diode D2, a signal crosstalk between the first boost circuit 31 and the third boost circuit 51 that are connected in parallel can be avoided.

In this way, the first stage of switched-capacitor direct current converter 33*a* may boost the voltage output jointly by the first boost circuit 31 and the third boost circuit 51 that are connected in parallel from 6 V to 12 V, and then transmit the voltage to the second stage of switched-capacitor direct current converter 33*b*. The second stage of switched-capacitor direct current converter 33*b* may boost the voltage output by the first stage of switched-capacitor direct current converter 33*a* from 12 V to 24 V, and output the voltage to the first alternating current/direct current conversion circuit 311. The current on the first coil 321 being 1 A is used as an example. In this case, the first electronic device 10 may provide an output power of 20 W to the second electronic device 20 that is used as the to-be-charged electronic device. A boosting process of the first stage of switched-capacitor direct current converter 33*a* and the second stage of switched-capacitor direct current converter 33*b* is the same as that described above, and details are not described herein again.

S107: The first coil 321 emits an alternating magnetic field.

In particular, after the foregoing S104 or S106 is performed, the foregoing S107 may be performed to control the first alternating current/direct current conversion circuit 311 to convert a voltage output by the at least one stage of switched-capacitor direct current converter 33 into an alternating current voltage, to excite the first coil 321 to emit the alternating magnetic field.

In some embodiments of this application, the first alternating current/direct current conversion circuit 311 may include a plurality of switching transistors shown in FIG. 21 (for example, four switching transistors in FIG. 21), and an inverter and a control circuit Con that are configured to control the switching transistors to be turned on or cut off. In this way, the foregoing four switching transistors may form a full-bridge circuit, and can convert a direct current voltage output by the switched-capacitor direct current converter 33 into an alternating current voltage. After receiving the alternating current voltage, the first coil 321 can emit an alternating magnetic field. A to-be-charged electronic device located at the first coil 321, for example, a third coil 323 of the second electronic device 20 (as shown in FIG. 22A), generates an alternating current voltage by induction. The third alternating current/direct current conversion circuit 313 converts the alternating current voltage induced by the third coil 323 after receiving the alternating current magnetic field into a direct current voltage, and transmits the direct current voltage to the second battery 200 for charging the second battery 200. Therefore, the first electronic device 10 performs wireless reverse charging on the second electronic device 20.

S108: Determine whether a temperature of the first battery 100 is greater than a first temperature threshold Tth1 (for example, Tth1=37° C.).

After S107, the first electronic device to may perform high-power charging, for example, 12 W (or 24 W), on the second electronic device 20. Therefore, S108 and S109 may be performed at any time after S107, to perform over temp protection (over temp protection, OTP) for the first time on the first electronic device 10.

Figure 23:
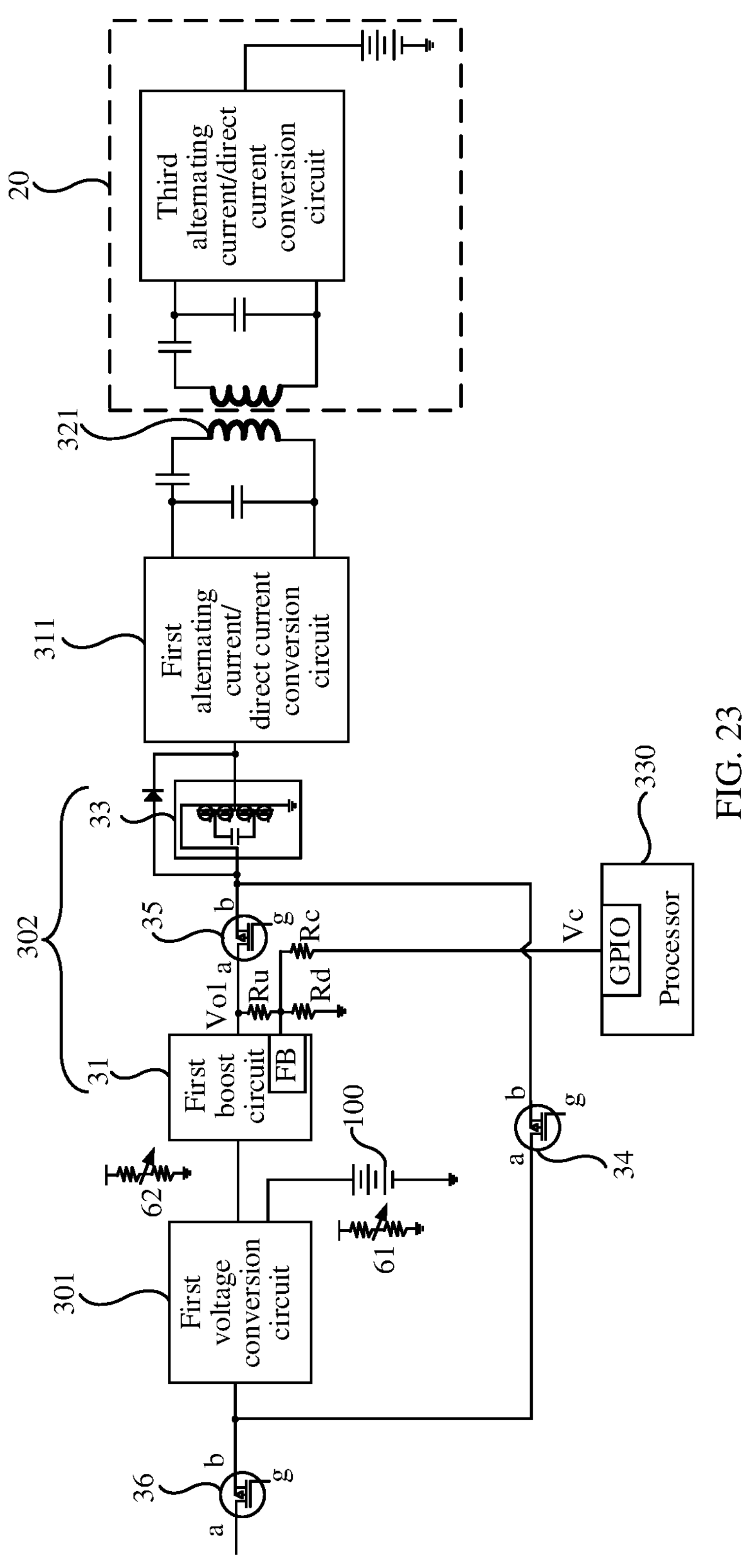
FIG. 23 is a schematic structural diagram of another wireless charging system according to an embodiment of this application.

In particular, the wireless charging circuit of the first electronic device may further include a first thermistor 61 shown in FIG. 23. The first thermistor 61 is electrically connected to the processor 330, and may be disposed near the first battery 100. The first thermistor 61 is configured to sense a temperature of the first battery 100. In this way, the foregoing S108 can be performed based on the result of sensing by the first thermistor 61.

In addition, the wireless charging circuit of the first electronic device may further include a second thermistor 62 shown in FIG. 23. The second thermistor 62 may be electrically connected to the processor 300, and is disposed near the first boost circuit 31 and the processor 330. The second thermistor 62 is configured to sense temperatures of the first boost circuit 31 and the processor 330.

It should be noted that, for ease of description, the processor 330 is disposed to be relatively far away from the first boost circuit 31 in FIG. 23. In an actual application scenario of the first electronic device 10, the processor 330 may be disposed near the first boost circuit 31, so that the second thermistor 62 is relatively close to both the first boost circuit 31 and the processor 330. Therefore, temperatures of the first boost circuit 31 and the processor 330 can be sensed.

In this case, based on the sensing results of the first thermistor 61 and the second thermistor 62, the processor 330 may control the second end of the regulating resistor Rc to be suspended or grounded, or provide a PWM signal to the second end of the regulating resistor Rc, to control the output power of the first boost circuit 31.

During performing S108, if the temperature of the first battery 100 is greater than the first temperature threshold Tth1, the following S109 is performed. In addition, if the temperature of the first battery 100 is less than the first temperature threshold Tth1, the foregoing S106 is performed. That is, both the first boost circuit 31 in the second voltage conversion circuit 302 and the switched-capacitor direct current converter 33 operate in a boost mode. An output power of the first electronic device 10 may maintain an original high power, for example, 12 W (or 24 W), to charge the second electronic device 20.

S109: Control the at least one stage of switched-capacitor direct current converter 33 to output a voltage output by the first boost circuit 31.

In this case, the switched-capacitor direct current converter 33 operates in the by pass mode. It is equivalent to a wire, and may transmit a voltage (for example, 5 V or 6 V) output by the first boost circuit 31 to the first alternating current/direct current conversion circuit. In this case, in the second voltage conversion circuit 302, only the first boost circuit 31 operates in the boost mode. The power output by the entire first electronic device 10 is reduced from a previous high power, for example, 12 W (or 24 W) to a low power, for example, 5 W or 6 W. In this way, if the temperature of the first battery 100 is greater than the first temperature threshold Tth1, the output power of the first electronic device 10 can be reduced, so that the first battery 100 can be prevented from serious heat generating. Following Silo and Sin may be performed after S109 is performed, to perform over temp protection for the second time on the first electronic device 10.

S110: Determine whether the temperature of the first battery 100 is greater than a second temperature threshold Tth2 (for example, Tth2=50° C.).

After S109 is performed and the output power of the first electronic device 10 is reduced, the temperature of the first battery 100 needs to be detected again. In this case, during performing Silo, it is necessary to compare the temperature of the first battery 100 with the second temperature threshold Tth2. The second temperature threshold Tth2 is greater than the first temperature threshold Tth1 (for example, Tth2=37° C.). If the temperature of the first battery 100 is greater than the second temperature threshold Tth2, the following Sill needs to be performed to turn off the first boost circuit 31. Therefore, the first electronic device 10 stops reverse charging on the second electronic device 20. If the temperature of the first battery 100 is less than the second temperature threshold Tth2, the following S112 may be performed.

S111: Turn off the first boost circuit 31.

In addition, after the first alternating current/direct current conversion circuit 311 converts the direct current voltage output by the second voltage conversion circuit 302 into an alternating current voltage to charge the second electronic device 20, the method may further include the following S112.

S112: Determine whether the battery level of the first battery 100 is less than the minimum battery level threshold Qth.

In a process in which the first electronic device 10 charges the second electronic device 20, the foregoing S112 may be performed to determine the battery level of the first battery 100. If the battery level of the first battery 100 is less than the minimum battery level threshold Qth, the foregoing Sill may be performed to turn off the first boost circuit 31. Therefore, the first electronic device 10 stops reverse charging on the second electronic device 20, thereby achieving under voltage lock out (under voltage lock out, UVLO). If the battery level of the first battery 100 is greater than the minimum battery level threshold Qth, the foregoing S106 may be performed.

The foregoing describes a process in which the first electronic device 10 performs reverse charging on the second electronic device 20. It can be learned from the foregoing that the second electronic device 20 may be an electronic device that can perform low-power charging, such as, a smart watch, a wireless headset, or a stylus, or the like, or may be an electronic device that needs high-power charging, such as, a mobile phone or a pad. In some other embodiments of this application, the first electronic device 10 may perform reverse charging on the second electronic device 20. Besides, the wireless charging system 01 may further include a third electronic device 31 shown in FIG. 24. Thus, the first electronic device 10 may further perform reverse charging on the third electronic device 31 shown in FIG. 24. The third electronic device 31 may be an electronic device that performs low-power charging, for example, a stylus shown in (e) of FIG. 2.

Figure 24:
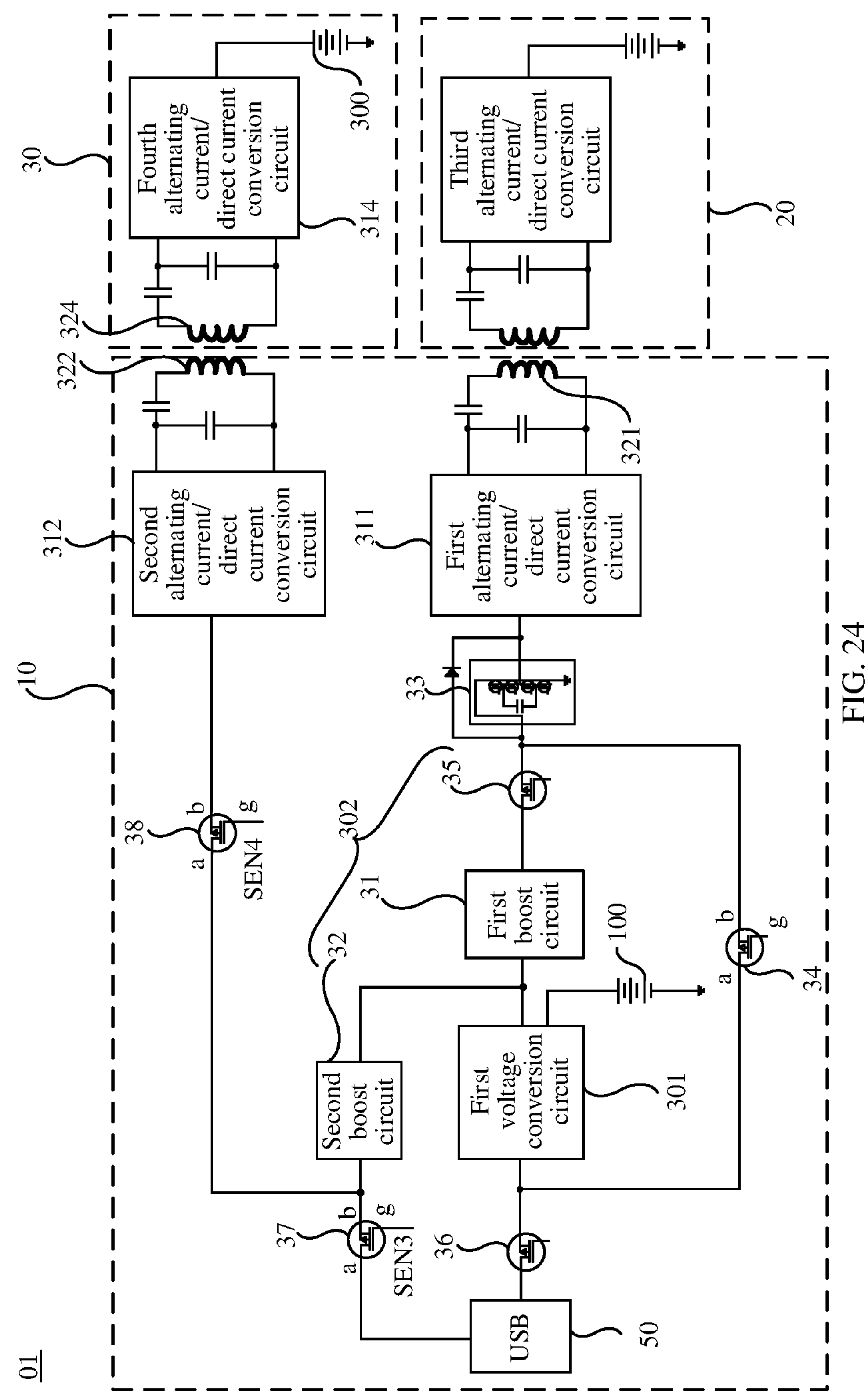
FIG. 24 is a schematic structural diagram of another wireless charging system according to an embodiment of this application.

In this case, the wireless charging circuit in the first electronic device may further include a second boost circuit 32, a second alternating current/direct current conversion circuit 312, and a second coil 322 shown in FIG. 24. The second boost circuit 32 may be connected to an output end of a first voltage conversion circuit 301. The second boost circuit 32 may be configured to boost a first battery voltage Vbat output by the first voltage conversion circuit 301 and then output the voltage obtained by boosting to the second alternating current/direct current conversion circuit. A boost multiple of the second boost circuit 32 is less than or equal to a boost multiple of the first boost circuit 31. For example, a voltage output by the second boost circuit 32 may be 5 V. The second alternating current/direct current conversion circuit 312 is electrically connected to the second boost circuit 32. The second alternating current/direct current conversion circuit 312 may be configured to convert a direct current voltage output by the second boost circuit 32 into an alternating current voltage. The second coil 322 is electrically connected to the second alternating current/direct current conversion circuit 312, and the second coil 322 is configured to emit an alternating magnetic field. The current on the second coil 322 being 1 A is used as an example. When the voltage output by the second boost circuit 32 is 5 V, the first electronic device 10 may provide a charging power of 5 W to the third electronic device 31.

Based on this, the third electronic device 31 may include a third battery 300, a fourth coil 324, and a fourth alternating current/direct current conversion circuit 314. The fourth coil 324 is configured to receive an alternating magnetic field emitted by the second coil 322, and generate an alternating current voltage by induction. The fourth alternating current/direct current conversion circuit 314 is electrically connected to the fourth coil 324 and the third battery 300. The fourth alternating current/direct current conversion circuit 314 is configured to convert an alternating current voltage induced by the fourth coil 324 after receiving the alternating current magnetic field into a direct current voltage, to charge the third battery 300. In this way, the first electronic device 10 can perform wireless reverse charging on the third electronic device 31.

Figures 25, 26:
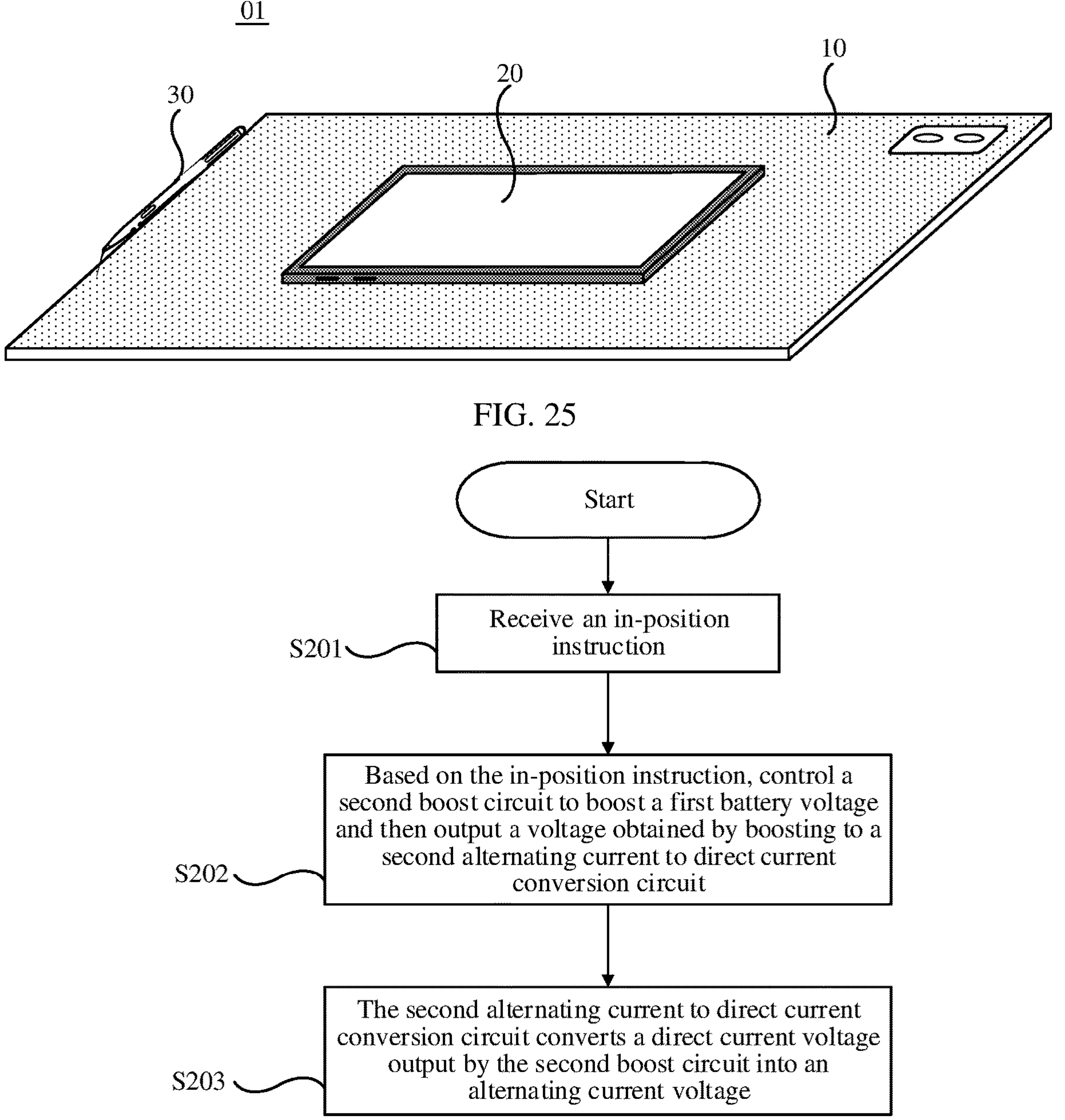
FIG. 25 is a schematic diagram of another wireless reverse charging according to an embodiment of this application.
FIG. 26 is a flowchart of another charging control method for an electronic device according to an embodiment of this application.

In some embodiments of this application, when the first electronic device 10 performs reverse charging on the stylus that is used as the third electronic device 31, the stylus may be attached to a frame of the first electronic device 10, as shown in FIG. 25. In this case, the second coil 322 in the first electronic device 10 may be disposed at a frame of the third electronic device 31. Therefore, when the stylus is attached to the frame of the first electronic device 10, the fourth coil 324 in the stylus may correspond to a location of the second coil 322 in the first electronic device 10.

The following uses an example to describe a method in which the first electronic device 10 performs reverse charging on the stylus that is used as the third electronic device 31. The method may include S201 to S203 as shown in FIG. 26.

S201: Receive an in-position instruction.

The in-position instruction is configured to indicate that a to-be-charged electronic device, for example, the third electronic device 31, exists at a location of the second coil 322 of the first electronic device 10.

In particular, in the first electronic device 10, a Hall detector (not shown) may be disposed near a position in which the second coil 322 is located. The Hall detector is configured to detect whether the third electronic device 31 is in position. When the third electronic device 31 is detected in position, the Hall detector may send an in-position instruction to the processor 330 in the first electronic device 10, so that the processor 330 can receive the in-position instruction.

In this case, after the processor 330 of the first electronic device 10 controls the first voltage conversion circuit 301 shown in FIG. 24 to output the first battery voltage Vbat provided by the first battery 100, the following S202 may be performed.

S202: Based on the in-position instruction, control the second boost circuit 32 to boost the first battery voltage Vbat and then output a voltage obtained by boosting to the second alternating current/direct current conversion circuit 312.

In particular, it can be learned from the foregoing description that, after the Hall detector detects that a to-be-charged electronic device, for example, the third electronic device 31, exists at the location of the second coil 322, the Hall detector may send an in-position instruction to the processor 330. Therefore, the processor 330 may generate a fourth switch control signal SEN4 based on the in-position instruction. Next, the processor 330 may output the fourth switch control signal SEN4 to a control end g of the fourth switch circuit 38 shown in FIG. 28, to control the fourth switch circuit SEN4 to be turned on. Therefore, the second boost circuit 32 is electrically connected to the second alternating current/direct current conversion circuit 312, and the foregoing 202 is further performed.

S203: The second alternating current/direct current conversion circuit 312 converts the direct current voltage output by the second boost circuit 32 into an alternating current voltage.

In particular, the processor 330 of the first electronic device 10 may perform the foregoing 203, to excite the second coil 322 to emit an alternating magnetic field. In this way, the fourth coil 324 in the third electronic device 31 receives the alternating magnetic field emitted by the second coil 322, and generates an alternating current voltage by induction. The fourth alternating current/direct current conversion circuit 314 converts an alternating current voltage induced by the fourth coil 324 after receiving the alternating current magnetic field into a direct current voltage, to charge the third battery 300. Therefore, the first electronic device 10 performs reverse charging on the stylus that is used as the third electronic device 31.

On this basis, the wireless charging circuit 30 may further include a third switch circuit 37 and a fourth switch circuit 38 as shown in FIG. 24. A control end g of the third switch circuit 37 may be electrically connected to the processor 330 shown in FIG. 27. The control end g of the third switch circuit 37 is configured to receive a third switch control signal SEN3. A first end a of the third switch circuit 37 is electrically connected to the USB interface 50, and a second end b of the third switch circuit 37 is electrically connected to the output end of the second boost circuit 32. The third switch circuit 37 is configured to be turned on or off based on the third switch control signal SEN3.

Figure 27:
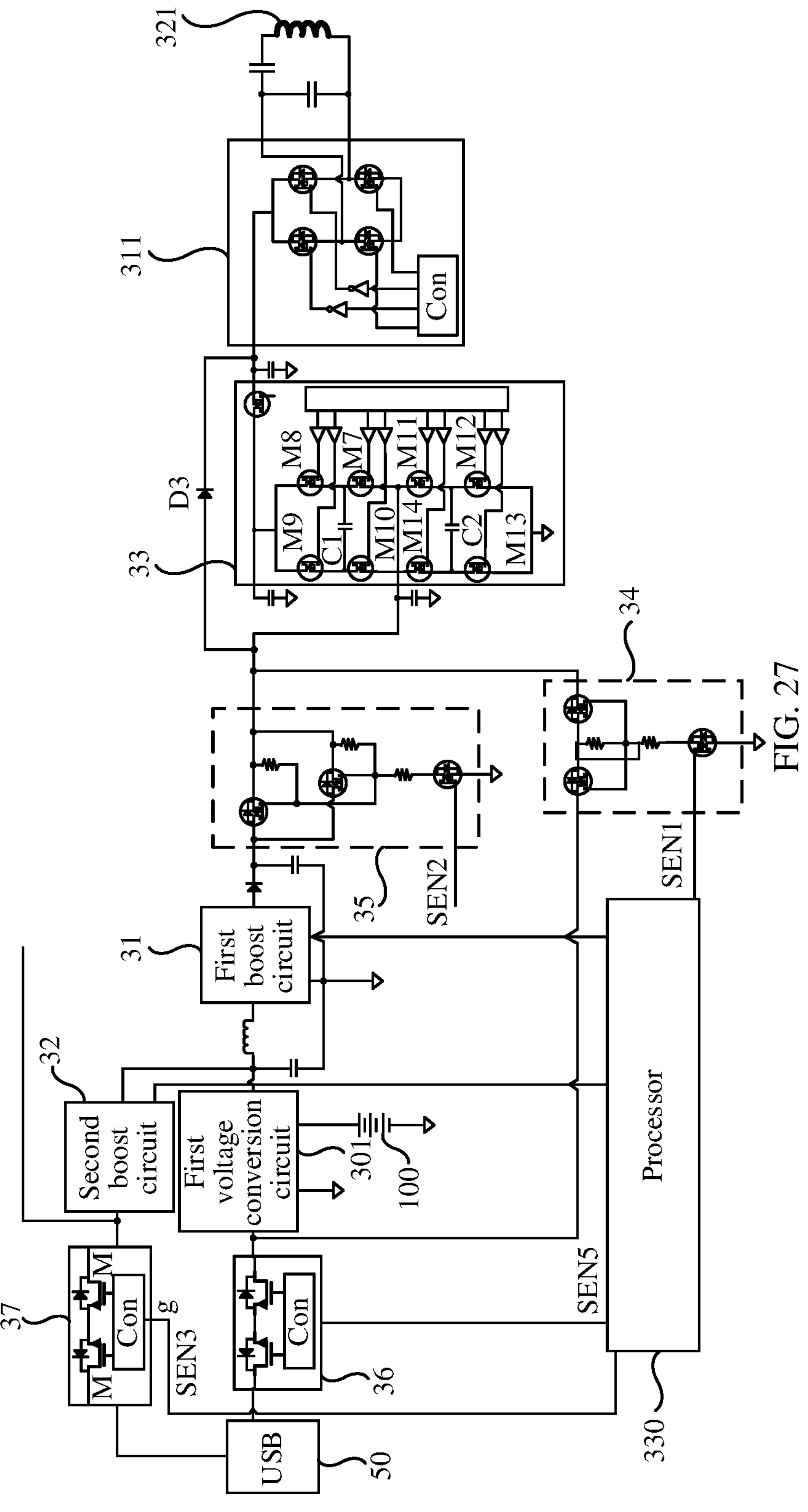
FIG. 27 is a schematic structural diagram of another wireless charging system according to an embodiment of this application.

For example, as shown in FIG. 27, the third switch circuit 37 may include two switching transistors M, and the parasitic diodes inside the two switching transistors M may be disposed reversely. When the processor 330 controls, through the third switch control signal SEN3, the third switch circuit 37 to be cut off, the two switching transistors M in the third switch circuit 37 are in the cut-off state, and the entire third switch circuit 37 is in the off state. In addition, the third switch circuit 37 may include a control circuit Con. The control circuit Con can not only provide logic control signals to the two switching transistors in the third switch circuit 37, but also detect a voltage and a current on the third switch circuit 37. When a voltage and a current at the USB interface are too high, the control circuit Con may send an instruction to the processor 330, so that the processor 330 controls, through the third switch control signal SEN3, the third switch circuit 37 to be cut off, thereby implementing OCP and OVP.

In addition, as shown in FIG. 24, a control end g of the fourth switch circuit 38 may be electrically connected to the processor 330. The control end g of the fourth switch circuit 38 is configured to receive a fourth switch control signal SEN4. A first end of the fourth switch circuit 38 is electrically connected to the output end of the second boost circuit 32, and a second end of the fourth switch circuit 38 is electrically connected to the second alternating current/direct current conversion circuit 312. The fourth switch circuit 38 is configured to be turned on or off based on the fourth switch control signal SEN4.

Figure 28:
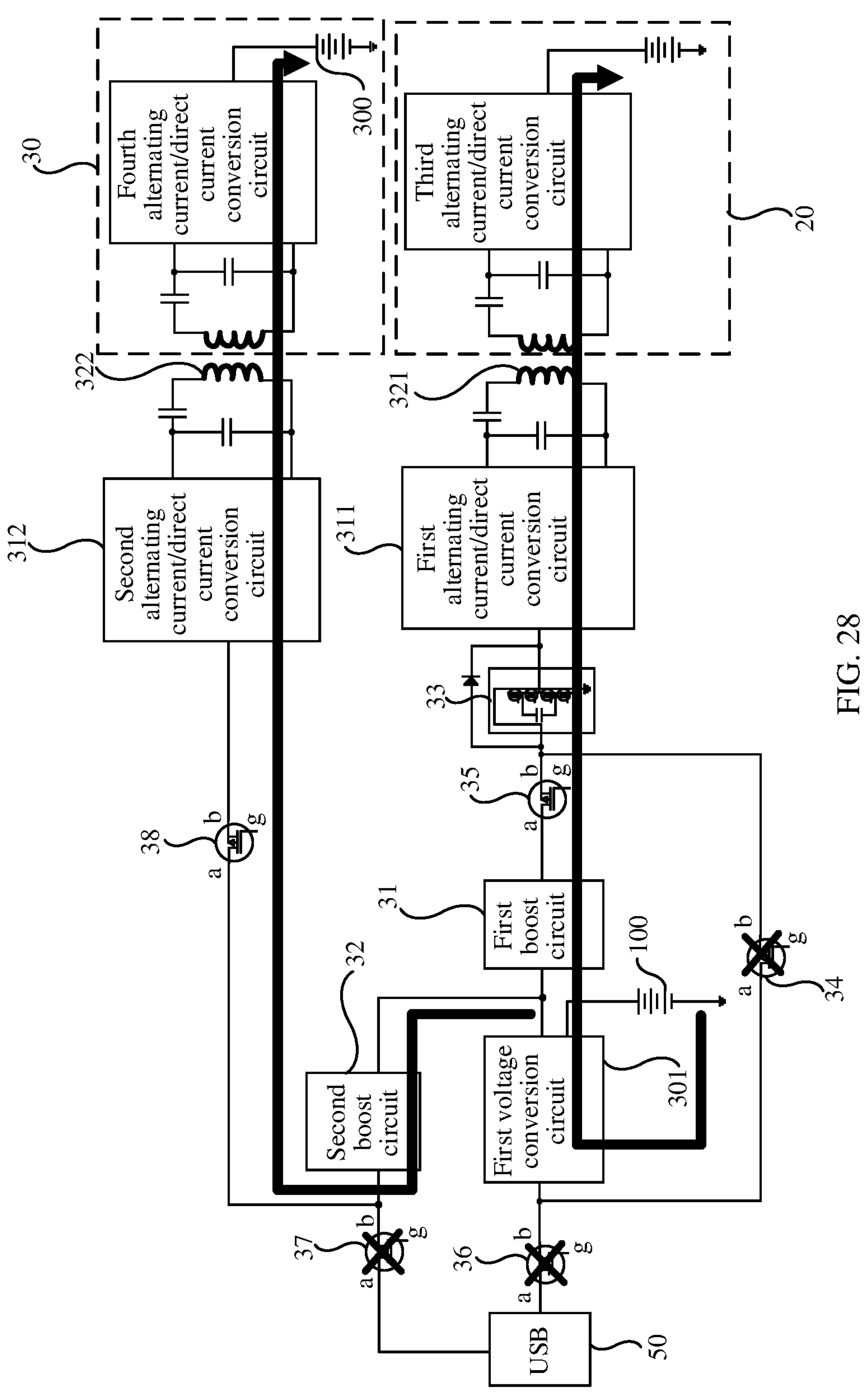
FIG. 28 is a schematic diagram of a control process of a wireless charging system according to an embodiment of this application.

Based on this, in some embodiments of this application, as shown in FIG. 28, when a to-be-charged second electronic device 20 is disposed at a location of the first coil 321 of the first electronic device 10, and a to-be-charged third electronic device 31 is disposed at a location of the second coil 322, the processor 330 may control the first switch circuit 34, the third switch circuit 37, and the fifth switch circuit 36 shown in FIG. 28 to be turned off, and control the second switch circuit 35 and the fourth switch circuit 38 to be turned on. In this case, the first voltage conversion circuit 301 outputs the first battery voltage Vbat1 provided by the first battery 100. Then, the foregoing control method shown in FIG. 9 may be used, through a charging path formed by the first boost circuit 31, the switched-capacitor direct current converter 33, the first alternating current/direct current conversion circuit 311, and the first coil 321, to perform reverse charging on the second electronic device 20 in the direction shown by the arrow.

At the same time, a control method shown in FIG. 26 may be used, through a charging path formed by the second alternating current/direct current conversion circuit 312 and the second coil 322, to perform reverse charging on the third electronic device 31 in the direction shown by the arrow.

Alternatively, in some other embodiments of this application, the USB interface 50 is electrically connected to an external device (for example, a removable storage medium or a keyboard). When the first electronic device 10 charges both the second electronic device 20 and the third electronic device 31, the control method of the processor 330 may further include: generating the third switch control signal SEN3 based on a result of identifying the type of the external device by the USB interface 50. For example, if the USB interface 50 is electrically connected to an external device such as a keyboard, the USB interface 50 determines the type of the external device. When it is determined that the external device needs to be powered by the first battery 100, the USB interface 50 sends a control instruction to the processor 330. Therefore, the processor 330 generates the third switch control signal SEN3 based on the control instruction.

Figure 29:
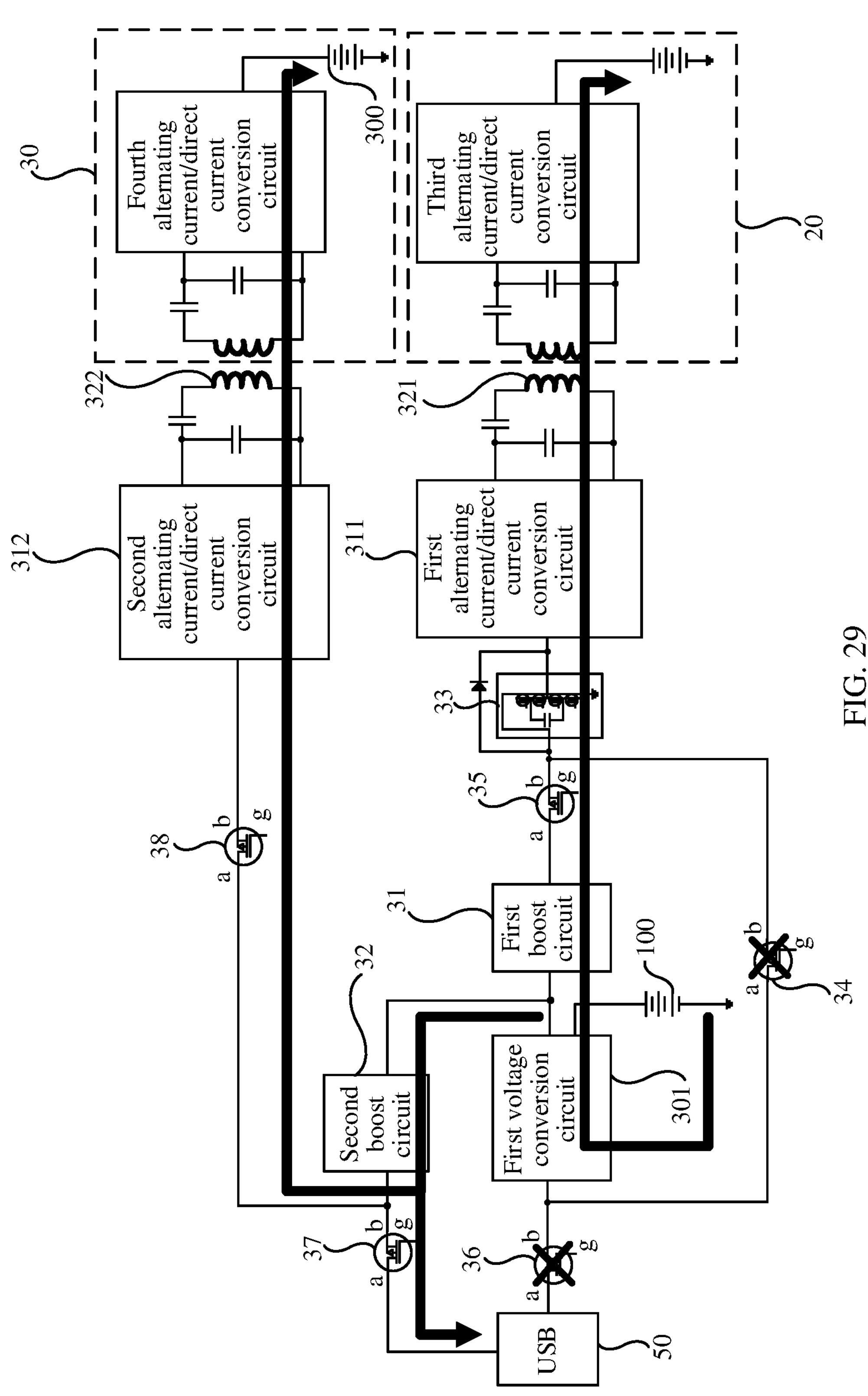
FIG. 29 is a schematic diagram of another control process of a wireless charging system according to an embodiment of this application.

Next, the processor 330 generates the foregoing third switch control signal SEN3 based on the third control instruction, and outputs the third switch control signal SEN3 to the control end g of the third switch circuit 37, to control the third switch circuit 37 to be turned on, and electrically connect the USB interface 50 to the second boost circuit 32. Next, the processor 330 controls the third switch circuit 37 to be in the on state as shown in FIG. 29.

In this case, the second boost circuit 32 boosts the first battery voltage Vbat1, and transmits, through the third switch circuit 37, a voltage obtained by boosting to the external device in the direction shown by the arrow, to power the external device, for example, a removable storage medium or a keyboard. After being powered by the first electronic device 10, the external device can perform data transmission with the first electronic device 10. Therefore, the USB interface 50 of the first electronic device 10 has an on the go (on the go, OTG) function.

Figure 30:
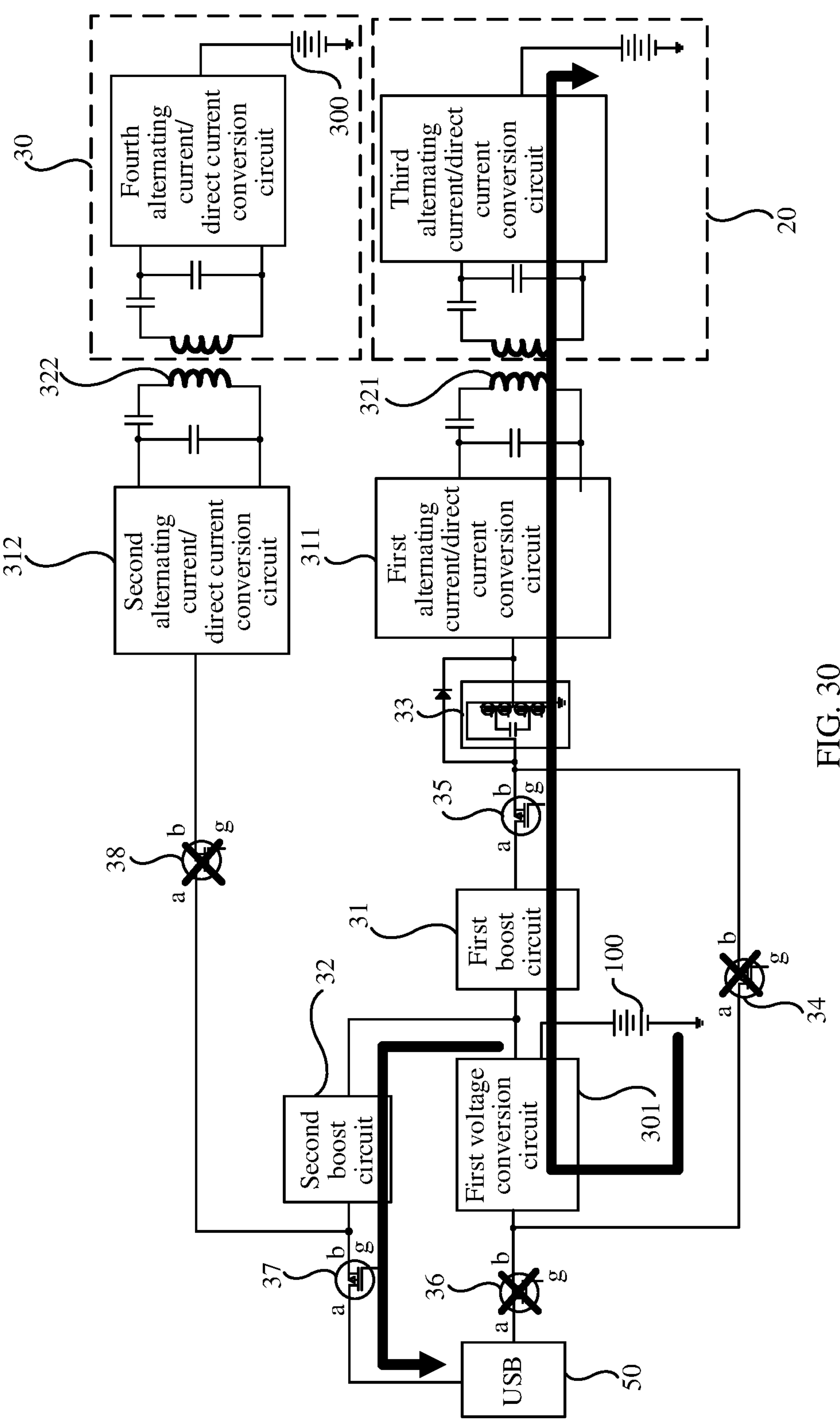
FIG. 30 is a schematic diagram of another control process of a wireless charging system according to an embodiment of this application.

Alternatively, in some other embodiments of this application, the USB interface 50 is electrically connected to an external device (for example, a removable storage medium or a keyboard). The processor 330 may further control the fourth switch circuit 38 to be in the off state, as shown in FIG. 30. In this way, the first electronic device 10 powers both the second electronic device 20 and the external device, and no longer powers the third electronic device 31. Therefore, power consumption of the first battery 100 in the first electronic device 10 can be reduced.

Figure 31:
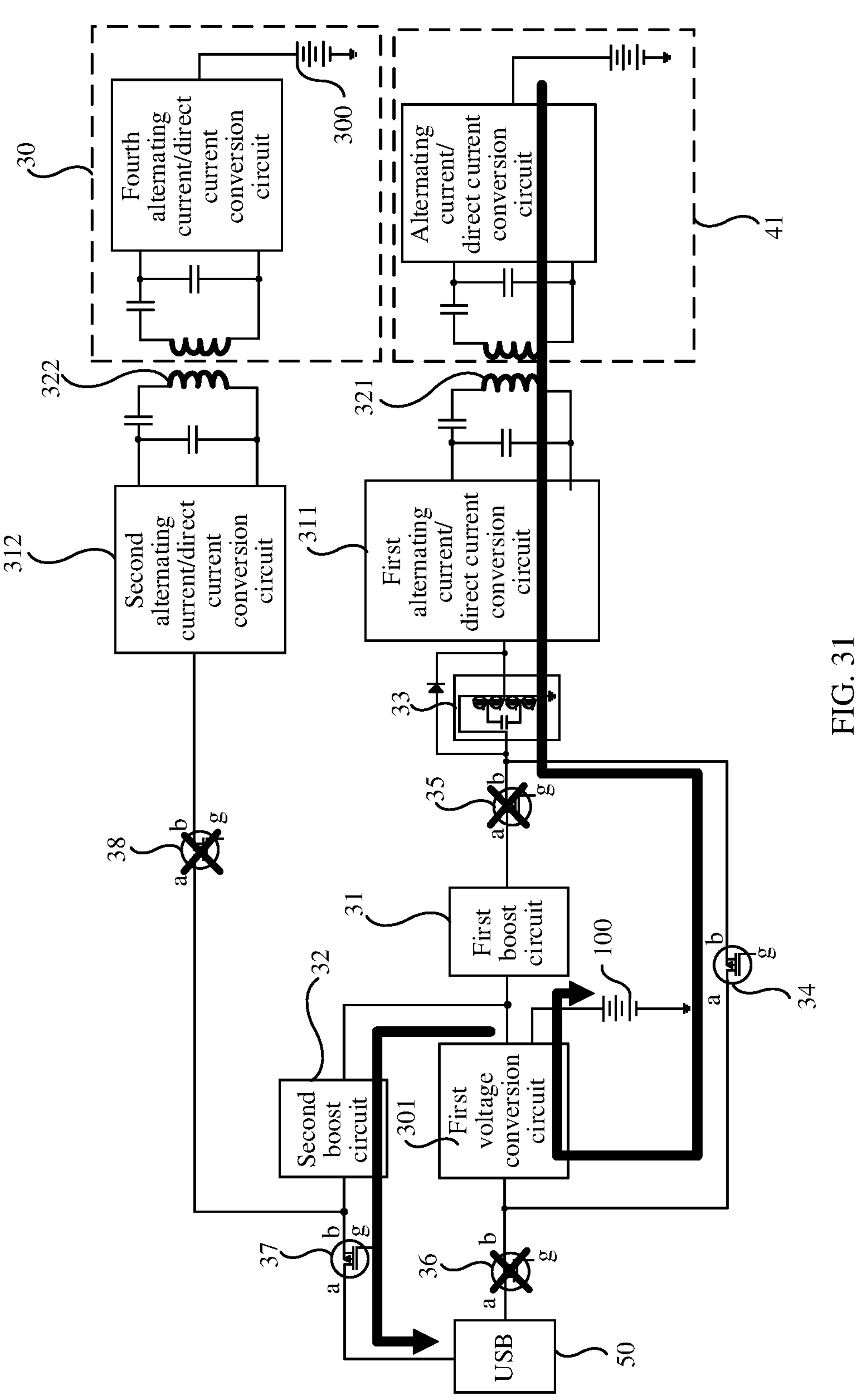
FIG. 31 is a schematic diagram of another control process of a wireless charging system according to an embodiment of this application.

The foregoing description uses an example in which the first electronic device 10 performs reverse charging on the second electronic device 20 and the third electronic device 31, or supplies power to an external device electrically connected through the USB interface 50. In some other embodiments of this application, as shown in FIG. 31, when a wireless charging power supply 41 is disposed at a location of the first coil 321 of the first electronic device 10, the processor 330 may control the first switch circuit 34 and the third switch circuit 37 to be turned on, and control the second switch circuit 35, the fourth switch circuit 38, and the fifth switch circuit 36 to be cut off. In this case, the wireless charging power supply 41 may charge, through the first switch circuit 34, the first battery 100 in the first electronic device 10 in the direction shown by the arrow. In addition, after the first voltage conversion circuit 301 outputs the first battery voltage Vbat1 provided by the first battery 100, the second boost circuit 32 boosts the first battery voltage Vbat1, and transmits, through the third switch circuit 37, a voltage obtained by boosting to the external device in the direction shown by the arrow, to power the external device.

This application provides a computer readable storage medium including computer instructions. The computer instructions, when run on the processor 330 of the first electronic device 10, may enable the processor 330 to perform any one of the foregoing control methods.

In addition, this application provides a computer program product including computer instructions. The computer instructions, when run on the processor 330 of the first electronic device 10, may enable the processor 330 to perform any one of the foregoing control methods.

The foregoing descriptions are merely specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless charging circuit, comprising:

a first voltage conversion circuit, electrically connected to a first battery, wherein the first voltage conversion circuit is configured to convert a supply voltage into a first battery voltage of the first battery for charging the first battery, and the first voltage conversion circuit is further configured to output the first battery voltage provided by the first battery;

a second voltage conversion circuit, electrically connected to the first voltage conversion circuit, and configured to boost the first battery voltage, wherein the second voltage conversion circuit comprises a first boost circuit and at least one stage of a switched-capacitor direct current converter connected in series; and a first alternating current/direct current conversion circuit, electrically connected to the second voltage conversion circuit, and configured to convert a direct current voltage output by the second voltage conversion circuit into an alternating current voltage.

2. The wireless charging circuit of claim 1, wherein the wireless charging circuit further comprises:

a second boost circuit, electrically connected to the first voltage conversion circuit, and configured to boost the first battery voltage and output a voltage obtained by the boost, wherein a boost multiple of the second boost circuit is less than or equal to a boost multiple of the first boost circuit; and a second alternating current/direct current conversion circuit, electrically connected to the second boost circuit, and configured to convert a direct current voltage output by the second boost circuit into an alternating current voltage.

3. The wireless charging circuit of claim 1, wherein the first boost circuit comprises a feedback end, and the second voltage conversion circuit further comprises:

a pull-up resistor, wherein a first end of the pull-up resistor is electrically connected to an output end of the first boost circuit, and a second end of the pull-up resistor is electrically connected to the feedback end of the first boost circuit;

a pull-down resistor, wherein a first end of the pull-down resistor is electrically connected to the feedback end of the first boost circuit, and a second end of the pull-down resistor is grounded; and a regulating resistor, wherein a first end of the regulating resistor is electrically connected to the feedback end of the first boost circuit, and a second end of the regulating resistor is configured to be suspended, to be grounded, or to receive a pulse width modulation signal.

4. The wireless charging circuit of claim 1, wherein the first boost circuit and the at least one stage of switched-capacitor direct current converter are connected in series between the first voltage conversion circuit and the first alternating current/direct current conversion circuit.

5. The wireless charging circuit of claim 1, wherein the wireless charging circuit further comprises a first switch circuit, wherein a control end of the first switch circuit is configured to receive a first switch control signal, a first end of the first switch circuit is electrically connected to an input end of the first voltage conversion circuit, a second end of the first switch circuit is electrically connected between the first boost circuit and the at least one stage of switched-capacitor direct current converter, and the first switch circuit is configured to be turned on or off based on the first switch control signal; and wherein the first alternating current/direct current conversion circuit is further configured to convert an alternating current voltage into a direct current voltage.

6. The wireless charging circuit of claim 1, wherein the wireless charging circuit further comprises a first switch circuit, wherein a control end of the first switch circuit is configured to receive a first switch control signal, a first end of the first switch circuit is electrically connected to an input end of the first voltage conversion circuit, a second end of the first switch circuit is electrically connected to the first alternating current/direct current conversion circuit, and the first switch circuit is configured to be turned on or off based on the first switch control signal; and wherein the first alternating current/direct current conversion circuit is further configured to convert an alternating current voltage into a direct current voltage.

7. The wireless charging circuit of claim 5, wherein the first switch circuit comprises:

a first switching transistor, wherein a first electrode of the first switching transistor is the first end of the first switch circuit;

a second switching transistor, wherein a first electrode of the second switching transistor is electrically connected to a second electrode of the first switching transistor, and a second electrode of the second switching transistor is the second end of the first switch circuit;

a first resistor, wherein a first end of the first resistor is electrically connected to the second electrode of the first switching transistor and the first electrode of the second switching transistor, and a second end of the first resistor is electrically connected to a gate of the first switching transistor and a gate of the second switching transistor;

a second resistor, wherein a first end of the second resistor is electrically connected to the second end of the first resistor; and a third switching transistor, wherein a first electrode of the third switching transistor is electrically connected to the second end of the second resistor, a second electrode of the third switching transistor is grounded, and a gate of the third switching transistor is the control end of the first switch circuit.

8. The wireless charging circuit of claim 5, wherein the wireless charging circuit further comprises a second switch circuit, wherein a control end of the second switch circuit is configured to receive a second switch control signal, a first end of the second switch circuit is electrically connected to the first boost circuit, a second end of the second switch circuit is electrically connected to the at least one stage of switched-capacitor direct current converter, and the second switch circuit is configured to be turned on or off based on the second switch control signal.

9. The wireless charging circuit of claim 8, wherein the second switch circuit comprises:

a fourth switching transistor, wherein a first electrode of the fourth switching transistor is the first end of the second switch circuit, and a second electrode of the fourth switching transistor is the second end of the second switch circuit;

a third resistor, wherein a first end of the third resistor is electrically connected to a gate of the fourth switching transistor, and a second end of the third resistor is electrically connected to the second electrode of the fourth switching transistor;

a fifth switching transistor, wherein a first electrode of the fifth switching transistor is electrically connected to the first electrode of the fourth switching transistor, and a second electrode of the fifth switching transistor is electrically connected to the second electrode of the fourth switching transistor;

a fourth resistor, wherein a first end of the fourth resistor is electrically connected to the gate of the fourth switching transistor and a gate of the fifth switching transistor, and a second end of the fourth resistor is electrically connected to the second electrode of the fifth switching transistor;

a fifth resistor, wherein a first end of the fifth resistor is electrically connected to the gate of the fifth switching transistor; and a sixth switching transistor, wherein a first electrode of the sixth switching transistor is electrically connected to a second end of the fifth resistor, a second electrode of the sixth switching transistor is grounded, and a gate of the sixth switching transistor is the control end of the second switch circuit.

10. The wireless charging circuit of claim 2, wherein the wireless charging circuit further comprises a third switch circuit, wherein a control end of the third switch circuit is configured to receive a third switch control signal, a first end of the third switch circuit is electrically connected to a USB interface, a second end of the third switch circuit is electrically connected to an output end of the second boost circuit, and the third switch circuit is configured to be turned on or off based on the third switch control signal.

11. The wireless charging circuit of claim 2, wherein the wireless charging circuit further comprises a fourth switch circuit, wherein a control end of the fourth switch circuit is configured to receive a fourth switch control signal, a first end of the fourth switch circuit is electrically connected to an output end of the second boost circuit, a second end of the fourth switch circuit is electrically connected to the second alternating current/direct current conversion circuit, and the fourth switch circuit is configured to be turned on or off based on the fourth switch control signal.

12. The wireless charging circuit of claim 1, wherein the wireless charging circuit further comprises a fifth switch circuit, wherein a control end of the fifth switch circuit is configured to receive a fifth switch control signal, a first end of the fifth switch circuit is electrically connected to a USB interface, a second end of the fifth switch circuit is electrically connected to an input end of the first voltage conversion circuit, and the fifth switch circuit is configured to be turned on or off based on the fifth switch control signal.

13. The wireless charging circuit of claim 1, wherein any switched-capacitor direct current converter of the at least one stage of switched-capacitor direct current converter comprises:

a seventh switching transistor, wherein a first electrode of the seventh switching transistor is an input end of the switched-capacitor direct current converter;

an eighth switching transistor, wherein a first electrode of the eighth switching transistor is electrically connected to a second electrode of the seventh switching transistor, and a second electrode of the eighth switching transistor is an output end of the switched-capacitor direct current converter;

a first capacitor, wherein a first end of the first capacitor is electrically connected to the second electrode of the seventh switching transistor;

a ninth switching transistor, wherein a first electrode of the ninth switching transistor is electrically connected to a second end of the first capacitor, and a second electrode of the ninth switching transistor is grounded; and a tenth switching transistor, wherein a first electrode of the tenth switching transistor is electrically connected to the first electrode of the seventh switching transistor, and a second electrode of the tenth switching transistor is electrically connected to the second end of the first capacitor.

14. The wireless charging circuit of claim 1, wherein any switched-capacitor direct current converter of the at least one stage of switched-capacitor direct current converter comprises:

a seventh switching transistor, wherein a first electrode of the seventh switching transistor is an input end of the switched-capacitor direct current converter;

an eighth switching transistor, wherein a first electrode of the eighth switching transistor is electrically connected to a second electrode of the seventh switching transistor, and a second electrode of the eighth switching transistor is an output end of the switched-capacitor direct current converter;

a first capacitor, wherein a first end of the first capacitor is electrically connected to the second electrode of the seventh switching transistor;

a ninth switching transistor, wherein a first electrode of the ninth switching transistor is electrically connected to a second end of the first capacitor, and a second electrode of the ninth switching transistor is electrically connected to the second electrode of the eighth switching transistor;

a tenth switching transistor, wherein a first electrode of the tenth switching transistor is electrically connected to the first electrode of the seventh switching transistor, and a second electrode of the tenth switching transistor is electrically connected to the second end of the first capacitor;

an eleventh switching transistor, wherein a second electrode of the eleventh switching transistor is electrically connected to the first electrode of the seventh switching transistor;

a twelfth switching transistor, wherein a first electrode of the twelfth switching transistor is grounded, and a second electrode of the twelfth switching transistor is electrically connected to a first electrode of the eleventh switching transistor;

a second capacitor, wherein a first end of the second capacitor is electrically connected to the first electrode of the eleventh switching transistor;

a thirteenth switching transistor, wherein a first electrode of the thirteenth switching transistor is grounded, and a second electrode of the thirteenth switching transistor is electrically connected to a second end of the second capacitor; and a fourteenth switching transistor, wherein a first electrode of the fourteenth switching transistor is electrically connected to the second end of the second capacitor, and a second electrode of the fourteenth switching transistor is electrically connected to the second electrode of the eleventh switching transistor.

15. The wireless charging circuit of claim 13, wherein:

the at least one stage of switched-capacitor direct current converter comprises a first stage of switched-capacitor direct current converter and a second stage of switched-capacitor direct current converter, and an output end of the first stage of switched-capacitor direct current converter is electrically connected to an input end of the second stage of switched-capacitor direct current converter;

the second voltage conversion circuit further comprises a third boost circuit, the third boost circuit is connected in parallel to the first boost circuit, and a boost multiple of the third boost circuit is the same as a boost multiple of the first boost circuit; and the wireless charging circuit further comprises:

a first diode, wherein an anode of the first diode is electrically connected to an output end of the first boost circuit, and a cathode of the first diode is electrically connected to the first alternating current/direct current conversion circuit; and a second diode, wherein an anode of the second diode is electrically connected to an output end of the third boost circuit, and a cathode of the second diode is electrically connected to the first alternating current/direct current conversion circuit.

16. The wireless charging circuit of claim 1, wherein the wireless charging circuit further comprises a third diode, wherein an anode of the third diode is electrically connected to an input end of the switched-capacitor direct current converter, and a cathode of the third diode is electrically connected to an output end of the switched-capacitor direct current converter.

17. The wireless charging circuit of claim 3, wherein the wireless charging circuit further comprises:

a first thermistor, configured to sense a temperature of the first battery; and a second thermistor, configured to sense temperatures of the first boost circuit and a processor.

18. An electronic device, comprising a first coil and a wireless charging circuit, wherein the wireless charging circuit comprises:

a first voltage conversion circuit, electrically connected to a first battery, wherein the first voltage conversion circuit is configured to convert a supply voltage into a first battery voltage of the first battery for charging the first battery, and the first voltage conversion circuit is further configured to output the first battery voltage provided by the first battery;

a second voltage conversion circuit, electrically connected to the first voltage conversion circuit, and configured to boost the first battery voltage, wherein the second voltage conversion circuit comprises a first boost circuit and at least one stage of a switched-capacitor direct current converter connected in series; and a first alternating current/direct current conversion circuit, electrically connected to the second voltage conversion circuit, and configured to convert a direct current voltage output by the second voltage conversion circuit into an alternating current voltage;

wherein the first coil is electrically connected to the first alternating current/direct current conversion circuit, the first coil is configured to emit an alternating magnetic field, and the first coil is further configured to receive the alternating magnetic field, and generate an alternating current through induction.

19. A control method, wherein the control method is applied to a processor in an electronic device, wherein the electronic device comprises a first coil and a wireless charging circuit, wherein the wireless charging circuit comprises:

a first voltage conversion circuit, electrically connected to a first battery, wherein the first voltage conversion circuit is configured to convert a supply voltage into a first battery voltage of the first battery for charging the first battery, and the first voltage conversion circuit is further configured to output the first battery voltage provided by the first battery;

a second voltage conversion circuit, electrically connected to the first voltage conversion circuit, and configured to boost the first battery voltage, wherein the second voltage conversion circuit comprises a first boost circuit and at least one stage of a switched-capacitor direct current converter connected in series; and a first alternating current/direct current conversion circuit, electrically connected to the second voltage conversion circuit, and configured to convert a direct current voltage output by the second voltage conversion circuit into an alternating current voltage;

wherein the first coil is electrically connected to the first alternating current/direct current conversion circuit, the first coil is configured to emit an alternating magnetic field, and the first coil is further configured to receive the alternating magnetic field, and generate an alternating current through induction;

wherein the electronic device further comprises the first battery electrically connected to the processor, the first battery is electrically connected to the first voltage conversion circuit in the wireless charging circuit, and the first boost circuit and the at least one stage of switched-capacitor direct current converter are sequentially electrically connected between the first voltage conversion circuit and the first alternating current/direct current conversion circuit; and wherein the method comprises:

controlling, after a control operation of a user is received, based on a battery level of the first battery being greater than a minimum battery level threshold, the first voltage conversion circuit to output the first battery voltage provided by the first battery, wherein the control operation is for controlling the first battery to discharge;

controlling the first boost circuit to boost the first battery voltage;

controlling the at least one stage of switched-capacitor direct current converter to output a voltage output by the first boost circuit;

controlling, after a power increase request is received, the at least one stage of switched-capacitor direct current converter to boost the voltage output by the first boost circuit; and controlling the first alternating current/direct current conversion circuit to convert a voltage output by the at least one stage of switched-capacitor direct current converter into an alternating current voltage, to excite the first coil to emit the alternating magnetic field.

20. The control method of claim 19, wherein the wireless charging circuit further comprises a second boost circuit, a second alternating current/direct current conversion circuit, and a second coil, wherein the second boost circuit is electrically connected to the first voltage conversion circuit, the second alternating current/direct current conversion circuit is electrically connected to the second boost circuit, and the second coil is electrically connected to the second alternating current/direct current conversion circuit; and wherein the method further comprises:

detecting whether a to-be-charged electronic device exists at a location of the second coil;

performing, after the controlling the first voltage conversion circuit to output the first battery voltage provided by the first battery based on the to-be-charged electronic device existing at the location of the second coil:

controlling the second boost circuit to boost the first battery voltage, wherein a voltage output by the second boost circuit is less than or equal to the voltage output by the first boost circuit; and converting, by the second alternating current/direct current conversion circuit, the direct current voltage output by the second boost circuit into an alternating current voltage, to excite the second coil to emit the alternating magnetic field.

* * * * *